US012516338B2

(12) United States Patent
Nakamura et al.

(10) Patent No.: US 12,516,338 B2
(45) Date of Patent: Jan. 6, 2026

(54) FLAVONE 7-O-METHYLTRANSFERASE GENE AND USE FOR SAME

(71) Applicant: Suntory Holdings Limited, Osaka (JP)

(72) Inventors: Noriko Nakamura, Soraku-gun (JP); Naoko Okitsu, Soraku-gun (JP); Yoshikazu Tanaka, Soraku-gun (JP); Yukihisa Katsumoto, Soraku-gun (JP)

(73) Assignee: SUNTORY HOLDINGS LIMITED, Osaka (JP)

(*) Notice: Subject to any disclaimer, the term of this patent is extended or adjusted under 35 U.S.C. 154(b) by 346 days.

(21) Appl. No.: 17/598,366

(22) PCT Filed: Mar. 27, 2020

(86) PCT No.: PCT/JP2020/014409
§ 371 (c)(1),
(2) Date: Sep. 27, 2021

(87) PCT Pub. No.: WO2020/203940
PCT Pub. Date: Oct. 8, 2020

(65) Prior Publication Data

US 2022/0186240 A1 Jun. 16, 2022

(30) Foreign Application Priority Data

Mar. 29, 2019 (JP) ................................ 2019-069222

(51) Int. Cl.
*C12N 15/82* (2006.01)
*C12N 9/10* (2006.01)
*C12N 15/52* (2006.01)

(52) U.S. Cl.
CPC .... *C12N 15/825* (2013.01); *C12Y 114/11022* (2013.01); *C12Y 201/0115* (2013.01); *C12N 9/1007* (2013.01); *C12N 15/52* (2013.01); *C12Y 101/01001* (2013.01)

(58) Field of Classification Search
CPC ........................ C12N 15/825; C12Y 201/0115
See application file for complete search history.

(56) References Cited

U.S. PATENT DOCUMENTS

2020/0325486 A1 10/2020 Noda et al.

FOREIGN PATENT DOCUMENTS

| | | | |
|---|---|---|---|
| JP | 2017-057159 A | 3/2017 | |
| JP | WO2017169699 A1 * | 10/2017 | ............... A01H 1/00 |
| WO | 2017/169699 A1 | 10/2017 | |

OTHER PUBLICATIONS

JPWO2017169699_Translation (Year: 2017).*
Zhang et al (Predicting DNA Hybridization Kinetics from Sequence. Nature Chemistry. 10:91-98, 2018) (Year: 2018).*
Friedberg (Automated protein function prediction—the genomic challenge. Brief. Bioinformatics. 7:225-242, 2006) (Year: 2006).*
Wang et al (From Protein Sequence to Protein Function via Multi-Label Linear Discriminant Analysis. IEEE/ACM Transactions on Computational Biology and Bioinformatics, vol. 14, No. 3, 503-513, 2017) (Year: 2017).*
Bendahmane et al (Genetics and genomics of flower initiation and development in roses. Journal of Experimental Botany, vol. 64, No. 4, pp. 847-857, 2013) (Year: 2013).*
Shibano et al (Antioxidant constituents in the dayflower (Commelina communis L.) and their a-glucosidase-inhibitory activity. J Nat Med, 62:349-353, 2008). (Year: 2008).*
Sequence Natches_2000. (Year: 2000).*
Shiono, M. et al., Structure of commelinin, a blue complex pigment from the blue flowers of Commelina communis, Proceedings of the Japan Academy, Series B, 2008, vol. 84, pp. 452-456, (5 pages).

* cited by examiner

*Primary Examiner* — Wayne Zhong
(74) *Attorney, Agent, or Firm* — WHDA, LLP

(57) ABSTRACT

Provided is: a transgenic plant that has a modified flower color; a self- or cross-fertilized descendant of the transgenic plant; or a propagule, a portion of a plant body, tissue, or cells from the transgenic plant or the self- or cross-fertilized descendant of the transgenic plant. The present invention causes both anthocyanin delphinidin and a flavone C-glycoside that is methylated at the hydroxyl group at the 7 position to be present in the cells of a plant.

13 Claims, 5 Drawing Sheets

Specification includes a Sequence Listing.

FIG. 4
Grude protein solution extract
from only pET15b-transferred E. coli
+isovitexin
Grude protein solution extract
from DN134067-expressing E. coli
+isovitexin
Absorbance (330nm)
mA
60
40
20
0
15
20
25
30
min
Holding time
Swertisin
Isovitexin

SEQUENCE LISTING

```
<160> NUMBER OF SEQ ID NOS: 35

<210> SEQ ID NO 1
<211> LENGTH: 1781
<212> TYPE: DNA
<213> ORGANISM: Viola x wittrockiana

<400> SEQUENCE: 1

gacaacatgg caattctagt caccgacttc gttgtcgcgg ctataatttt cttgatcact      60

cggttcttag ttcgttctct tttcaagaaa ccaacccgac cgctcccccc gggtcctctc     120

ggttggccct tggtgggcgc cctccctctc ctaggcgcca tgcctcacgt cgcactagcc     180

aaactcgcta agaagtatgg tccgatcatg cacctaaaaa tgggcacgtg cgacatggtg     240

gtcgcgtcca cccccgagtc ggctcgagcc ttcctcaaaa cgctagacct caacttctcc     300

aaccgcccac ccaacgcggg cgcatcccac ctagcgtacg gcgcgcagga cttagtcttc     360

gccaagtacg gtccgaggtg gaagacttta agaaaattga gcaacctcca catgctaggc     420

gggaaggcgt tggatgattg ggcaaatgtg agggtcaccg agctaggcca catgcttaaa     480

gccatgtgcg aggcgagccg gtgcggggag cccgtggtgc tggccgagat gctcacgtac     540

gccatggcga acatgatcgg tcaagtgata ctcagccggc gcgtgttcgt gaccaaaggg     600

accgagtcta acgagttcaa agacatggtg gtcgagttga tgacgtccgc cgggtacttc     660

aacatcggtg acttcatacc ctcgatcgct tggatggatt tgcaagggat cgagcgaggg     720

atgaagaagc tgcacacgaa gtttgatgtg ttattgacga agatggtgaa ggagcataga     780

gcgacgagtc atgagcgcaa agggaaggca gatttcctcg acgttctctt ggaagaatgc     840

gacaatacaa atggggagaa gcttagtatt accaatatca aagctgtcct tttgaatcta     900

ttcacggcgg gcacggacac atcttcgagc ataatcgaat gggcgttaac ggagatgatc     960

aagaatccga cgatcttaaa aaaggcgcaa gaggagatgg atcgagtcat cggtcgtgat    1020

cggaggctgc tcgaatcgga catatcgagc ctcccgtacc tacaagccat tgctaaagaa    1080

acgtatcgca aacacccgtc gacgcctctc aacttgccga ggattgcgat ccaagcatgt    1140

gaagttgatg gctactacat ccctaaggac gcgaggctta gcgtgaacat ttgggcgatc    1200

ggtcgggacc cgaatgtttg ggagaatccg ttggagttct tgccggaaag attcttgtct    1260

gaagagaatg ggaagatcaa tcccggtggg aatgattttg agctgattcc gtttggagcc    1320

gggaggagaa tttgtgcggg gacaaggatg ggaatggtcc ttgtaagtta tattttgggc    1380
```

```
actttggtcc attcttttga ttggaaatta ccaaatggtg tcgctgagct taatatggat   1440

gaaagttttg ggcttgcatt gcaaaaggcc gtgccgctct cggccttggt cagcccacgg   1500

ttggcctcaa acgcgtacgc aacctgagct aatgggctgg gcctagtttt gtgggcctta   1560

atttagagac ttttgtgttt taaggtgtgt actttattaa ttgggtgctt aaatgtgtgt   1620

tttaatttgt atttatggtt aattatgact ttattgtata attatttatt tttcccttct   1680

gggtatttta tccatttaat ttttcttcag aattatgatc atagttatca gaataaaatt   1740

gaaaataatg aatcggaaaa aaaaaaaaaa aaaaaaaaaa a                       1781
```

```
<210> SEQ ID NO 2
<211> LENGTH: 506
<212> TYPE: PRT
<213> ORGANISM: Viola x wittrockiana

<400> SEQUENCE: 2

Met Ala Ile Leu Val Thr Asp Phe Val Val Ala Ala Ile Ile Phe Leu
1               5                   10                  15

Ile Thr Arg Phe Leu Val Arg Ser Leu Phe Lys Lys Pro Thr Arg Pro
            20                  25                  30

Leu Pro Pro Gly Pro Leu Gly Trp Pro Leu Val Gly Ala Leu Pro Leu
        35                  40                  45

Leu Gly Ala Met Pro His Val Ala Leu Ala Lys Leu Ala Lys Lys Tyr
    50                  55                  60

Gly Pro Ile Met His Leu Lys Met Gly Thr Cys Asp Met Val Val Ala
65                  70                  75                  80

Ser Thr Pro Glu Ser Ala Arg Ala Phe Leu Lys Thr Leu Asp Leu Asn
                85                  90                  95

Phe Ser Asn Arg Pro Pro Asn Ala Gly Ala Ser His Leu Ala Tyr Gly
            100                 105                 110

Ala Gln Asp Leu Val Phe Ala Lys Tyr Gly Pro Arg Trp Lys Thr Leu
        115                 120                 125

Arg Lys Leu Ser Asn Leu His Met Leu Gly Gly Lys Ala Leu Asp Asp
    130                 135                 140

Trp Ala Asn Val Arg Val Thr Glu Leu Gly His Met Leu Lys Ala Met
145                 150                 155                 160

Cys Glu Ala Ser Arg Cys Gly Glu Pro Val Val Leu Ala Glu Met Leu
                165                 170                 175

Thr Tyr Ala Met Ala Asn Met Ile Gly Gln Val Ile Leu Ser Arg Arg
            180                 185                 190

Val Phe Val Thr Lys Gly Thr Glu Ser Asn Glu Phe Lys Asp Met Val
        195                 200                 205

Val Glu Leu Met Thr Ser Ala Gly Tyr Phe Asn Ile Gly Asp Phe Ile
    210                 215                 220

Pro Ser Ile Ala Trp Met Asp Leu Gln Gly Ile Glu Arg Gly Met Lys
225                 230                 235                 240

Lys Leu His Thr Lys Phe Asp Val Leu Leu Thr Lys Met Val Lys Glu
                245                 250                 255

His Arg Ala Thr Ser His Glu Arg Lys Gly Lys Ala Asp Phe Leu Asp
            260                 265                 270

Val Leu Leu Glu Glu Cys Asp Asn Thr Asn Gly Glu Lys Leu Ser Ile
        275                 280                 285

Thr Asn Ile Lys Ala Val Leu Leu Asn Leu Phe Thr Ala Gly Thr Asp
    290                 295                 300
```

```
Thr Ser Ser Ser Ile Ile Glu Trp Ala Leu Thr Glu Met Ile Lys Asn
305                 310                 315                 320

Pro Thr Ile Leu Lys Lys Ala Gln Glu Glu Met Asp Arg Val Ile Gly
                325                 330                 335

Arg Asp Arg Arg Leu Leu Glu Ser Asp Ile Ser Ser Leu Pro Tyr Leu
            340                 345                 350

Gln Ala Ile Ala Lys Glu Thr Tyr Arg Lys His Pro Ser Thr Pro Leu
        355                 360                 365

Asn Leu Pro Arg Ile Ala Ile Gln Ala Cys Glu Val Asp Gly Tyr Tyr
    370                 375                 380

Ile Pro Lys Asp Ala Arg Leu Ser Val Asn Ile Trp Ala Ile Gly Arg
385                 390                 395                 400

Asp Pro Asn Val Trp Glu Asn Pro Leu Glu Phe Leu Pro Glu Arg Phe
                405                 410                 415

Leu Ser Glu Glu Asn Gly Lys Ile Asn Pro Gly Gly Asn Asp Phe Glu
            420                 425                 430

Leu Ile Pro Phe Gly Ala Gly Arg Arg Ile Cys Ala Gly Thr Arg Met
        435                 440                 445

Gly Met Val Leu Val Ser Tyr Ile Leu Gly Thr Leu Val His Ser Phe
    450                 455                 460

Asp Trp Lys Leu Pro Asn Gly Val Ala Glu Leu Asn Met Asp Glu Ser
465                 470                 475                 480

Phe Gly Leu Ala Leu Gln Lys Ala Val Pro Leu Ser Ala Leu Val Ser
                485                 490                 495

Pro Arg Leu Ala Ser Asn Ala Tyr Ala Thr
            500                 505
```

<210> SEQ ID NO 3
<211> LENGTH: 1920
<212> TYPE: DNA
<213> ORGANISM: Glycyrrhiza echinata

<400> SEQUENCE: 3

```
ccccaatttc ctctatcata agccattccg ttgattgagc ttcctttccg tgaaaaaaat     60

aactaagcga tatggaacct caactcgtag cagtgtctgt gttggtttca gcacttatct    120

gctacttctt tttccggcca tatttccacc gttacggaaa aaaccttcca ccatctcctt    180

ttttccggct tccaataatt ggccacatgc acatgttagg tccccttctt caccaatcct    240

tccacaacct ctcccaccgt tacggtcctc tgttttcact taactttggc tctgttctct    300

gtgtcgttgc ttcaacccct cactttgcca aacaactcct tcaaaccaac gaactcgcct    360

ttaactgtcg cattgaatca accgccgtta aaaaactcac ttacgagtct tccttggcct    420

tcgcacctta cggtgattac tggaggttca ttaagaagct gagcatgaac gagcttttgg    480

gctctcgtag cataaacaac ttccaacacc tacgagcaca agagacccat caattgttaa    540

ggcttttgtc caacagggca agagcgtttg aggccgtgaa tatcaccgag gagcttctta    600

agttgaccaa caacgttatt tctataatga tggttgggga ggcagaggag gcaagggatg    660

tggtgcgtga tgtgacggag atatttggag agtttaatgt ttcggatttt atttggttgt    720

ttaagaagat ggacttgcag ggtttggga agaggattga ggatttgttt cagaggtttg    780

atacgttggt ggaaaggatt attagcaagc gggagcagac gaggaaagac agaaggagga    840

atgggaagaa gggtgagcag gggagtggtg atgggatcag agactttctt gatatcttgc    900

ttgactgtac tgaggatgag aattccgaga ttaaaatcca aagggttcac attaaggcct    960
```

```
tgattatgga tttcttcact gcagggacgg ataccacagc gatttcaaca gagtgggcat   1020

tagtggagct cgtcaagaaa ccctccgtgc tacaaaaagt tcgtgaagag atagacaatg   1080

tcgtaggaaa agacagactt gttgaggaat ctgattgtcc taatctccca tatctccaag   1140

ccattcttaa agaaacattc cgtttgcacc caccggttcc tatggttaca agaagatgcg   1200

tggcagagtg cacggtagag aattacgtca tcccagaaga ctcacttctc tttgtgaatg   1260

tttggtccat cggaagaaac ccaaagtttt gggacaaccc attggagttt cgccccgaac   1320

gattcttaaa actagaagga gattccagtg gagttgttga tgtgagggga agccattttc   1380

agcttctgcc atttgggtct ggaaggagga tgtgccctgg tgtgtccttg gctatgcaag   1440

aggtgccagc actacttggt gctataatcc agtgctttga tttccacgtt gtgggtccca   1500

aaggtgagat tttgaagggt gatgacatag tcattaatgt ggatgaaagg ccaggattga   1560

cggctccaag ggcacataac cttgtgtgtg ttcccgttga tagaacaagt ggcggtggac   1620

ccctcaaaat cattgaatgt tgattattcg tctcttgaat ttggatctgt gtgtggcttt   1680

gaataacatg tatggtgtat gtatgtatgt gttcttttct ttctttctaa ttctgatcag   1740

tagcgtacac taggcactag ccttcgttag tggcaataac ttcggcaaat taacgaacat   1800

atgctgttca gagatatttt ttgccatgta tcgtcattct attctaggtt gtttttccgt   1860

tttccttatt acattctatg ataaatataa taaattgagt aatattatag tctcttaatt   1920
```

```
<210> SEQ ID NO 4
<211> LENGTH: 523
<212> TYPE: PRT
<213> ORGANISM: Glycyrrhiza echinata

<400> SEQUENCE: 4

Met Glu Pro Gln Leu Val Ala Val Ser Val Leu Val Ser Ala Leu Ile
1               5                   10                  15

Cys Tyr Phe Phe Phe Arg Pro Tyr Phe His Arg Tyr Gly Lys Asn Leu
            20                  25                  30

Pro Pro Ser Pro Phe Phe Arg Leu Pro Ile Ile Gly His Met His Met
        35                  40                  45

Leu Gly Pro Leu Leu His Gln Ser Phe His Asn Leu Ser His Arg Tyr
    50                  55                  60

Gly Pro Leu Phe Ser Leu Asn Phe Gly Ser Val Leu Cys Val Val Ala
65                  70                  75                  80

Ser Thr Pro His Phe Ala Lys Gln Leu Leu Gln Thr Asn Glu Leu Ala
                85                  90                  95

Phe Asn Cys Arg Ile Glu Ser Thr Ala Val Lys Lys Leu Thr Tyr Glu
            100                 105                 110

Ser Ser Leu Ala Phe Ala Pro Tyr Gly Asp Tyr Trp Arg Phe Ile Lys
        115                 120                 125

Lys Leu Ser Met Asn Glu Leu Leu Gly Ser Arg Ser Ile Asn Asn Phe
    130                 135                 140

Gln His Leu Arg Ala Gln Glu Thr His Gln Leu Leu Arg Leu Leu Ser
145                 150                 155                 160

Asn Arg Ala Arg Ala Phe Glu Ala Val Asn Ile Thr Glu Glu Leu Leu
                165                 170                 175

Lys Leu Thr Asn Asn Val Ile Ser Ile Met Met Val Gly Glu Ala Glu
            180                 185                 190

Glu Ala Arg Asp Val Val Arg Asp Val Thr Glu Ile Phe Gly Glu Phe
        195                 200                 205
```

```
Asn Val Ser Asp Phe Ile Trp Leu Phe Lys Lys Met Asp Leu Gln Gly
    210                 215                 220

Phe Gly Lys Arg Ile Glu Asp Leu Phe Gln Arg Phe Asp Thr Leu Val
225                 230                 235                 240

Glu Arg Ile Ile Ser Lys Arg Glu Gln Thr Arg Lys Asp Arg Arg Arg
                245                 250                 255

Asn Gly Lys Lys Gly Glu Gln Gly Ser Gly Asp Gly Ile Arg Asp Phe
            260                 265                 270

Leu Asp Ile Leu Leu Asp Cys Thr Glu Asp Glu Asn Ser Glu Ile Lys
        275                 280                 285

Ile Gln Arg Val His Ile Lys Ala Leu Ile Met Asp Phe Phe Thr Ala
    290                 295                 300

Gly Thr Asp Thr Thr Ala Ile Ser Thr Glu Trp Ala Leu Val Glu Leu
305                 310                 315                 320

Val Lys Lys Pro Ser Val Leu Gln Lys Val Arg Glu Glu Ile Asp Asn
                325                 330                 335

Val Val Gly Lys Asp Arg Leu Val Glu Glu Ser Asp Cys Pro Asn Leu
            340                 345                 350

Pro Tyr Leu Gln Ala Ile Leu Lys Glu Thr Phe Arg Leu His Pro Pro
        355                 360                 365

Val Pro Met Val Thr Arg Arg Cys Val Ala Glu Cys Thr Val Glu Asn
    370                 375                 380

Tyr Val Ile Pro Glu Asp Ser Leu Leu Phe Val Asn Val Trp Ser Ile
385                 390                 395                 400

Gly Arg Asn Pro Lys Phe Trp Asp Asn Pro Leu Glu Phe Arg Pro Glu
                405                 410                 415

Arg Phe Leu Lys Leu Glu Gly Asp Ser Ser Gly Val Val Asp Val Arg
            420                 425                 430

Gly Ser His Phe Gln Leu Leu Pro Phe Gly Ser Gly Arg Arg Met Cys
        435                 440                 445

Pro Gly Val Ser Leu Ala Met Gln Glu Val Pro Ala Leu Leu Gly Ala
    450                 455                 460

Ile Ile Gln Cys Phe Asp Phe His Val Val Gly Pro Lys Gly Glu Ile
465                 470                 475                 480

Leu Lys Gly Asp Asp Ile Val Ile Asn Val Asp Glu Arg Pro Gly Leu
                485                 490                 495

Thr Ala Pro Arg Ala His Asn Leu Val Cys Val Pro Val Asp Arg Thr
            500                 505                 510

Ser Gly Gly Gly Pro Leu Lys Ile Ile Glu Cys
        515                 520
```

<210> SEQ ID NO 5
<211> LENGTH: 1624
<212> TYPE: DNA
<213> ORGANISM: Oryza sativa Japonica Group

<400> SEQUENCE: 5

```
tgcagctacc tacacgaccc aagcagcagc agcacgcaca cggcacacct actcccgctt      60

cacatcgcca ggtgttcgac cgaggccacc accggcaatg ccgagctctg gcgacgcggc     120

gggcaggcgg ccgcatgtgg tgctcatccc gagcgccggc atgggccacc tcgtcccctt     180

cggccgcctc gccgtggcgc tctcctccgg ccacggctgc gacgtctccc tcgtcacggt     240

gctccccacg gtgtccaccg cggagtcgaa gcacctcgac gcgctgttcg acgcgttccc     300
```

ggcggtgcgg cggctcgact tcgagctcgc gccgttcgac gcgtcggagt tccccagcgc 360
cgacccgttc ttcctccggt tcgaggccat gcggcggtcg gcgccgctgc tcggcccgct 420
cctcaccggc gccggcgcat cggcgctcgc cacggacatc gcgctgacat ccgtcgtcat 480
acccgtggcg aaggagcagg gcctcccgtg ccacatcctc ttcaccgcct ccgccgcgat 540
gctctccctc tgcgcctact tccccacata cctcgacgcc aacgctggcg acggcggcgg 600
cgtcggcgac gtcgacatcc ccggcgtgta ccgcatcccc aaggcctcca tcccgcaggc 660
gctgcacgat cccaaccacc tcttcacccg ccagttcgtc gccaacggcc ggagcctcac 720
gagcgccgcc ggcatcctcg tcaacacgtt cgacgccttg gagccggagg ccgtcgcggc 780
cctgcagcag ggcaaggtcg cctccggctt cccgccggtg ttcgccgtgg ggccacttct 840
cccggcgagc aaccaggcaa aagatccgca ggcaaactac atggagtggc tcgacgcgca 900
gccggcgcgg tcggtggtgt acgtgagctt cggcagccgc aaggccatct caggggagca 960
gctcagggag ctcgccgccg ggctggagac cagcggccac aggttcctgt gggtggtgaa 1020
gagcaccgtc gtggacaggg acgacgccgc cgagctcggc gagctgctcg gcgaggggtt 1080
cttgaagcgg gtggagaagc gaggcctcgt caccaaggca tgggtggatc aggaagaggt 1140
cctgaagcac gagtccgtgg cgctgttcgt gagccactgc ggctggaact cggtgacgga 1200
ggcggcggcg agcggcgtcc cggtgctggc gctgccgagg ttcggcgacc agcgggtgaa 1260
ctccggcgtg gtggcgcgcg ccgggctcgg cgtgtgggcg gacacctgga gctgggaggg 1320
ggaagccggg gtgatcggcg cagaggagat atcggagaag gtgaaggcgg cgatggcgga 1380
cgaggcgttg cgtaggaagg cggcgagcct cgccaaggcc gccgcgaagg ccgtcgccgg 1440
cggtggatcg agccaccgtt gtctggtcga gttcgcgcgg ctgtgccaag gggaacatg 1500 tcgcactaat tgagtactga gacatgggtt ctaatttaaa taattcggat ggaatccttg 1560
ttacagattt taaattggaa taagaaatga agccatatga aatttggaag aattttaaat 1620
ttaa 1624

<210> SEQ ID NO 6
<211> LENGTH: 471
<212> TYPE: PRT
<213> ORGANISM: Oryza sativa Japonica Group

<400> SEQUENCE: 6

Met Pro Ser Ser Gly Asp Ala Ala Gly Arg Arg Pro His Val Val Leu
1 5 10 15

Ile Pro Ser Ala Gly Met Gly His Leu Val Pro Phe Gly Arg Leu Ala
20 25 30

Val Ala Leu Ser Ser Gly His Gly Cys Asp Val Ser Leu Val Thr Val
35 40 45

Leu Pro Thr Val Ser Thr Ala Glu Ser Lys His Leu Asp Ala Leu Phe
50 55 60

Asp Ala Phe Pro Ala Val Arg Arg Leu Asp Phe Glu Leu Ala Pro Phe
65 70 75 80

Asp Ala Ser Glu Phe Pro Ser Ala Asp Pro Phe Phe Leu Arg Phe Glu
85 90 95

Ala Met Arg Arg Ser Ala Pro Leu Leu Gly Pro Leu Leu Thr Gly Ala
100 105 110

Gly Ala Ser Ala Leu Ala Thr Asp Ile Ala Leu Thr Ser Val Val Ile
115 120 125

Pro Val Ala Lys Glu Gln Gly Leu Pro Cys His Ile Leu Phe Thr Ala

```
    130                 135                 140

Ser Ala Ala Met Leu Ser Leu Cys Ala Tyr Phe Pro Thr Tyr Leu Asp
145                 150                 155                 160

Ala Asn Ala Gly Asp Gly Gly Gly Val Gly Asp Val Asp Ile Pro Gly
                165                 170                 175

Val Tyr Arg Ile Pro Lys Ala Ser Ile Pro Gln Ala Leu His Asp Pro
            180                 185                 190

Asn His Leu Phe Thr Arg Gln Phe Val Ala Asn Gly Arg Ser Leu Thr
        195                 200                 205

Ser Ala Ala Gly Ile Leu Val Asn Thr Phe Asp Ala Leu Glu Pro Glu
    210                 215                 220

Ala Val Ala Ala Leu Gln Gln Gly Lys Val Ala Ser Gly Phe Pro Pro
225                 230                 235                 240

Val Phe Ala Val Gly Pro Leu Leu Pro Ala Ser Asn Gln Ala Lys Asp
                245                 250                 255

Pro Gln Ala Asn Tyr Met Glu Trp Leu Asp Ala Gln Pro Ala Arg Ser
            260                 265                 270

Val Val Tyr Val Ser Phe Gly Ser Arg Lys Ala Ile Ser Gly Glu Gln
        275                 280                 285

Leu Arg Glu Leu Ala Ala Gly Leu Glu Thr Ser Gly His Arg Phe Leu
    290                 295                 300

Trp Val Val Lys Ser Thr Val Val Asp Arg Asp Asp Ala Ala Glu Leu
305                 310                 315                 320

Gly Glu Leu Leu Gly Glu Gly Phe Leu Lys Arg Val Glu Lys Arg Gly
                325                 330                 335

Leu Val Thr Lys Ala Trp Val Asp Gln Glu Glu Val Leu Lys His Glu
            340                 345                 350

Ser Val Ala Leu Phe Val Ser His Cys Gly Trp Asn Ser Val Thr Glu
        355                 360                 365

Ala Ala Ala Ser Gly Val Pro Val Leu Ala Leu Pro Arg Phe Gly Asp
    370                 375                 380

Gln Arg Val Asn Ser Gly Val Val Ala Arg Ala Gly Leu Gly Val Trp
385                 390                 395                 400

Ala Asp Thr Trp Ser Trp Glu Gly Glu Ala Gly Val Ile Gly Ala Glu
                405                 410                 415

Glu Ile Ser Glu Lys Val Lys Ala Ala Met Ala Asp Glu Ala Leu Arg
            420                 425                 430

Arg Lys Ala Ala Ser Leu Ala Lys Ala Ala Ala Lys Ala Val Ala Gly
        435                 440                 445

Gly Gly Ser Ser His Arg Cys Leu Val Glu Phe Ala Arg Leu Cys Gln
    450                 455                 460

Gly Gly Thr Cys Arg Thr Asn
465                 470


<210> SEQ ID NO 7
<211> LENGTH: 1178
<212> TYPE: DNA
<213> ORGANISM: Glycyrrhiza echinata

<400> SEQUENCE: 7

ctattccatt cttttccgtt caatggcttc ttcaacctca acaaccactt ccaaagagat      60

agacagggag cttcctcctc ttctccgggt ctacaaagat ggaaccgtgg agcgattcct     120

aggctcatcg tttgtaccac cttcccctga agaccccgaa acaggggttt ccacgaaaga     180
```

-continued

```
catagtaatc tcagaaaacc ccaccatctc tgctcgcgtt taccttccaa aactgaacaa    240

caccaccgag aagctcccaa tcttggtcta ctaccacggc ggcgcgttct gcctcgaatc    300

tgctttctcc ttcctccacc aacgctacct caacatcgtt gcttccaagg caaatgttct    360

agtagtttcc atcgagtaca ggctcgcccc agaacaccct cttccggctg catatgaaga    420

tggttggtat gctctcaaat gggtcacttc tcattccaca aacaacaaca aacccaccaa    480

cgctgaccca tggttgatca aacacggtga tttcaacagg ttctacatcg gggtgacac     540

ttctggtgca aacattgcac acaatgcggc tcttcgtgtt ggtgctgagg ccttacctgg    600

ggggctgaga atagcagggg tactctctgc ttttcctctg ttttggggtt ctaagcctgt    660

tttgtcagaa cctgtcgagg ggcatgagaa gagctcaccc atgcaagttt ggaactttgt    720

gtacccagat gcaccaggtg gcatagataa cccactaatc aacccctttgg cacctggggc   780

tcctaacttg gccacacttg ggtgtccaaa gatgttggtc tttgttgcgg ggaaggatga    840

tcttagagac agagggattt ggtactatga ggctgtgaag gaaagtgggt ggaaagggga    900

tgtggaactt gctcagtatg aaggggagga acattgcttc cagatctacc atcctgaaac    960

tgagaattct aaagatctca tcggtcgcat cgcttccttc cttgtttgaa cacacagcta   1020

gacttcgggt tcattattac tagtatgtga ttttgtttga ttaatgtttt gtcatcaatt   1080

gatgggtaat aaattggatt agggtactag ggttcctgaa tcatgctcaa ttttactttt   1140

cctgtactat tacttgttta tgaaagaatt aatggcat                            1178
```

```
<210> SEQ ID NO 8
<211> LENGTH: 328
<212> TYPE: PRT
<213> ORGANISM: Glycyrrhiza echinata

<400> SEQUENCE: 8

Met Ala Ser Ser Thr Ser Thr Thr Thr Ser Lys Glu Ile Asp Arg Glu
1               5                   10                  15

Leu Pro Pro Leu Leu Arg Val Tyr Lys Asp Gly Thr Val Glu Arg Phe
            20                  25                  30

Leu Gly Ser Ser Phe Val Pro Pro Ser Pro Glu Asp Pro Glu Thr Gly
        35                  40                  45

Val Ser Thr Lys Asp Ile Val Ile Ser Glu Asn Pro Thr Ile Ser Ala
    50                  55                  60

Arg Val Tyr Leu Pro Lys Leu Asn Asn Thr Thr Glu Lys Leu Pro Ile
65                  70                  75                  80

Leu Val Tyr Tyr His Gly Gly Ala Phe Cys Leu Glu Ser Ala Phe Ser
                85                  90                  95

Phe Leu His Gln Arg Tyr Leu Asn Ile Val Ala Ser Lys Ala Asn Val
            100                 105                 110

Leu Val Val Ser Ile Glu Tyr Arg Leu Ala Pro Glu His Pro Leu Pro
        115                 120                 125

Ala Ala Tyr Glu Asp Gly Trp Tyr Ala Leu Lys Trp Val Thr Ser His
    130                 135                 140

Ser Thr Asn Asn Asn Lys Pro Thr Asn Ala Asp Pro Trp Leu Ile Lys
145                 150                 155                 160

His Gly Asp Phe Asn Arg Phe Tyr Ile Gly Gly Asp Thr Ser Gly Ala
                165                 170                 175

Asn Ile Ala His Asn Ala Ala Leu Arg Val Gly Ala Glu Ala Leu Pro
            180                 185                 190

Gly Gly Leu Arg Ile Ala Gly Val Leu Ser Ala Phe Pro Leu Phe Trp
```

```
        195                 200                 205

Gly Ser Lys Pro Val Leu Ser Glu Pro Val Glu Gly His Glu Lys Ser
    210                 215                 220

Ser Pro Met Gln Val Trp Asn Phe Val Tyr Pro Asp Ala Pro Gly Gly
225                 230                 235                 240

Ile Asp Asn Pro Leu Ile Asn Pro Leu Ala Pro Gly Ala Pro Asn Leu
                245                 250                 255

Ala Thr Leu Gly Cys Pro Lys Met Leu Val Phe Val Ala Gly Lys Asp
            260                 265                 270

Asp Leu Arg Asp Arg Gly Ile Trp Tyr Tyr Glu Ala Val Lys Glu Ser
        275                 280                 285

Gly Trp Lys Gly Asp Val Glu Leu Ala Gln Tyr Glu Gly Glu Glu His
    290                 295                 300

Cys Phe Gln Ile Tyr His Pro Glu Thr Glu Asn Ser Lys Asp Leu Ile
305                 310                 315                 320

Gly Arg Ile Ala Ser Phe Leu Val
                325
```

<210> SEQ ID NO 9
<211> LENGTH: 1927
<212> TYPE: DNA
<213> ORGANISM: Campanula medium

<400> SEQUENCE: 9

```
accaaatgag ctttgtaatt tgagattaat cataattgca tgctcaacta acattctgta     60

ttcatatatc catatgtatt ttgacctata gatattacat tacaccttga ggcctttata    120

tatagagagt gtatctactt cccttaatat caccttttca ttcaacaagt gaagccacca    180

tgtctataga catatccacc ctcttctatg aacttgttgc agcaatttca ctctacttag    240

ctacctactc tttcattcgt ttcctcttca aaccctctca ccaccaccac ctccctcccg    300

gcccaaccgg atggccgatc atcggagccc ttccactctt aggcaccatg ccacatgttt    360

ccttagccga catggccgtt aaatacggtc ctataatgta cctaaaactt ggttcaaagg    420

gcaccgtcgt ggcctcaaat ccaaaagccg cccgagcctt cttgaaaacc catgatgcca    480

atttttctaa ccgtccgatt gatgggggcc ctacctacct cgcgtataat gcacaagaca    540

tggtttttgc agaatatggc ccaaaatgga agcttttgcg aaagctatgt agcttgcaca    600

tgttaggccc gaaggcactc gaggattggg ctcatgtcaa agtttcagag gtcggtcata    660

tgctcaaaga aatgtacgag caatcgagta agtcagtgcc agtgccagtg gtggtgccag    720

agatgttaac ttatgccatg gctaatatga ttggacgaat catactcagc cgacgccctt    780

ttgttatcac gagcaaatta gactcgtctg cttctgcttc tgcttctgtt agtgaattcc    840

aatatatggt tatggagctc atgaggatgg cagggttgtt caatattggt gatttcatac    900

catatattgc atggatggat ttgcaaggca ttcaacgtga tatgaaggtt atacagaaaa    960

agtttgatgt cttgttgaac aaaatgatca aggaacatac agaatccgct catgatcgca   1020

aagataatcc tgattttctt gatattctta tggcggctac ccaagaaaac acggagggaa   1080

ttcagcttaa tcttgtaaat gttaaggcac ttcttttgga tttattcacg gcgggcacgg   1140

atacatcatc aagtgtgatc gaatgggcac tagccgaaat gttgaaccat cgacagatcc   1200

taaaccgggc ccacgaagaa atggaccaag tcattggcag aaacagaaga ctagaacaat   1260

ctgacatacc aaacttgcca tatttccaag ccatatgcaa agaaacattc cgaaaacacc   1320

cttccacgcc cttaaacctc ccaagaatct caacagaagc atgtgaagtg gacggatttc   1380
```

acataccaaa aaacactaga ctaatagtga acatatgggc aatagggagg gaccctaaag 1440
tgtgggaaaa tccattagat tttactccgg aacgtttctt gagtgaaaaa cacgcgaaaa 1500
ttgatccgcg aggtaatcat tttgagttaa tcccatttgg ggctggacga aggatatgtg 1560
caggggctag aatgggagcg gcctcggtcg agtacatatt aggtacattg gtgcactcat 1620
ttgattggaa attgcctgat ggagttgtgg aagttaatat ggaagagagc tttgggatcg 1680
cattgcaaaa aaaagtgcct ctttctgcta ttgttactcc aagattgcct ccaagttctt 1740
acactgtcta ggcaaatgct tatatatatg aataattgat tgagttgttt agttgtatga 1800
aagatttgag aaaataaatt attaggtttt gcaccattat gttgagatgg ttgttgttag 1860
tgttaaggaa gtcgattgta gtaataataa ttttattttt ttcgaaaaaa aaaaaaaaaa 1920
aaaaaaa 1927

<210> SEQ ID NO 10
<211> LENGTH: 523
<212> TYPE: PRT
<213> ORGANISM: Campanula medium

<400> SEQUENCE: 10

Met Ser Ile Asp Ile Ser Thr Leu Phe Tyr Glu Leu Val Ala Ala Ile
1 5 10 15

Ser Leu Tyr Leu Ala Thr Tyr Ser Phe Ile Arg Phe Leu Phe Lys Pro
20 25 30

Ser His His His His Leu Pro Pro Gly Pro Thr Gly Trp Pro Ile Ile
35 40 45

Gly Ala Leu Pro Leu Leu Gly Thr Met Pro His Val Ser Leu Ala Asp
50 55 60

Met Ala Val Lys Tyr Gly Pro Ile Met Tyr Leu Lys Leu Gly Ser Lys
65 70 75 80

Gly Thr Val Val Ala Ser Asn Pro Lys Ala Ala Arg Ala Phe Leu Lys
85 90 95

Thr His Asp Ala Asn Phe Ser Asn Arg Pro Ile Asp Gly Gly Pro Thr
100 105 110

Tyr Leu Ala Tyr Asn Ala Gln Asp Met Val Phe Ala Glu Tyr Gly Pro
115 120 125

Lys Trp Lys Leu Leu Arg Lys Leu Cys Ser Leu His Met Leu Gly Pro
130 135 140

Lys Ala Leu Glu Asp Trp Ala His Val Lys Val Ser Glu Val Gly His
145 150 155 160

Met Leu Lys Glu Met Tyr Glu Gln Ser Ser Lys Ser Val Pro Val Pro
165 170 175

Val Val Val Pro Glu Met Leu Thr Tyr Ala Met Ala Asn Met Ile Gly
180 185 190

Arg Ile Ile Leu Ser Arg Arg Pro Phe Val Ile Thr Ser Lys Leu Asp
195 200 205

Ser Ser Ala Ser Ala Ser Ala Ser Val Ser Glu Phe Gln Tyr Met Val
210 215 220

Met Glu Leu Met Arg Met Ala Gly Leu Phe Asn Ile Gly Asp Phe Ile
225 230 235 240

Pro Tyr Ile Ala Trp Met Asp Leu Gln Gly Ile Gln Arg Asp Met Lys
245 250 255

Val Ile Gln Lys Lys Phe Asp Val Leu Leu Asn Lys Met Ile Lys Glu
260 265 270

His Thr Glu Ser Ala His Asp Arg Lys Asp Asn Pro Asp Phe Leu Asp
275 280 285

Ile Leu Met Ala Ala Thr Gln Glu Asn Thr Glu Gly Ile Gln Leu Asn
290 295 300

Leu Val Asn Val Lys Ala Leu Leu Leu Asp Leu Phe Thr Ala Gly Thr
305 310 315 320

Asp Thr Ser Ser Ser Val Ile Glu Trp Ala Leu Ala Glu Met Leu Asn
325 330 335

His Arg Gln Ile Leu Asn Arg Ala His Glu Glu Met Asp Gln Val Ile
340 345 350

Gly Arg Asn Arg Arg Leu Glu Gln Ser Asp Ile Pro Asn Leu Pro Tyr
355 360 365

Phe Gln Ala Ile Cys Lys Glu Thr Phe Arg Lys His Pro Ser Thr Pro
370 375 380

Leu Asn Leu Pro Arg Ile Ser Thr Glu Ala Cys Glu Val Asp Gly Phe
385 390 395 400

His Ile Pro Lys Asn Thr Arg Leu Ile Val Asn Ile Trp Ala Ile Gly
405 410 415

Arg Asp Pro Lys Val Trp Glu Asn Pro Leu Asp Phe Thr Pro Glu Arg
420 425 430

Phe Leu Ser Glu Lys His Ala Lys Ile Asp Pro Arg Gly Asn His Phe
435 440 445

Glu Leu Ile Pro Phe Gly Ala Gly Arg Arg Ile Cys Ala Gly Ala Arg
450 455 460

Met Gly Ala Ala Ser Val Glu Tyr Ile Leu Gly Thr Leu Val His Ser
465 470 475 480

Phe Asp Trp Lys Leu Pro Asp Gly Val Val Glu Val Asn Met Glu Glu
485 490 495

Ser Phe Gly Ile Ala Leu Gln Lys Lys Val Pro Leu Ser Ala Ile Val
500 505 510

Thr Pro Arg Leu Pro Pro Ser Ser Tyr Thr Val
515 520

<210> SEQ ID NO 11
<211> LENGTH: 1404
<212> TYPE: DNA
<213> ORGANISM: Oryza sativa Japonica Group

<400> SEQUENCE: 11
cgtattgctg catatatacg gtccctcgcg gcctcatgtc gtggtatttg tctgcaccac 60
acaaccgcgc tctaattgct tcgatttggg agtaagcttt accaggagca gtgcgatgga 120
ttccagcagc gccgagatcc tcatcgacct cggtggcttc cggctataca aagatggcca 180
cgccgaccgt gccggcggca tggagagtgt gcctgccggc tacgacgacg agaccggcgt 240
cacgtccaag gacgtcgtca tcgacgctgt caccggcgtg tccgcgcgcc tctacctacc 300
accgtgcatc cagccagcta ccgacgacga cggtaagaag ctcccgatcc tcctcttctt 360
ccatgctggc tacttcgtcg tcgggtcagc gagctggcct cctgtccacc gctacaccaa 420
ctctgtcgtc gcaagcgccc gcgtcgtcgc cgtcgccgtc aactaccgcc tcgcgcccga 480
gcacctgctc ccgacagcct acgacgactc atgggcggcg ctcagctggg cggtgtccgg 540
cgccgaccct tggttgtccg cgcacggtga caccggccga gtcttcttgt ccggcgccag 600
cgccggcggg aacatagccc acaacatgac catcgccgtg ggcgtgcgcg gcctggacgc 660

-continued

```
cgtcgtaccg gcgccacgca tagagggcac gatcttgctc caccccttcct tctgcggcga     720

gacgaggatg gaggttgagc cggaggagtt ctggggcggc gtcaagaaga gatgggcggt     780

catcttcccc ggcgcgaacg gcgggctgga cgatccgcgg atgaacccga tggccgccgg     840

cgcgccgagc ctgacaaagc tggcgtgcga gaggatgctg gtctgctcgg cggggttcga     900

tccgaggagg acaagggatc gggcgtacta cgacgcagtc aaggccagcg ggtggggacg     960

cgaggtggac tggttcgagt cggagggtga gggccaccac ttcttcgtcg acaagcccgg    1020

cagccacgag gccagcaagc tcatggaacg agtggctgct ttcattgctg gccattaaac    1080

tgtgcttcca gctggataat ttgcctcgtg tttctaagag caaggataac agtagagctc    1140

actatctact attagcacat cttaaagcca acacatataa tagattagct ataaggttgg    1200

ctataatttt tcttttccta tctctatatc tcacttatac atttattatt tttgtcttgg    1260

agcttgtgat aagctagctc ttgtatgaga gccaatacct ttgatttttt gttacctctc    1320

tactccatat aagcttatag taagcttata gctcactatt atacttgctc taagatgtca    1380

aaatggtgaa tagtttatcc cgaa                                           1404


<210> SEQ ID NO 12
<211> LENGTH: 320
<212> TYPE: PRT
<213> ORGANISM: Oryza sativa Japonica Group

<400> SEQUENCE: 12

Met Asp Ser Ser Ser Ala Glu Ile Leu Ile Asp Leu Gly Gly Phe Arg
1               5                   10                  15

Leu Tyr Lys Asp Gly His Ala Asp Arg Ala Gly Gly Met Glu Ser Val
            20                  25                  30

Pro Ala Gly Tyr Asp Asp Glu Thr Gly Val Thr Ser Lys Asp Val Val
        35                  40                  45

Ile Asp Ala Val Thr Gly Val Ser Ala Arg Leu Tyr Leu Pro Pro Cys
    50                  55                  60

Ile Gln Pro Ala Thr Asp Asp Asp Gly Lys Lys Leu Pro Ile Leu Leu
65                  70                  75                  80

Phe Phe His Ala Gly Tyr Phe Val Val Gly Ser Ala Ser Trp Pro Pro
                85                  90                  95

Val His Arg Tyr Thr Asn Ser Val Val Ala Ser Ala Arg Val Val Ala
            100                 105                 110

Val Ala Val Asn Tyr Arg Leu Ala Pro Glu His Leu Leu Pro Thr Ala
        115                 120                 125

Tyr Asp Asp Ser Trp Ala Ala Leu Ser Trp Ala Val Ser Gly Ala Asp
    130                 135                 140

Pro Trp Leu Ser Ala His Gly Asp Thr Gly Arg Val Phe Leu Ser Gly
145                 150                 155                 160

Ala Ser Ala Gly Gly Asn Ile Ala His Asn Met Thr Ile Ala Val Gly
                165                 170                 175

Val Arg Gly Leu Asp Ala Val Val Pro Ala Pro Arg Ile Glu Gly Thr
            180                 185                 190

Ile Leu Leu His Pro Ser Phe Cys Gly Glu Thr Arg Met Glu Val Glu
        195                 200                 205

Pro Glu Glu Phe Trp Gly Gly Val Lys Lys Arg Trp Ala Val Ile Phe
    210                 215                 220

Pro Gly Ala Asn Gly Gly Leu Asp Asp Pro Arg Met Asn Pro Met Ala
225                 230                 235                 240
```

```
Ala Gly Ala Pro Ser Leu Thr Lys Leu Ala Cys Glu Arg Met Leu Val
                245                 250                 255

Cys Ser Ala Gly Phe Asp Pro Arg Arg Thr Arg Asp Arg Ala Tyr Tyr
            260                 265                 270

Asp Ala Val Lys Ala Ser Gly Trp Gly Arg Glu Val Asp Trp Phe Glu
        275                 280                 285

Ser Glu Gly Glu Gly His His Phe Phe Val Asp Lys Pro Gly Ser His
    290                 295                 300

Glu Ala Ser Lys Leu Met Glu Arg Val Ala Ala Phe Ile Ala Gly His
305                 310                 315                 320


<210> SEQ ID NO 13
<211> LENGTH: 1416
<212> TYPE: DNA
<213> ORGANISM: Oryza sativa Japonica Group

<400> SEQUENCE: 13

atgccgagct ctggcgacgc ggcgggcagg cggccgcatg tggtgctcat cccgagcgcc     60

ggcatgggcc acctcgtccc cttcggccgc ctcgccgtgg cgctctcctc cggccacggc    120

tgcgacgtct ccctcgtcac ggtgctcccc acggtgtcca ccgcggagtc gaagcacctc    180

gacgcgctgt tcgacgcgtt cccggcggtg cggcggctcg acttcgagct cgcgccgttc    240

gacgcgtcgg agttccccag cgccgacccg ttcttcctcc ggttcgaggc catgcggcgg    300

tcggcgccgc tgctcggccc gctcctcacc ggcgccggcg catcggcgct cgccacggac    360

atcgcgctga catccgtcgt catacccgtg gcgaaggagc agggcctccc gtgccacatc    420

ctcttcaccg cctccgccgc gatgctctcc ctctgcgcct acttccccac atacctcgac    480

gccaacgctg gcgacggcgg cggcgtcggc gacgtcgaca tccccggcgt gtaccgcatc    540

cccaaggcct ccatcccgca ggcgctgcac gatcccaacc acctcttcac ccgccagttc    600

gtcgccaacg gccggagcct cacgagcgcc gccggcatcc tcgtcaacac gttcgacgcc    660

ttggagccgg aggccgtcgc ggccctgcag cagggcaagg tcgcctccgg cttcccgccg    720

gtgttcgccg tggggccact tctcccggcg agcaaccagg caaaagatcc gcaggcaaac    780

tacatggagt ggctcgacgc gcagccggcg cggtcggtgg tgtacgtgag cttcggcagc    840

cgcaaggcca tctcagggga gcagctcagg gagctcgccg ccgggctgga gaccagcggc    900

cacaggttcc tgtgggtggt gaagagcacc gtcgtggaca gggacgacgc cgccgagctc    960

ggcgagctgc tcggcgaggg gttcttgaag cgggtggaga agcgaggcct cgtcaccaag   1020

gcatgggtgg atcaggaaga ggtcctgaag cacgagtccg tggcgctgtt cgtgagccac   1080

tgcggctgga actcggtgac ggaggcggcg gcgagcggcg tcccggtgct ggcgctgccg   1140

aggttcggcg accagcgggt gaactccggc gtggtggcgc gcgccgggct cggcgtgtgg   1200

gcggacacct ggagctggga gggggaagcc ggggtgatcg gcgcagagga gatatcggag   1260

aaggtgaagg cggcgatggc ggacgaggcg ttgcgtagga aggcggcgag cctcgccaag   1320

gccgccgcga aggccgtcgc cggcggtgga tcgagccacc gttgtctggt cgagttcgcg   1380

cggctgtgcc aagggggaac atgtcgcact aattga                               1416


<210> SEQ ID NO 14
<211> LENGTH: 471
<212> TYPE: PRT
<213> ORGANISM: Oryza sativa Japonica Group

<400> SEQUENCE: 14
```

```
Met Pro Ser Ser Gly Asp Ala Ala Gly Arg Arg Pro His Val Val Leu
1               5                   10                  15

Ile Pro Ser Ala Gly Met Gly His Leu Val Pro Phe Gly Arg Leu Ala
            20                  25                  30

Val Ala Leu Ser Ser Gly His Gly Cys Asp Val Ser Leu Val Thr Val
        35                  40                  45

Leu Pro Thr Val Ser Thr Ala Glu Ser Lys His Leu Asp Ala Leu Phe
    50                  55                  60

Asp Ala Phe Pro Ala Val Arg Arg Leu Asp Phe Glu Leu Ala Pro Phe
65                  70                  75                  80

Asp Ala Ser Glu Phe Pro Ser Ala Asp Pro Phe Phe Leu Arg Phe Glu
                85                  90                  95

Ala Met Arg Arg Ser Ala Pro Leu Leu Gly Pro Leu Leu Thr Gly Ala
            100                 105                 110

Gly Ala Ser Ala Leu Ala Thr Asp Ile Ala Leu Thr Ser Val Val Ile
        115                 120                 125

Pro Val Ala Lys Glu Gln Gly Leu Pro Cys His Ile Leu Phe Thr Ala
    130                 135                 140

Ser Ala Ala Met Leu Ser Leu Cys Ala Tyr Phe Pro Thr Tyr Leu Asp
145                 150                 155                 160

Ala Asn Ala Gly Asp Gly Gly Gly Val Gly Asp Val Asp Ile Pro Gly
                165                 170                 175

Val Tyr Arg Ile Pro Lys Ala Ser Ile Pro Gln Ala Leu His Asp Pro
            180                 185                 190

Asn His Leu Phe Thr Arg Gln Phe Val Ala Asn Gly Arg Ser Leu Thr
        195                 200                 205

Ser Ala Ala Gly Ile Leu Val Asn Thr Phe Asp Ala Leu Glu Pro Glu
    210                 215                 220

Ala Val Ala Ala Leu Gln Gln Gly Lys Val Ala Ser Gly Phe Pro Pro
225                 230                 235                 240

Val Phe Ala Val Gly Pro Leu Leu Pro Ala Ser Asn Gln Ala Lys Asp
                245                 250                 255

Pro Gln Ala Asn Tyr Met Glu Trp Leu Asp Ala Gln Pro Ala Arg Ser
            260                 265                 270

Val Val Tyr Val Ser Phe Gly Ser Arg Lys Ala Ile Ser Gly Glu Gln
        275                 280                 285

Leu Arg Glu Leu Ala Ala Gly Leu Glu Thr Ser Gly His Arg Phe Leu
    290                 295                 300

Trp Val Val Lys Ser Thr Val Val Asp Arg Asp Asp Ala Ala Glu Leu
305                 310                 315                 320

Gly Glu Leu Leu Gly Glu Gly Phe Leu Lys Arg Val Glu Lys Arg Gly
                325                 330                 335

Leu Val Thr Lys Ala Trp Val Asp Gln Glu Glu Val Leu Lys His Glu
            340                 345                 350

Ser Val Ala Leu Phe Val Ser His Cys Gly Trp Asn Ser Val Thr Glu
        355                 360                 365

Ala Ala Ala Ser Gly Val Pro Val Leu Ala Leu Pro Arg Phe Gly Asp
    370                 375                 380

Gln Arg Val Asn Ser Gly Val Val Ala Arg Ala Gly Leu Gly Val Trp
385                 390                 395                 400

Ala Asp Thr Trp Ser Trp Glu Gly Glu Ala Gly Val Ile Gly Ala Glu
                405                 410                 415

Glu Ile Ser Glu Lys Val Lys Ala Ala Met Ala Asp Glu Ala Leu Arg
```

```
        420                 425                 430

Arg Lys Ala Ala Ser Leu Ala Lys Ala Ala Ala Lys Ala Val Ala Gly
        435                 440                 445

Gly Gly Ser Ser His Arg Cys Leu Val Glu Phe Ala Arg Leu Cys Gln
    450                 455                 460

Gly Gly Thr Cys Arg Thr Asn
465                 470
```

<210> SEQ ID NO 15
<211> LENGTH: 990
<212> TYPE: DNA
<213> ORGANISM: Lotus japonicus

<400> SEQUENCE: 15

```
atggcttctg caacaaccac cccaaccaaa gagatagaca gagacctccc tcctcttctc      60

cgagtctaca aagatggaac cgtggaacgt ctcctaggct ctcctgtcgt tccagcaatc     120

cctcatgacc cagaaacaga ggtctcatca aaagacatag tcatctcaca aacccccctta     180

atctctgctc gtatccacct cccaaaacag agcaaccccc aaaacccaaa ggttccaata     240

ttgatctact accatggtgg tgcgttttgc cttgaatcag ctttctcctt cctccaccaa     300

cgctacctca acatcgtggc ttcacgatca aacgttgtgg tggtttccgt cgagtacagg     360

ctcgcgccag agcatcctct gcctgcagca tatgaagatg gttgggaagc tctgaaatgg     420

gttacctctc attccaccga caacaaaccc atcaactctg agccatggtt gatcgaacat     480

ggtgatttca gcagattcta catcggaggt gacacttcag gtgccaacat cgcataccat     540

gtgggtctcc gtgtcggtgg tggagttgag aaattgccag gggatgtgaa aattgcaggg     600

gcgttacttg cttttcccct gttttggagt tcataccctg ttttggaaga acctgttgag     660

gggtttgaac agagtttgag caggaaggtt tggaactttg tgtacccaga tgcacctggt     720

gggatcgaca accctctgat caatcctttg gctgatgggg ctccaagctt gacaacgttt     780

ggaagcaaca agatgttgat ctttgttgca gggaatgatg aactgagaga cagaggaatc     840

tggttctatg aggctgtgaa gaagagtgag tgggaaggtg atgtggaact cattcgagtg     900

gatggagagg agcattgctt ccagatttac catcctgaat ctgagaattc taaagacatg     960

atgaagcgca tagcttcttt ccttgtttga                                      990
```

<210> SEQ ID NO 16
<211> LENGTH: 329
<212> TYPE: PRT
<213> ORGANISM: Lotus japonicus

<400> SEQUENCE: 16

```
Met Ala Ser Ala Thr Thr Thr Pro Thr Lys Glu Ile Asp Arg Asp Leu
1               5                   10                  15

Pro Pro Leu Leu Arg Val Tyr Lys Asp Gly Thr Val Glu Arg Leu Leu
            20                  25                  30

Gly Ser Pro Val Val Pro Ala Ile Pro His Asp Pro Glu Thr Glu Val
        35                  40                  45

Ser Ser Lys Asp Ile Val Ile Ser Gln Thr Pro Leu Ile Ser Ala Arg
    50                  55                  60

Ile His Leu Pro Lys Gln Ser Asn Pro Gln Asn Pro Lys Val Pro Ile
65                  70                  75                  80

Leu Ile Tyr Tyr His Gly Gly Ala Phe Cys Leu Glu Ser Ala Phe Ser
                85                  90                  95
```

```
Phe Leu His Gln Arg Tyr Leu Asn Ile Val Ala Ser Arg Ser Asn Val
            100                 105                 110

Val Val Val Ser Val Glu Tyr Arg Leu Ala Pro Glu His Pro Leu Pro
        115                 120                 125

Ala Ala Tyr Glu Asp Gly Trp Glu Ala Leu Lys Trp Val Thr Ser His
    130                 135                 140

Ser Thr Asp Asn Lys Pro Ile Asn Ser Glu Pro Trp Leu Ile Glu His
145                 150                 155                 160

Gly Asp Phe Ser Arg Phe Tyr Ile Gly Gly Asp Thr Ser Gly Ala Asn
                165                 170                 175

Ile Ala Tyr His Val Gly Leu Arg Val Gly Gly Gly Val Glu Lys Leu
            180                 185                 190

Pro Gly Asp Val Lys Ile Ala Gly Ala Leu Leu Ala Phe Pro Leu Phe
        195                 200                 205

Trp Ser Ser Tyr Pro Val Leu Glu Glu Pro Val Glu Gly Phe Glu Gln
    210                 215                 220

Ser Leu Ser Arg Lys Val Trp Asn Phe Val Tyr Pro Asp Ala Pro Gly
225                 230                 235                 240

Gly Ile Asp Asn Pro Leu Ile Asn Pro Leu Ala Asp Gly Ala Pro Ser
                245                 250                 255

Leu Thr Thr Phe Gly Ser Asn Lys Met Leu Ile Phe Val Ala Gly Asn
            260                 265                 270

Asp Glu Leu Arg Asp Arg Gly Ile Trp Phe Tyr Glu Ala Val Lys Lys
        275                 280                 285

Ser Glu Trp Glu Gly Asp Val Glu Leu Ile Arg Val Asp Gly Glu Glu
    290                 295                 300

His Cys Phe Gln Ile Tyr His Pro Glu Ser Glu Asn Ser Lys Asp Met
305                 310                 315                 320

Met Lys Arg Ile Ala Ser Phe Leu Val
                325
```

<210> SEQ ID NO 17
<211> LENGTH: 720
<212> TYPE: DNA
<213> ORGANISM: Torenia hybrid cultivar

<400> SEQUENCE: 17

```
atgaaagata agttctatgg caccattttg cagagcgaag ccctcgcaaa gtatctgtta      60

gagacaagtg cctatccacg agaacatccg cagctcaaag aactaaggag cgcaactgtg     120

gacaagtatc aatattggag cttgatgaat gttccagctg atgaggggca gttcatttca     180

atgttactga aaattatgaa cgcaaaaaag acaattgaag ttggagtttt cacaggctac     240

tcactcctat caactgctct ggctctacct gatgatggca aaatcgttgc cattgatcct     300

gatagagaag cttatgagac tggtttgcca tttatcaaga aagcaaacgt ggctcataaa     360

atccaataca tacaatctga tgccatgaaa gtcatgaatg acctcattgc tgccaaggga     420

gaagaagaag aggggagctt tgactttggg ttcgtggatg cagacaaaga aaactacata     480

aactaccacg agaaactgtt gaagctggtt aaggttggag ggatcatagg atacgacaac     540

actctgtggt ctggaacagt tgctgcatct gaagacgatg agaataatat gcaagactac     600

ttaagaggtt gcagagggca tatcctcaaa ctaaactcct ttctcgcaaa cgatgatcgg     660

attgaattgg ctcacctctc tattggagat ggactcacct tgtgcaaacg tctcaaataa     720
```

<210> SEQ ID NO 18

<211> LENGTH: 239
<212> TYPE: PRT
<213> ORGANISM: Torenia hybrid cultivar

<400> SEQUENCE: 18

```
Met Lys Asp Lys Phe Tyr Gly Thr Ile Leu Gln Ser Glu Ala Leu Ala
1               5                   10                  15

Lys Tyr Leu Leu Glu Thr Ser Ala Tyr Pro Arg Glu His Pro Gln Leu
            20                  25                  30

Lys Glu Leu Arg Ser Ala Thr Val Asp Lys Tyr Gln Tyr Trp Ser Leu
        35                  40                  45

Met Asn Val Pro Ala Asp Glu Gly Gln Phe Ile Ser Met Leu Leu Lys
    50                  55                  60

Ile Met Asn Ala Lys Lys Thr Ile Glu Val Gly Val Phe Thr Gly Tyr
65                  70                  75                  80

Ser Leu Leu Ser Thr Ala Leu Ala Leu Pro Asp Asp Gly Lys Ile Val
                85                  90                  95

Ala Ile Asp Pro Asp Arg Glu Ala Tyr Glu Thr Gly Leu Pro Phe Ile
            100                 105                 110

Lys Lys Ala Asn Val Ala His Lys Ile Gln Tyr Ile Gln Ser Asp Ala
        115                 120                 125

Met Lys Val Met Asn Asp Leu Ile Ala Ala Lys Gly Glu Glu Glu Glu
    130                 135                 140

Gly Ser Phe Asp Phe Gly Phe Val Asp Ala Asp Lys Glu Asn Tyr Ile
145                 150                 155                 160

Asn Tyr His Glu Lys Leu Leu Lys Leu Val Lys Val Gly Gly Ile Ile
                165                 170                 175

Gly Tyr Asp Asn Thr Leu Trp Ser Gly Thr Val Ala Ala Ser Glu Asp
            180                 185                 190

Asp Glu Asn Asn Met Gln Asp Tyr Leu Arg Gly Cys Arg Gly His Ile
        195                 200                 205

Leu Lys Leu Asn Ser Phe Leu Ala Asn Asp Asp Arg Ile Glu Leu Ala
    210                 215                 220

His Leu Ser Ile Gly Asp Gly Leu Thr Leu Cys Lys Arg Leu Lys
225                 230                 235
```

<210> SEQ ID NO 19
<211> LENGTH: 1539
<212> TYPE: DNA
<213> ORGANISM: Torenia hybrid cultivar

<400> SEQUENCE: 19

```
atggacacag tcttaatcac actctacacc gccctgttcg tcatcaccac caccttcctc     60

ctcctcctcc gccgaagggg accaccgtct ccgcccggtc ctctctccct acccataatt    120

ggccacctcc acctcctcgg cccaagactc caccacacgt tccatgaatt ctcactcaaa    180

tacggcccat tgatccagct caagctcggc tcgatcccgt gcgtcgtggc ctcgacgccc    240

gagctcgcga gagagtttct taagacgaac gagctcgcgt tctcctctcg caagcactct    300

acggccatag acatcgtcac ctacgactcg tcctttgctt tctctccgta cggaccctac    360

tggaagtaca tcaagaaact gtgtacctac gagctgctcg gagcgaggaa cctcggacac    420

tttcagccca ttaggaatct cgaggtcagg tcctttctgc agcttctgat gcacaagagc    480

tttaagggcg agagtgtgaa tgtgacagac gagctggtga ggctgacgag caatgtgata    540

tcccacatga tgctgagcat aaggtgctcg gaagatgaag gcgatgctga ggcggcgaga    600
```

```
acagtgatac gcgaggtgac gcagatattt ggggaattcg atgttacgga cataatatgg    660
ttttgcaaga aattcgatct gcaggggata aagaagaggt cagaggatat tcagaggagg    720
tatgatgctt tgctcgagaa gattattagt gatagagaga gatcgaggag gcaaaatcgt    780
gataagcatg gtggcggtaa caatgaggag gccaaggatt ttcttgatat gttgcttgat    840
gtgatggaga gtggggacac ggaggtcaaa ttcactagag agcatctcaa ggctttgatt    900
ctggatttct tcacggccgg tacggacaca acagccatag ccaccgagtg ggccatcgcc    960
gagctcatca acaacccgaa cgtcttgaag aaggcccaag aagaaatatc ccggatcatc   1020
ggaaccaagc ggatcgtaca agaatccgac gccccagacc taccctacct ccaggccatc   1080
atcaaggaga cgttccggct ccacccaccg atcccgatgc tctcgcgtaa gtccacctcc   1140
gattgcacgg tcaacggcta caaaatccaa gccaagagcc tcttgttcgt gaacatatgg   1200
tccatcggtc gaaaccctaa ttactgggaa agccctatgg agttcaggcc cgagcggttc   1260
ttggagaagg gacgcgagtc catcgacgtc aagggccagc actttgagct cttgcctttt   1320
gggacgggcc gcaggggctg tcccggtatg ttgctggcta tacaagaggt ggtcagcatc   1380
attgggacca tggttcagtg cttcgactgg aaattggcag atggttcggg caataatgtg   1440
gacatgaccg aacggtctgg attgaccgct ccgagagcgt tcgatctggt ttgccggttg   1500
tatccacggg ttgacccggc cacaatatcg ggtgcttga                          1539
```

<210> SEQ ID NO 20
<211> LENGTH: 512
<212> TYPE: PRT
<213> ORGANISM: Torenia hybrid cultivar

<400> SEQUENCE: 20

```
Met Asp Thr Val Leu Ile Thr Leu Tyr Thr Ala Leu Phe Val Ile Thr
1               5                   10                  15

Thr Thr Phe Leu Leu Leu Leu Arg Arg Arg Gly Pro Pro Ser Pro Pro
            20                  25                  30

Gly Pro Leu Ser Leu Pro Ile Ile Gly His Leu His Leu Leu Gly Pro
        35                  40                  45

Arg Leu His His Thr Phe His Glu Phe Ser Leu Lys Tyr Gly Pro Leu
    50                  55                  60

Ile Gln Leu Lys Leu Gly Ser Ile Pro Cys Val Val Ala Ser Thr Pro
65                  70                  75                  80

Glu Leu Ala Arg Glu Phe Leu Lys Thr Asn Glu Leu Ala Phe Ser Ser
                85                  90                  95

Arg Lys His Ser Thr Ala Ile Asp Ile Val Thr Tyr Asp Ser Ser Phe
            100                 105                 110

Ala Phe Ser Pro Tyr Gly Pro Tyr Trp Lys Tyr Ile Lys Lys Leu Cys
        115                 120                 125

Thr Tyr Glu Leu Leu Gly Ala Arg Asn Leu Gly His Phe Gln Pro Ile
    130                 135                 140

Arg Asn Leu Glu Val Arg Ser Phe Leu Gln Leu Leu Met His Lys Ser
145                 150                 155                 160

Phe Lys Gly Glu Ser Val Asn Val Thr Asp Glu Leu Val Arg Leu Thr
                165                 170                 175

Ser Asn Val Ile Ser His Met Met Leu Ser Ile Arg Cys Ser Glu Asp
            180                 185                 190

Glu Gly Asp Ala Glu Ala Ala Arg Thr Val Ile Arg Glu Val Thr Gln
        195                 200                 205
```

```
Ile Phe Gly Glu Phe Asp Val Thr Asp Ile Ile Trp Phe Cys Lys Lys
    210                 215                 220

Phe Asp Leu Gln Gly Ile Lys Lys Arg Ser Glu Asp Ile Gln Arg Arg
225                 230                 235                 240

Tyr Asp Ala Leu Leu Glu Lys Ile Ile Ser Asp Arg Glu Arg Ser Arg
                245                 250                 255

Arg Gln Asn Arg Asp Lys His Gly Gly Gly Asn Asn Glu Glu Ala Lys
            260                 265                 270

Asp Phe Leu Asp Met Leu Leu Asp Val Met Glu Ser Gly Asp Thr Glu
        275                 280                 285

Val Lys Phe Thr Arg Glu His Leu Lys Ala Leu Ile Leu Asp Phe Phe
    290                 295                 300

Thr Ala Gly Thr Asp Thr Thr Ala Ile Ala Thr Glu Trp Ala Ile Ala
305                 310                 315                 320

Glu Leu Ile Asn Asn Pro Asn Val Leu Lys Lys Ala Gln Glu Glu Ile
                325                 330                 335

Ser Arg Ile Ile Gly Thr Lys Arg Ile Val Gln Glu Ser Asp Ala Pro
            340                 345                 350

Asp Leu Pro Tyr Leu Gln Ala Ile Ile Lys Glu Thr Phe Arg Leu His
        355                 360                 365

Pro Pro Ile Pro Met Leu Ser Arg Lys Ser Thr Ser Asp Cys Thr Val
    370                 375                 380

Asn Gly Tyr Lys Ile Gln Ala Lys Ser Leu Leu Phe Val Asn Ile Trp
385                 390                 395                 400

Ser Ile Gly Arg Asn Pro Asn Tyr Trp Glu Ser Pro Met Glu Phe Arg
                405                 410                 415

Pro Glu Arg Phe Leu Glu Lys Gly Arg Glu Ser Ile Asp Val Lys Gly
            420                 425                 430

Gln His Phe Glu Leu Leu Pro Phe Gly Thr Gly Arg Arg Gly Cys Pro
        435                 440                 445

Gly Met Leu Leu Ala Ile Gln Glu Val Val Ser Ile Ile Gly Thr Met
    450                 455                 460

Val Gln Cys Phe Asp Trp Lys Leu Ala Asp Gly Ser Gly Asn Asn Val
465                 470                 475                 480

Asp Met Thr Glu Arg Ser Gly Leu Thr Ala Pro Arg Ala Phe Asp Leu
                485                 490                 495

Val Cys Arg Leu Tyr Pro Arg Val Asp Pro Ala Thr Ile Ser Gly Ala
            500                 505                 510
```

<210> SEQ ID NO 21
<211> LENGTH: 1434
<212> TYPE: DNA
<213> ORGANISM: Gentiana triflora

<400> SEQUENCE: 21

```
atgggttctt taaccaacaa tgataatctt catattttct tagtgtgttt cattggtcaa      60

ggagttgtaa atcctatgct aagacttggc aaggcctttg cttcaaaggg tctattagtc     120

actttgtctg caccagaaat tgttggcaca gaaattagga aagccaataa cctcaatgat     180

gatcaaccca taaaagttgg tagtgggatg atcagatttg agttctttga tgatggatgg     240

gaatctgtta atgggtctaa accctttgat gtttgggtgt acatcaatca tcttgatcaa     300

actgggagac aaaaactccc aattatgctc aagaaacatg aagaaacagg gacccctgtt     360

tcttgtttga ttctcaatcc tttagttcca tgggttgcag atgttgcaga cagccttcaa     420
```

```
atcccttgtg ctactctttg ggttcaatct tgtgccagtt tttctgctta ttaccattat    480

caccatggtc tggtaccttt ccctactgaa tctgaaccag aaattgatgt ccaattacca    540

ggtatgccat tgttgaagta cgatgaagtt cctgattatt tgcatccaag aactccgtat    600

cccttctttg ggaccaatat tctgggtcaa ttcaagaact tgtccaagaa tttctgcata    660

ttgatggaca ctttctatga actcgaacac gagattatag acaacatgtg caagttatgt    720

ccaattaagc ctattggacc cttgttcaag atcccaaaag atcccagctc aaatggtatt    780

actggaaatt tcatgaaggt ggatgattgt aaagagtggc tggacagtag accgacgtcc    840

acggtggtgt atgtctccgt cggcagcgtc gtttacttga aacaagagca agttactgag    900

atggcctatg ggattttgaa ctctgaagtt tcgttcttgt gggttctgag acctcccagt    960

aaacgaatcg gcactgagcc acatgtcttg ccggaagagt tctgggaaaa agccggcgat   1020

agaggcaagg ttgtgcaatg gagccctcaa gaacaagtct tggcacatcc ggcaaccgta   1080

ggtttcttga ctcattgtgg atggaactcg acgcaggaag ccatatctag cggtgtgccg   1140

gtgataactt tccctcagtt tggtgatcaa gttacgaacg ccaagttctt ggtggaagaa   1200

ttcaaagtcg ggtaagatt gggcagaggt gaacttgaga acagaatcat cactagagac    1260

gaggttgaaa gggctctgag ggagatcacg agcgggccta aggcagaaga ggtgaaagag   1320

aatgcattga aatggaagaa aaaggcggag gagaccgtcg ccaagggcgg ctactcggaa   1380

agaaaccttg ttggtttcat tgaagaggtt gctagaaaaa ctggtaccaa ataa         1434
```

<210> SEQ ID NO 22
<211> LENGTH: 477
<212> TYPE: PRT
<213> ORGANISM: Gentiana triflora

<400> SEQUENCE: 22

```
Met Gly Ser Leu Thr Asn Asn Asp Asn Leu His Ile Phe Leu Val Cys
1               5                   10                  15

Phe Ile Gly Gln Gly Val Val Asn Pro Met Leu Arg Leu Gly Lys Ala
            20                  25                  30

Phe Ala Ser Lys Gly Leu Leu Val Thr Leu Ser Ala Pro Glu Ile Val
        35                  40                  45

Gly Thr Glu Ile Arg Lys Ala Asn Asn Leu Asn Asp Asp Gln Pro Ile
    50                  55                  60

Lys Val Gly Ser Gly Met Ile Arg Phe Glu Phe Phe Asp Asp Gly Trp
65                  70                  75                  80

Glu Ser Val Asn Gly Ser Lys Pro Phe Asp Val Trp Val Tyr Ile Asn
                85                  90                  95

His Leu Asp Gln Thr Gly Arg Gln Lys Leu Pro Ile Met Leu Lys Lys
            100                 105                 110

His Glu Glu Thr Gly Thr Pro Val Ser Cys Leu Ile Leu Asn Pro Leu
        115                 120                 125

Val Pro Trp Val Ala Asp Val Ala Asp Ser Leu Gln Ile Pro Cys Ala
    130                 135                 140

Thr Leu Trp Val Gln Ser Cys Ala Ser Phe Ser Ala Tyr Tyr His Tyr
145                 150                 155                 160

His His Gly Leu Val Pro Phe Pro Thr Glu Ser Glu Pro Glu Ile Asp
                165                 170                 175

Val Gln Leu Pro Gly Met Pro Leu Leu Lys Tyr Asp Glu Val Pro Asp
            180                 185                 190

Tyr Leu His Pro Arg Thr Pro Tyr Pro Phe Phe Gly Thr Asn Ile Leu
```

```
        195                 200                 205

Gly Gln Phe Lys Asn Leu Ser Lys Asn Phe Cys Ile Leu Met Asp Thr
    210                 215                 220

Phe Tyr Glu Leu Glu His Glu Ile Ile Asp Asn Met Cys Lys Leu Cys
225                 230                 235                 240

Pro Ile Lys Pro Ile Gly Pro Leu Phe Lys Ile Pro Lys Asp Pro Ser
                245                 250                 255

Ser Asn Gly Ile Thr Gly Asn Phe Met Lys Val Asp Asp Cys Lys Glu
            260                 265                 270

Trp Leu Asp Ser Arg Pro Thr Ser Thr Val Val Tyr Val Ser Val Gly
        275                 280                 285

Ser Val Val Tyr Leu Lys Gln Glu Gln Val Thr Glu Met Ala Tyr Gly
    290                 295                 300

Ile Leu Asn Ser Glu Val Ser Phe Leu Trp Val Leu Arg Pro Pro Ser
305                 310                 315                 320

Lys Arg Ile Gly Thr Glu Pro His Val Leu Pro Glu Glu Phe Trp Glu
                325                 330                 335

Lys Ala Gly Asp Arg Gly Lys Val Val Gln Trp Ser Pro Gln Glu Gln
            340                 345                 350

Val Leu Ala His Pro Ala Thr Val Gly Phe Leu Thr His Cys Gly Trp
        355                 360                 365

Asn Ser Thr Gln Glu Ala Ile Ser Ser Gly Val Pro Val Ile Thr Phe
    370                 375                 380

Pro Gln Phe Gly Asp Gln Val Thr Asn Ala Lys Phe Leu Val Glu Glu
385                 390                 395                 400

Phe Lys Val Gly Val Arg Leu Gly Arg Gly Glu Leu Glu Asn Arg Ile
                405                 410                 415

Ile Thr Arg Asp Glu Val Glu Arg Ala Leu Arg Glu Ile Thr Ser Gly
            420                 425                 430

Pro Lys Ala Glu Glu Val Lys Glu Asn Ala Leu Lys Trp Lys Lys Lys
        435                 440                 445

Ala Glu Glu Thr Val Ala Lys Gly Gly Tyr Ser Glu Arg Asn Leu Val
    450                 455                 460

Gly Phe Ile Glu Glu Val Ala Arg Lys Thr Gly Thr Lys
465                 470                 475


<210> SEQ ID NO 23
<211> LENGTH: 58
<212> TYPE: DNA
<213> ORGANISM: Arabidopsis thaliana

<400> SEQUENCE: 23

tacatcacaa tcacacaaaa ctaacaaaag atcaaaagca agttcttcac tgttgata       58


<210> SEQ ID NO 24
<211> LENGTH: 1356
<212> TYPE: DNA
<213> ORGANISM: Lavandula angustifolia

<400> SEQUENCE: 24

atgaccaccc tcctcgaatc ctcccgagtg gcgccgcctc caggcacggt ggctgagcag     60

tcactcccgc tcaccttctt cgacatgacg tggctgcatt tccaccccat gcttcagctt    120

ctcttctacg aactcccctg ttccaaaccc gccttcctcg aaaccgtcgt tccgaaactc    180

aaacaatcct tatctctaac cctcaaacac ttcttccccc tttcatgcaa tctaatctac    240
```

```
cctctatcgc cggagaaaat gccggagttc cggtatcaga acggtgactc ggtttctttc    300

acgattatgg agtctagcga cgattatgaa gatctcgtcg gagatcatcc gcattccgct    360

cataaatact actgctttgc ccctcagctg ccgccgatag tcgaggaatc tgatcggaaa    420

ttgtttcaag ttttagccgt gcaagtgact ctgtttcccg gtcgcggggt gtgcatcgga    480

ataacgacgc accacaccgt tagcgatgct ccatcgtttg tagggtttat gaagagttgg    540

gcttccatca ctaaattcgg aggagatgat gaattcttgg acggaaaagg tgaatgtttg    600

ccggttttcg accgatcgct cgtgaattat ccgcctaaat tggacacata tttatggaac    660

aacgcgcaga aacgtccgtt ggaatcgcag catccatctt taccgacgga tcggattcga    720

gctacctacc ttttcaccca atctgaaatt aagaaattga agggtttgat tcagagaaaa    780

gccccaaatg tagttaatct ctcttccttc gtcgcgatcg cagcttatat ctggaccggc    840

atcgccaaat cggtcggaga ttacaaagac gtggatgacg acaaacgcgc tttcttttta    900

attccgatcg atttaaggcc gcgtttggat ccgccggctc cggggaacta cttcggaaac    960

tgtctatcgt ttgcgatggc gaagatcctg cggcgggatt tggtcggaga tgaaggggtg   1020

tttcgggcag ctgaggcgat cgcggcggaa atagagaaga ggacgagcga caagaagatt   1080

ctagaaactg tggagaactg gccgtctgag attcgcgaag ccttgcaaaa ctgttatttc   1140

tcggtggcgg gatcgagcag gcttgatctt tacggcgcgg attttggatg gggtaaggcg   1200

gtgaagcaag agatactgtc gattgatgga gagaagttta cgatgtcgtt gtgtaaaccg   1260

agggatgctg ccggaggatt ggaggttgga ttgtctttgc caaaggagga attgcaagct   1320

tttgatgatt attttgcgga gggaataaag ggttga                              1356
```

```
<210> SEQ ID NO 25
<211> LENGTH: 451
<212> TYPE: PRT
<213> ORGANISM: Lavandula angustifolia

<400> SEQUENCE: 25

Met Thr Thr Leu Leu Glu Ser Ser Arg Val Ala Pro Pro Pro Gly Thr
1               5                   10                  15

Val Ala Glu Gln Ser Leu Pro Leu Thr Phe Phe Asp Met Thr Trp Leu
            20                  25                  30

His Phe His Pro Met Leu Gln Leu Leu Phe Tyr Glu Leu Pro Cys Ser
        35                  40                  45

Lys Pro Ala Phe Leu Glu Thr Val Val Pro Lys Leu Lys Gln Ser Leu
    50                  55                  60

Ser Leu Thr Leu Lys His Phe Phe Pro Leu Ser Cys Asn Leu Ile Tyr
65                  70                  75                  80

Pro Leu Ser Pro Glu Lys Met Pro Glu Phe Arg Tyr Gln Asn Gly Asp
                85                  90                  95

Ser Val Ser Phe Thr Ile Met Glu Ser Ser Asp Asp Tyr Glu Asp Leu
            100                 105                 110

Val Gly Asp His Pro His Ser Ala His Lys Tyr Tyr Cys Phe Ala Pro
        115                 120                 125

Gln Leu Pro Pro Ile Val Glu Glu Ser Asp Arg Lys Leu Phe Gln Val
    130                 135                 140

Leu Ala Val Gln Val Thr Leu Phe Pro Gly Arg Gly Val Cys Ile Gly
145                 150                 155                 160

Ile Thr Thr His His Thr Val Ser Asp Ala Pro Ser Phe Val Gly Phe
                165                 170                 175
```

```
Met Lys Ser Trp Ala Ser Ile Thr Lys Phe Gly Gly Asp Asp Glu Phe
            180                 185                 190

Leu Asp Gly Lys Gly Glu Cys Leu Pro Val Phe Asp Arg Ser Leu Val
        195                 200                 205

Asn Tyr Pro Pro Lys Leu Asp Thr Tyr Leu Trp Asn Asn Ala Gln Lys
    210                 215                 220

Arg Pro Leu Glu Ser Gln His Pro Ser Leu Pro Thr Asp Arg Ile Arg
225                 230                 235                 240

Ala Thr Tyr Leu Phe Thr Gln Ser Glu Ile Lys Lys Leu Lys Gly Leu
                245                 250                 255

Ile Gln Arg Lys Ala Pro Asn Val Val Asn Leu Ser Ser Phe Val Ala
            260                 265                 270

Ile Ala Ala Tyr Ile Trp Thr Gly Ile Ala Lys Ser Val Gly Asp Tyr
        275                 280                 285

Lys Asp Val Asp Asp Asp Lys Arg Ala Phe Phe Leu Ile Pro Ile Asp
    290                 295                 300

Leu Arg Pro Arg Leu Asp Pro Pro Ala Pro Gly Asn Tyr Phe Gly Asn
305                 310                 315                 320

Cys Leu Ser Phe Ala Met Ala Lys Ile Leu Arg Arg Asp Leu Val Gly
                325                 330                 335

Asp Glu Gly Val Phe Arg Ala Ala Glu Ala Ile Ala Ala Glu Ile Glu
            340                 345                 350

Lys Arg Thr Ser Asp Lys Lys Ile Leu Glu Thr Val Glu Asn Trp Pro
        355                 360                 365

Ser Glu Ile Arg Glu Ala Leu Gln Asn Cys Tyr Phe Ser Val Ala Gly
    370                 375                 380

Ser Ser Arg Leu Asp Leu Tyr Gly Ala Asp Phe Gly Trp Gly Lys Ala
385                 390                 395                 400

Val Lys Gln Glu Ile Leu Ser Ile Asp Gly Glu Lys Phe Thr Met Ser
                405                 410                 415

Leu Cys Lys Pro Arg Asp Ala Ala Gly Gly Leu Glu Val Gly Leu Ser
            420                 425                 430

Leu Pro Lys Glu Glu Leu Gln Ala Phe Asp Asp Tyr Phe Ala Glu Gly
        435                 440                 445

Ile Lys Gly
    450
```

<210> SEQ ID NO 26
<211> LENGTH: 1344
<212> TYPE: DNA
<213> ORGANISM: Clitoria ternatea L.

<400> SEQUENCE: 26

```
atggaaaaca ataagcatgt cgtaatcttc ccatttccct ttggaagcca ccttccacct      60

ctcttgaacc tcgtcttcaa actcgctcac gccgctccaa acacttcatt ctcattcatc     120

ggcacacaca cttccaacgc attccttttc actaaacgcc acgtcccaga caacatcagg     180

gtcttcacca tcagcgatgg aatcccagag ggttatgtgc ccggcaacaa cccaatcgta     240

aaactcgatt ttttcctctc cactggtccc gacaacttgt gcaagggcat tgaacttgcc     300

gttgcagaga ccaaacagag tgtcacttgc atcattgccg atgcttttgt aacctcttct     360

ctccttgtgg ctcagaccct caatgttcct tggattgtgt tttggcccaa tgtgtcatgc     420

tcactttctc tttacttcag cattgatttg ataagagaca agtgtacgaa tgatgctaaa     480

aacgcaagct tggatttcct tcctgggttg tccaaattgc gcgttgagga tgtcccacgg     540
```

```
ccacaggcca ttgttttgga tggaaaggag acactgtttg caaggacgtt gaattcgttg    600

ggtacggtgt tacctcaagc taaggcggtg gttgtgaatt tctttgcaga attagaccca    660

cctttatttg ttaaggatat gagatccaag ttgcagtctt tgctcttcgt tgatccactt    720

ccatgcccac aattgctact ccctgagaca gattcaaatg ggtgcatgtc gtggttggat    780

tccaagagtt ctagatccgt ggcttatgtt tgttttggaa ccgcggtgag tctaccgcca    840

caagaagttg tagaggtcgc agaggcattg gaggaaagtg gttttccatt tcttttggcc    900

ctcagtgaaa gtctaattgg tgttttgcca aaagggttgg ttgagaggac catgacccgt    960

gggaaagtgg tgtcttgggc accacagtct ctcgttttat cgcatggttc tgttggagta   1020

tttgtgactc actgtggagc taactctgtg actgagagta tttccaatgg ggttcctatg   1080

atatgcaggc ccttctttgg ggaccaagga atagctgcac gggttataca ggatatttgg   1140

gagattgggg tgatcctaga aggtaggatt tttaccaaaa atgggtttgt gaaaaacttg   1200

aatctaattc tggtgcagga agaagggaag aagatcaggg acaatgctct taaagtgaag   1260

cagattgtgc aagatgcagc tgggccacat ggacaagctg cagaggattt caacactttg   1320

gtggaaatga tttcctctag ctaa                                          1344


<210> SEQ ID NO 27
<211> LENGTH: 447
<212> TYPE: PRT
<213> ORGANISM: Clitoria ternatea L.

<400> SEQUENCE: 27

Met Glu Asn Asn Lys His Val Val Ile Phe Pro Phe Pro Phe Gly Ser
1               5                   10                  15

His Leu Pro Pro Leu Leu Asn Leu Val Phe Lys Leu Ala His Ala Ala
            20                  25                  30

Pro Asn Thr Ser Phe Ser Phe Ile Gly Thr His Thr Ser Asn Ala Phe
        35                  40                  45

Leu Phe Thr Lys Arg His Val Pro Asp Asn Ile Arg Val Phe Thr Ile
    50                  55                  60

Ser Asp Gly Ile Pro Glu Gly Tyr Val Pro Gly Asn Asn Pro Ile Val
65                  70                  75                  80

Lys Leu Asp Phe Phe Leu Ser Thr Gly Pro Asp Asn Leu Cys Lys Gly
                85                  90                  95

Ile Glu Leu Ala Val Ala Glu Thr Lys Gln Ser Val Thr Cys Ile Ile
            100                 105                 110

Ala Asp Ala Phe Val Thr Ser Ser Leu Leu Val Ala Gln Thr Leu Asn
        115                 120                 125

Val Pro Trp Ile Val Phe Trp Pro Asn Val Ser Cys Ser Leu Ser Leu
    130                 135                 140

Tyr Phe Ser Ile Asp Leu Ile Arg Asp Lys Cys Thr Asn Asp Ala Lys
145                 150                 155                 160

Asn Ala Ser Leu Asp Phe Leu Pro Gly Leu Ser Lys Leu Arg Val Glu
                165                 170                 175

Asp Val Pro Arg Pro Gln Ala Ile Val Leu Asp Gly Lys Glu Thr Leu
            180                 185                 190

Phe Ala Arg Thr Leu Asn Ser Leu Gly Thr Val Leu Pro Gln Ala Lys
        195                 200                 205

Ala Val Val Val Asn Phe Phe Ala Glu Leu Asp Pro Pro Leu Phe Val
    210                 215                 220
```

Lys Asp Met Arg Ser Lys Leu Gln Ser Leu Leu Phe Val Asp Pro Leu
225 230 235 240

Pro Cys Pro Gln Leu Leu Leu Pro Glu Thr Asp Ser Asn Gly Cys Met
245 250 255

Ser Trp Leu Asp Ser Lys Ser Ser Arg Ser Val Ala Tyr Val Cys Phe
260 265 270

Gly Thr Ala Val Ser Leu Pro Pro Gln Glu Val Val Glu Val Ala Glu
275 280 285

Ala Leu Glu Glu Ser Gly Phe Pro Phe Leu Leu Ala Leu Ser Glu Ser
290 295 300

Leu Ile Gly Val Leu Pro Lys Gly Leu Val Glu Arg Thr Met Thr Arg
305 310 315 320

Gly Lys Val Val Ser Trp Ala Pro Gln Ser Leu Val Leu Ser His Gly
325 330 335

Ser Val Gly Val Phe Val Thr His Cys Gly Ala Asn Ser Val Thr Glu
340 345 350

Ser Ile Ser Asn Gly Val Pro Met Ile Cys Arg Pro Phe Phe Gly Asp
355 360 365

Gln Gly Ile Ala Ala Arg Val Ile Gln Asp Ile Trp Glu Ile Gly Val
370 375 380

Ile Leu Glu Gly Arg Ile Phe Thr Lys Asn Gly Phe Val Lys Asn Leu
385 390 395 400

Asn Leu Ile Leu Val Gln Glu Glu Gly Lys Lys Ile Arg Asp Asn Ala
405 410 415

Leu Lys Val Lys Gln Ile Val Gln Asp Ala Ala Gly Pro His Gly Gln
420 425 430

Ala Ala Glu Asp Phe Asn Thr Leu Val Glu Met Ile Ser Ser Ser
435 440 445

<210> SEQ ID NO 28
<211> LENGTH: 1422
<212> TYPE: DNA
<213> ORGANISM: Rosa hybrida

<400> SEQUENCE: 28
atgggtggtg atgctatagt tttgtatcca tatccaggac taggccacct aatttccatg 60
gtagagcttg gcaagctctt actcactcac cacccttctt tctccatcac aatcctcgcc 120
tcaactgcgc caaccaccat tgcagccacc gccaaactgg tcgccagctc caatgatcag 180
ttgacaaact acatcaaagc cgtctctgcc gacaaccctg ccatcaactt ccaccatctc 240
ccaaccattt cttctcttcc agaacacatt gagaagctca acctcccttt cgaatatgca 300
cgtctccaaa tccccaacat cctccaagtc ctccaaaccc ttaagtcaag cctcaaagcc 360
cttatcctcg acatgttttg tgacgcattg ttcgacgtca cgaaagacct caacatccct 420
acattctact tctacacctc cgcaggaagg agtcttgctg tcttactcaa catccccacc 480
ttccatcgca caaccaacag tctgtctgat tttggcgacg tcccgatttc catttcgggc 540
atgccgccga ttcctgtttc ggcaatgccc aagctgttgt ttgaccgctc tactaatttc 600
tacaagagct tcctgtcgac ttcaactcac atggcaaagt caaatggaat cattctcaac 660
acgtttgatc tgctggaaga gagggccctc aaagcgttga gggctggact gtgcttgcct 720
aaccaaccca cacctccgat cttcaccgtc ggaccgttga tctcagggaa gagtggagat 780
aatgatgagc atgagagctt gaagtggcta aacaaccagc ccaaagacag cgttgtgttt 840
ctatgtttcg gaagcatggg agtgttttct atcaaacagt tggaggccat ggctttaggt 900

```
ttagagaaaa gtggccagag gtttttgtgg gtggtacgta atccacctat agaagagtta    960

ccggtagagg agccaagttt ggaggaaata ttgccaaagg gttttgtgga aagaacaaag   1020

gataggggac tggtggtgag gaagtgggcg cctcaggtgg aggtactaag tcatgactcg   1080

gtgggcgggt tcgtgactca ctgtgggtgg aactcggttt tggaagcagt gtgtaatggg   1140

gtgccgatgg ttgcgtggcc tttgtacgcg gagcaaaagc tgggcagggt gtttctggtg   1200

gaggagatga aggtggctgt gggggtgaaa gagtccgaaa ccgggtttgt gagtgcggac   1260

gagttggaga agcgagtgag ggagttgatg gactccgaga gtggggatga aataagaggg   1320

agggtttcgg agttcagtaa tggtggcgtg aaggccaagg aagaaggtgg gtcttctgtt   1380

gcttccttgg ccaagttggc tcagctgtgg aagcaaaaat ga                      1422
```

<210> SEQ ID NO 29
<211> LENGTH: 473
<212> TYPE: PRT
<213> ORGANISM: Rosa hybrida

<400> SEQUENCE: 29

```
Met Gly Gly Asp Ala Ile Val Leu Tyr Pro Tyr Pro Gly Leu Gly His
1               5                   10                  15

Leu Ile Ser Met Val Glu Leu Gly Lys Leu Leu Leu Thr His His Pro
            20                  25                  30

Ser Phe Ser Ile Thr Ile Leu Ala Ser Thr Ala Pro Thr Thr Ile Ala
        35                  40                  45

Ala Thr Ala Lys Leu Val Ala Ser Ser Asn Asp Gln Leu Thr Asn Tyr
    50                  55                  60

Ile Lys Ala Val Ser Ala Asp Asn Pro Ala Ile Asn Phe His His Leu
65                  70                  75                  80

Pro Thr Ile Ser Ser Leu Pro Glu His Ile Glu Lys Leu Asn Leu Pro
                85                  90                  95

Phe Glu Tyr Ala Arg Leu Gln Ile Pro Asn Ile Leu Gln Val Leu Gln
            100                 105                 110

Thr Leu Lys Ser Ser Leu Lys Ala Leu Ile Leu Asp Met Phe Cys Asp
        115                 120                 125

Ala Leu Phe Asp Val Thr Lys Asp Leu Asn Ile Pro Thr Phe Tyr Phe
    130                 135                 140

Tyr Thr Ser Ala Gly Arg Ser Leu Ala Val Leu Leu Asn Ile Pro Thr
145                 150                 155                 160

Phe His Arg Thr Thr Asn Ser Leu Ser Asp Phe Gly Asp Val Pro Ile
                165                 170                 175

Ser Ile Ser Gly Met Pro Pro Ile Pro Val Ser Ala Met Pro Lys Leu
            180                 185                 190

Leu Phe Asp Arg Ser Thr Asn Phe Tyr Lys Ser Phe Leu Ser Thr Ser
        195                 200                 205

Thr His Met Ala Lys Ser Asn Gly Ile Ile Leu Asn Thr Phe Asp Leu
    210                 215                 220

Leu Glu Glu Arg Ala Leu Lys Ala Leu Arg Ala Gly Leu Cys Leu Pro
225                 230                 235                 240

Asn Gln Pro Thr Pro Pro Ile Phe Thr Val Gly Pro Leu Ile Ser Gly
                245                 250                 255

Lys Ser Gly Asp Asn Asp Glu His Glu Ser Leu Lys Trp Leu Asn Asn
            260                 265                 270

Gln Pro Lys Asp Ser Val Val Phe Leu Cys Phe Gly Ser Met Gly Val
```

```
        275                 280                 285

Phe Ser Ile Lys Gln Leu Glu Ala Met Ala Leu Gly Leu Glu Lys Ser
    290                 295                 300

Gly Gln Arg Phe Leu Trp Val Val Arg Asn Pro Pro Ile Glu Glu Leu
305                 310                 315                 320

Pro Val Glu Glu Pro Ser Leu Glu Glu Ile Leu Pro Lys Gly Phe Val
                325                 330                 335

Glu Arg Thr Lys Asp Arg Gly Leu Val Val Arg Lys Trp Ala Pro Gln
            340                 345                 350

Val Glu Val Leu Ser His Asp Ser Val Gly Gly Phe Val Thr His Cys
        355                 360                 365

Gly Trp Asn Ser Val Leu Glu Ala Val Cys Asn Gly Val Pro Met Val
    370                 375                 380

Ala Trp Pro Leu Tyr Ala Glu Gln Lys Leu Gly Arg Val Phe Leu Val
385                 390                 395                 400

Glu Glu Met Lys Val Ala Val Gly Val Lys Glu Ser Glu Thr Gly Phe
                405                 410                 415

Val Ser Ala Asp Glu Leu Glu Lys Arg Val Arg Glu Leu Met Asp Ser
            420                 425                 430

Glu Ser Gly Asp Glu Ile Arg Gly Arg Val Ser Glu Phe Ser Asn Gly
        435                 440                 445

Gly Val Lys Ala Lys Glu Glu Gly Gly Ser Ser Val Ala Ser Leu Ala
    450                 455                 460

Lys Leu Ala Gln Leu Trp Lys Gln Lys
465                 470


<210> SEQ ID NO 30
<211> LENGTH: 1344
<212> TYPE: DNA
<213> ORGANISM: Perilla frutescens var. crispa

<400> SEQUENCE: 30

atgggatttg aattgcacat tggcgttcta gcattccctt tcgggacaca cgctccccct     60

ctactcgccc tggtgcggag gctggcagcc tcctcaccgg gcactctatt ttctttcttg    120

aacagtgcgg agtcaaacgc cgcactgttc aacgagcgca cgtacgataa catacgggcg    180

tttgatgtgt gggacgggac ccccgaaggc cggattttca ccggaactca tttcgaggcc    240

gtcgggttgt tcctcaaggc ctcaccgggt aacttcgaca aggttattga agaggcggaa    300

cgcaaaactg gcctcaaaat ttgctgctta ataactgatg catttttgtg gtttgcttgt    360

gatatggccc agaaaagagg gctgccatgg gtgccattct ggactgctgc ttcctgctct    420

ctctcttcac acctctacac cgatcaaatc gtgaaagcag gaacagcaaa ccaagagcaa    480

aatctatcgt tcattcccgg attggaaatg gcgaccttga ctgatcttcc gccggaggtt    540

ttcctggaca acagtccatc gccgctggcg ataacaatca acaaaatggt cgagaagctc    600

ccaaaatcca ccgccgtcgt cttgaattcc ttcgaagaaa tcgacccgat catcacggat    660

gacctgaaaa caaaattcaa gaatttcctc aacgtaggcc cttcaattct cgcatcaccc    720

cctcaggcga ctcccgacga cgaaacggga tgcctgtcgt ggctggcaga ccaaaccagt    780

cctaaatcag tggtgtacat cagcttcggc accgtgatca cgccgccgga aaacgagctg    840

gcggcattgg ccgacgcctt ggaaatttgc agattcccat ttctttggtc gctgaaagac    900

tacgccgtga aatccctccc cgacggattc ctcgaccgca cgaaggggtt cgggaagatc    960

gtggcgtggg ctccgcagca gcaagtgctc gcgcatagaa atgttggagt gttcgtcact   1020
```

```
cactgcggct ggaactccat tctggaaagc atttccagct gcgtgccgct gatttgcagg   1080

ccctttttcg gcgatcagaa gctcaacagc agaatggtgc aggattcgtg gaaaattggg   1140

gtcagagttg aaggaggcgt cttcactaag aatgaagcgg ttgaatcttt aaaaaagttg   1200

atggcgacgg aggcgggaat gaaaattagg gaaaatgtta gtttgctgag agagaaggct   1260

accgctgcag ttaaaccgga ggggagttcg tctcagaatt tcaagaaact gttagagata   1320

attggtgcgg cggagagcag ttaa                                          1344
```

<210> SEQ ID NO 31
<211> LENGTH: 447
<212> TYPE: PRT
<213> ORGANISM: Perilla frutescens var. crispa

<400> SEQUENCE: 31

```
Met Gly Phe Glu Leu His Ile Gly Val Leu Ala Phe Pro Phe Gly Thr
1               5                   10                  15

His Ala Pro Pro Leu Leu Ala Leu Val Arg Arg Leu Ala Ala Ser Ser
            20                  25                  30

Pro Gly Thr Leu Phe Ser Phe Leu Asn Ser Ala Glu Ser Asn Ala Ala
        35                  40                  45

Leu Phe Asn Glu Arg Thr Tyr Asp Asn Ile Arg Ala Phe Asp Val Trp
    50                  55                  60

Asp Gly Thr Pro Glu Gly Arg Ile Phe Thr Gly Thr His Phe Glu Ala
65                  70                  75                  80

Val Gly Leu Phe Leu Lys Ala Ser Pro Gly Asn Phe Asp Lys Val Ile
                85                  90                  95

Glu Glu Ala Glu Arg Lys Thr Gly Leu Lys Ile Cys Cys Leu Ile Thr
            100                 105                 110

Asp Ala Phe Leu Trp Phe Ala Cys Asp Met Ala Gln Lys Arg Gly Leu
        115                 120                 125

Pro Trp Val Pro Phe Trp Thr Ala Ala Ser Cys Ser Leu Ser Ser His
    130                 135                 140

Leu Tyr Thr Asp Gln Ile Val Lys Ala Gly Thr Ala Asn Gln Glu Gln
145                 150                 155                 160

Asn Leu Ser Phe Ile Pro Gly Leu Glu Met Ala Thr Leu Thr Asp Leu
                165                 170                 175

Pro Pro Glu Val Phe Leu Asp Asn Ser Pro Ser Pro Leu Ala Ile Thr
            180                 185                 190

Ile Asn Lys Met Val Glu Lys Leu Pro Lys Ser Thr Ala Val Val Leu
        195                 200                 205

Asn Ser Phe Glu Glu Ile Asp Pro Ile Ile Thr Asp Asp Leu Lys Thr
    210                 215                 220

Lys Phe Lys Asn Phe Leu Asn Val Gly Pro Ser Ile Leu Ala Ser Pro
225                 230                 235                 240

Pro Gln Ala Thr Pro Asp Asp Glu Thr Gly Cys Leu Ser Trp Leu Ala
                245                 250                 255

Asp Gln Thr Ser Pro Lys Ser Val Val Tyr Ile Ser Phe Gly Thr Val
            260                 265                 270

Ile Thr Pro Pro Glu Asn Glu Leu Ala Ala Leu Ala Asp Ala Leu Glu
        275                 280                 285

Ile Cys Arg Phe Pro Phe Leu Trp Ser Leu Lys Asp Tyr Ala Val Lys
    290                 295                 300

Ser Leu Pro Asp Gly Phe Leu Asp Arg Thr Lys Gly Phe Gly Lys Ile
```

-continued 305 310 315 320

Val Ala Trp Ala Pro Gln Gln Gln Val Leu Ala His Arg Asn Val Gly
325 330 335

Val Phe Val Thr His Cys Gly Trp Asn Ser Ile Leu Glu Ser Ile Ser
340 345 350

Ser Cys Val Pro Leu Ile Cys Arg Pro Phe Phe Gly Asp Gln Lys Leu
355 360 365

Asn Ser Arg Met Val Gln Asp Ser Trp Lys Ile Gly Val Arg Val Glu
370 375 380

Gly Gly Val Phe Thr Lys Asn Glu Ala Val Glu Ser Leu Lys Lys Leu
385 390 395 400

Met Ala Thr Glu Ala Gly Met Lys Ile Arg Glu Asn Val Ser Leu Leu
405 410 415

Arg Glu Lys Ala Thr Ala Ala Val Lys Pro Glu Gly Ser Ser Ser Gln
420 425 430

Asn Phe Lys Lys Leu Leu Glu Ile Ile Gly Ala Ala Glu Ser Ser
435 440 445

<210> SEQ ID NO 32
<211> LENGTH: 1383
<212> TYPE: DNA
<213> ORGANISM: Dahlia

<400> SEQUENCE: 32
ctacgacgca attgcacttt ctaatccatc attaaagatt ttaccaaatg cttccatttg 60
catactcgga aagcacactc caatttcaaa atcttgtgct gattccttgc acgcacttaa 120
agaaaccgac gcgctatagt cgattgaaac aacttcgtat ttcatcgcct ttccccaccc 180
aaaatcaatg tcatagaagt tgagtttcgg tgtacccgag atccccatct tcctagccgg 240
aatcttgaaa ccatcatacc atcggtcggc atcttccaat attcccccct tcttgttcac 300
cattttgctt atcccctctc caatcaattt agcagccata acaaatccat tttcaccttt 360
taacacacca tttttatgg tcacaataca cggcgcgcta cagttaccaa aatagttttc 420
aggaagtggc ggatccaaac gtgatcgaca acccaccgac actataaact gttctaactc 480
gtcttcacct ttcttttccc ccatgttgac taatgacttc acaatacaac tccatatata 540
accacacgtt accgtaaagg aggatgtata ctccagcatt gggagttggg tcaggacttg 600
tttcttaagt ccactgatat gggttcgggc caaaacaaat gtggcccgaa ccctatcaga 660
agaagaacca acaaggctcg gagcttgata aaaagttccg agtcttgttt ggttcaacct 720
gttttcatat agttgtgggt tgacaaccac tctatcaaaa acaggtggag atccgttttt 780
caagaatggc tgatcttcac ctgtttcaca aaccgaagcc cacgccttca ggaaaccgaa 840
ccgagtgttg gcgtcactga ggctatgatg atttgtcaag ccaatagaga tacccgagtt 900
cggaaaatac gtcacttgga ccgagaaaac cgggagtgtg acgtaatcgg attctttaac 960
ggcattacct aacggaggga caagcggata aaagttttca catttccgag gatgatttgc 1020
tgacagatcg ttgaaatcaa gagtagtttc tgcgaaagta agcgcgacgg aatcaccttc 1080
cacgtgtcgg atttcgggtt tcctagtgga atcatgaggg tttggatata caataagttt 1140
gccaacaaat gggaaatagt gttgaagtgt gattgataat gagtgtttaa ggtttggaat 1200
aacggtttcc gtgaaatggg atttggaata agggaagtgg tagaagtaaa gatgatggac 1260
gggtgggaag agtagccatg caatgtcgaa gaaagtgagt ggcaatgaac ggtggccgat 1320
ggtggacggt ggtggggata ttctagaatg ttctagaatt gttagattgg gaatgttgtc 1380

```
cat                                                                   1383


<210> SEQ ID NO 33
<211> LENGTH: 460
<212> TYPE: PRT
<213> ORGANISM: Dahlia

<400> SEQUENCE: 33

Met Asp Asn Ile Pro Asn Leu Thr Ile Leu Glu His Ser Arg Ile Ser
1               5                   10                  15

Pro Pro Pro Ser Thr Ile Gly His Arg Ser Leu Pro Leu Thr Phe Phe
            20                  25                  30

Asp Ile Ala Trp Leu Leu Phe Pro Pro Val His His Leu Tyr Phe Tyr
        35                  40                  45

His Phe Pro Tyr Ser Lys Ser His Phe Thr Glu Thr Val Ile Pro Asn
    50                  55                  60

Leu Lys His Ser Leu Ser Ile Thr Leu Gln His Tyr Phe Pro Phe Val
65                  70                  75                  80

Gly Lys Leu Ile Val Tyr Pro Asn Pro His Asp Ser Thr Arg Lys Pro
                85                  90                  95

Glu Ile Arg His Val Glu Gly Asp Ser Val Ala Leu Thr Phe Ala Glu
            100                 105                 110

Thr Thr Leu Asp Phe Asn Asp Leu Ser Ala Asn His Pro Arg Lys Cys
        115                 120                 125

Glu Asn Phe Tyr Pro Leu Val Pro Pro Leu Gly Asn Ala Val Lys Glu
    130                 135                 140

Ser Asp Tyr Val Thr Leu Pro Val Phe Ser Val Gln Val Thr Tyr Phe
145                 150                 155                 160

Pro Asn Ser Gly Ile Ser Ile Gly Leu Thr Asn His His Ser Leu Ser
                165                 170                 175

Asp Ala Asn Thr Arg Phe Gly Phe Leu Lys Ala Trp Ala Ser Val Cys
            180                 185                 190

Glu Thr Gly Glu Asp Gln Pro Phe Leu Lys Asn Gly Ser Pro Pro Val
        195                 200                 205

Phe Asp Arg Val Val Val Asn Pro Gln Leu Tyr Glu Asn Arg Leu Asn
    210                 215                 220

Gln Thr Arg Leu Gly Thr Phe Tyr Gln Ala Pro Ser Leu Val Gly Ser
225                 230                 235                 240

Ser Ser Asp Arg Val Arg Ala Thr Phe Val Leu Ala Arg Thr His Ile
                245                 250                 255

Ser Gly Leu Lys Lys Gln Val Leu Thr Gln Leu Pro Met Leu Glu Tyr
            260                 265                 270

Thr Ser Ser Phe Thr Val Thr Cys Gly Tyr Ile Trp Ser Cys Ile Val
        275                 280                 285

Lys Ser Leu Val Asn Met Gly Glu Lys Lys Gly Glu Asp Glu Leu Glu
    290                 295                 300

Gln Phe Ile Val Ser Val Gly Cys Arg Ser Arg Leu Asp Pro Pro Leu
305                 310                 315                 320

Pro Glu Asn Tyr Phe Gly Asn Cys Ser Ala Pro Cys Ile Val Thr Ile
                325                 330                 335

Lys Asn Gly Val Leu Lys Gly Glu Asn Gly Phe Val Met Ala Ala Lys
            340                 345                 350

Leu Ile Gly Glu Gly Ile Ser Lys Met Val Asn Lys Lys Gly Gly Ile
        355                 360                 365
```

```
Leu Glu Asp Ala Asp Arg Trp Tyr Asp Gly Phe Lys Ile Pro Ala Arg
    370                 375                 380

Lys Met Gly Ile Ser Gly Thr Pro Lys Leu Asn Phe Tyr Asp Ile Asp
385                 390                 395                 400

Phe Gly Trp Gly Lys Ala Met Lys Tyr Glu Val Val Ser Ile Asp Tyr
                405                 410                 415

Ser Ala Ser Val Ser Leu Ser Ala Cys Lys Glu Ser Ala Gln Asp Phe
            420                 425                 430

Glu Ile Gly Val Cys Phe Pro Ser Met Gln Met Glu Ala Phe Gly Lys
        435                 440                 445

Ile Phe Asn Asp Gly Leu Glu Ser Ala Ile Ala Ser
    450                 455                 460
```

<210> SEQ ID NO 34
<211> LENGTH: 1056
<212> TYPE: DNA
<213> ORGANISM: Commelina communis var. hortensis

<400> SEQUENCE: 34

```
atggaagctc aagaagacaa tgcatacatg caagcattgg agctccaaac tggtattgac      60

atgaacatga ctctcagggc tgccattgag cttggcatcc tcgaaacaat cgtcggtgcc     120

ggagaaggag ctaagctcgc cgccggcgag atctccggcc atcttccgac tgccaacccc     180

gaagctccca acatggttga cagaatgcta cgcttgctag ctgctcacaa tatcgtaact     240

tgtgtcgtcg agggcggcgt cgatgggcgg ccggagtgca agtatggggc tgctccggtg     300

agcaagtact tcaccggaga gggtgaaatg tcgttggcaa ggaaggtgtt acttgcaact     360

gatatggtta cgtttcaatc atggttgcat ttgaaagatt cagtgataaa tggtggaaat     420

gccttccata cggctttcaa tatgagccta ttcgataaaa ataaagtgga ttcacgattt     480

aacaatgtct tcaatactag tatgaagagt gtatcgcttt tcgccattaa taagtttatc     540

aacacatacg atggattcag cgatatacaa gtattagttg atgttggtgg cggaatcggc     600

accgcacttt atgcaattac atccaaattt cctcatatca agggcatcaa ttttgatctt     660

ccacaagtga tctctactgc acaaacttct tatccagaaa tggagcatgt tagtggagat     720

atgtttgcaa gtgttccaaa aggggatgcc attcttttaa agcatgttct tcataattgg     780

gaggatgaga gttgtttgaa gatactgaaa acttgttgga attctctgcc ttataagggt     840

aaggtgatca ttgtggaatc tgtgctccca aaagctccgg gagtttcttc tgcatcaaaa     900

tattttacat gtcttgatgt tattatgatg gctcactttg ggcaaaact aaggactatt      960

gaagagttta aggagttatg taacaatgct ggattttctt catttaatgc tacttatttc    1020

cacacatatc attgtattat ggagttcact aaataa                              1056
```

<210> SEQ ID NO 35
<211> LENGTH: 351
<212> TYPE: PRT
<213> ORGANISM: Commelina communis var. hortensis

<400> SEQUENCE: 35

```
Met Glu Ala Gln Glu Asp Asn Ala Tyr Met Gln Ala Leu Glu Leu Gln
1               5                   10                  15

Thr Gly Ile Asp Met Asn Met Thr Leu Arg Ala Ala Ile Glu Leu Gly
            20                  25                  30

Ile Leu Glu Thr Ile Val Gly Ala Gly Glu Gly Ala Lys Leu Ala Ala
        35                  40                  45
```

```
Gly Glu Ile Ser Gly His Leu Pro Thr Ala Asn Pro Glu Ala Pro Asn
    50                  55                  60

Met Val Asp Arg Met Leu Arg Leu Leu Ala Ala His Asn Ile Val Thr
65                  70                  75                  80

Cys Val Val Glu Gly Gly Val Asp Gly Arg Pro Glu Cys Lys Tyr Gly
                85                  90                  95

Ala Ala Pro Val Ser Lys Tyr Phe Thr Gly Glu Gly Glu Met Ser Leu
            100                 105                 110

Ala Arg Lys Val Leu Leu Ala Thr Asp Met Val Thr Phe Gln Ser Trp
        115                 120                 125

Leu His Leu Lys Asp Ser Val Ile Asn Gly Gly Asn Ala Phe His Thr
    130                 135                 140

Ala Phe Asn Met Ser Leu Phe Asp Lys Asn Lys Val Asp Ser Arg Phe
145                 150                 155                 160

Asn Asn Val Phe Asn Thr Ser Met Lys Ser Val Ser Leu Phe Ala Ile
                165                 170                 175

Asn Lys Phe Ile Asn Thr Tyr Asp Gly Phe Ser Asp Ile Gln Val Leu
            180                 185                 190

Val Asp Val Gly Gly Gly Ile Gly Thr Ala Leu Tyr Ala Ile Thr Ser
        195                 200                 205

Lys Phe Pro His Ile Lys Gly Ile Asn Phe Asp Leu Pro Gln Val Ile
    210                 215                 220

Ser Thr Ala Gln Thr Ser Tyr Pro Glu Met Glu His Val Ser Gly Asp
225                 230                 235                 240

Met Phe Ala Ser Val Pro Lys Gly Asp Ala Ile Leu Leu Lys His Val
                245                 250                 255

Leu His Asn Trp Glu Asp Glu Ser Cys Leu Lys Ile Leu Lys Thr Cys
            260                 265                 270

Trp Asn Ser Leu Pro Tyr Lys Gly Lys Val Ile Ile Val Glu Ser Val
        275                 280                 285

Leu Pro Lys Ala Pro Gly Val Ser Ser Ala Ser Lys Tyr Phe Thr Cys
    290                 295                 300

Leu Asp Val Ile Met Met Ala His Phe Gly Ala Lys Leu Arg Thr Ile
305                 310                 315                 320

Glu Glu Phe Lys Glu Leu Cys Asn Asn Ala Gly Phe Ser Ser Phe Asn
                325                 330                 335

Ala Thr Tyr Phe His Thr Tyr His Cys Ile Met Glu Phe Thr Lys
            340                 345                 350
```

FLAVONE 7-O-METHYLTRANSFERASE GENE AND USE FOR SAME

FIELD

The present invention relates to a novel polynucleotide encoding a protein having activity of transferring a methyl group to the hydroxyl group at position 7 of flavone C-glycoside, and to use of the same.

BACKGROUND

Rose, petunia, chrysanthemum and carnation are industrially important ornamental plants worldwide. Rose in particular, being the most popular flowering plant, has a record of cultivation since ancient times, and it has been artificially crossbred for hundreds of years. One problem, however, has been that none of the hybridizable related species have wild varieties with blue flower color, and it has therefore been difficult to create rose varieties with blue flower color by conventional cross-breeding and mutation breeding. Creating completely new blue flower colors should lead to new demand for even wider uses of ornamental flowers, and should help to increase production and consumption. It has therefore been attempted to create roses with blue flower colors by genetic engineering methods.

Flowers with purple to blue colors, for example, are known to abundantly contain delphinidin-type anthocyanins having delphinidin, petunidin and malvidin backbones, but since ornamental flowers such as rose cannot produce such delphinidin-type anthocyanins, research continues to be conducted with the aim of artificially producing delphinidins by expressing the flavonoid 3',5'-hydroxylase gene that is necessary for their synthesis (NPL 1). However, even when plant metabolism is artificially modified in order to express an enzyme gene that produces a substance of interest in the recombinant plant, in many cases competition with endogenous enzymes of the same plant results in little or absolutely no accumulation of the substance of interest.

Moreover, the color of a flower changes not only by the structures of the anthocyanins themselves as the essential pigments, but also due to copresent flavonoids (also known as copigments), metal ions, and the vacuole pH. Flavones or flavonols are typical copigments that form sandwich-like layers with anthocyanins and render the anthocyanins blue, producing a deepening effect (NPL 2). This is known as the "copigment effect". Flavones, in particular, are known to exhibit a powerful copigment effect, and analysis of gene recombinant carnations, for example, has demonstrated that flavones exhibit a significant copigment effect (NPL 3). For Dutch *Iris*, it has been reported that a higher ratio of the total flavone content with respect to the total delphinidin content results in a more powerful copigment effect, and a bluer color (NPL 4). In Asiatic dayflower, blue coloration has been reported by formation of commelinin (a metal complex of malonyl awobanin, flavocommelin and magnesium ion) (NPL 9).

However, not all plants can produce flavones, and it is known that roses and *Petunias* do not store flavones. Attempts have therefore been made to modify flower color by expressing in the plants different genes coding for proteins having activity for synthesizing flavones from flavanones (PTL 1).

In plants, flavones are distributed not only in free form but also as glycosides, with flavone O-glycosides and flavone C-glycosides being formed primarily, and flavone C-glycosides being known to exhibit a particularly powerful copigment effect. For example, isovitexin, as one type of flavone C-glycoside, has been reported to exhibit a copigment effect with anthocyanins in Japanese garden iris (*Iris ensata* Thunb.), and to stabilize blue flower color via stabilization of anthocyanins (NPL 5). Two biosynthetic pathways have been reported so far for flavone C-glycosides, one being synthesis from flavanones by reaction catalyzed by flavanone 2-hydroxylase, C-glycosylase and dehydratase. Another is synthesis from flavanones by reaction catalyzed by flavone synthase and flavone C-glycosylase (NPL 6).

However, no instances have been reported in which these genes are introduced into plants that do not produce flavone C-glycosides. The copigment effect is also thought to depend on the quantity ratio of anthocyanins and flavones, as well as sugar and methyl or acyl group modification of the anthocyanins and flavones, and therefore blue flower color cannot necessarily be obtained simply by expressing a flavone synthase gene and causing accumulation of flavones. When the torenia flavone synthase gene is expressed in petunia, the violet flower color is fainter (NPL 7). Moreover, expression of the gentian-derived flavone synthase gene in tobacco results in flavone synthesis (NPL 8), but similarly results in a fainter flower color. Artificially adding flavones and malvidins has also been carried out in the attempt to modify rose flower color (PTL 2), but success has not been achieved in creating a rose with blue flower color.

In actuality, previous flower color modifications to rose attempting to obtain blue flower color have been limited to the Purple group and Purple-Violet group and the Violet group, based on the RHS color chart color hue groups, whereas it has not been possible to create blue roses having flower colors in the Violet-Blue group or Blue group. Therefore, a need still exists for development of blue color expression-regulating technology allowing creation of roses having truly blue color.

CITATION LIST

Patent Literature

[PTL 1] Japanese Unexamined Patent Publication No. 2000-279182

[PTL 2] International Patent Publication No. 2008/156206

Non Patent Literature

[NPL 1] Phytochemistry Reviews 5, 283-291

[NPL 2] Prog. Chem. Org. Natl. Prod. 52

[NPL 3] Phytochemistry, 63, 15-23(2003)

[NPL 4] Plant Physiol. Bioch. 72, 116-124(2013)

[NPL 5] Euphytica 115, 1-5(2000)

[NPL 6] FEBS Lett. 589, 182-187(2015)

[NPL 7] Plant Biotechnology, 21, 377-386(2004)

[NPL 8] Molecular Breeding 17:91-99(2006)

[NPL 9] Proceedings of the Japan Academy. Ser. B: Physical and Biological Sciences 84(10), 452-456, 2008

[NPL 10] Plant Mol. Biol. 36(2), 219-227 (1998)

[NPL 11] Plant Mol. Biol. 62(4-5), 715-733(2006)

SUMMARY

Technical Problem

The problem to be solved by the present invention is to provide a transgenic plant with modified flower color, or its inbred or outbred progeny, or their propagules, partial plant bodies, tissues or cells.

Solution to Problem

As a result of much ardent research and experimentation, the present inventors have found that if a delphinidin-type anthocyanin and a flavone C-glycoside are caused to coexist in the petal of a plant, it is possible to obtain a transgenic plant having flower color that has not been obtainable in the prior art, and specifically a rose plant having blue flower color (Violet-Blue group/Blue group according to RHS Color Chart 5th Edition, and/or hue angle: 339.7° to 270.0°). Even more surprisingly, the present inventors found that, among numerous flavone C-glycosides, the combination with swertisin, wherein the hydroxyl group at position 7 is methylated, results in a bluer color, and have succeeded in obtaining a novel flavone 7-O-methyltransferase gene that transfers a methyl group to the hydroxyl group at position 7 of flavone C-glycoside, from oboushibana (*Commelina communis* var. *hortensis*), which is known as a (cultivated) variant of Asiatic dayflower. The invention has been completed upon these findings.

Specifically, the present invention provides the following.

[1] A polynucleotide selected from the group consisting of the following (a) to (e):

(a) a polynucleotide consisting of the nucleotide sequence listed as SEQ ID NO: 34;

(b) a polynucleotide that hybridizes with a polynucleotide consisting of a nucleotide sequence complementary to the nucleotide sequence listed as SEQ ID NO: 34 under stringent conditions and encodes a protein having activity of transferring a methyl group to the hydroxyl group at position 7 of flavone C-glycoside;

(c) a polynucleotide encoding a protein consisting of the amino acid sequence listed as SEQ ID NO: 35;

(d) a polynucleotide encoding a protein consisting of an amino acid sequence that is an amino acid sequence listed as SEQ ID NO: 35 having a deletion, substitution, insertion and/or addition of one or more amino acids, and having activity of transferring a methyl group to the hydroxyl group at position 7 of flavone C-glycoside; and (e) a polynucleotide encoding a protein consisting of an amino acid sequence with at least 90% identity to the amino acid sequence listed as SEQ ID NO: 35 and having activity of transferring a methyl group to the hydroxyl group at position 7 of flavone C-glycoside.

[2] The polynucleotide according to [1], which is a polynucleotide consisting of the nucleotide sequence listed as SEQ ID NO: 34.

[3] The polynucleotide according to [1], which is a polynucleotide encoding a protein consisting of the amino acid sequence listed as SEQ ID NO: 35.

[4] A protein encoded by the polynucleotide according to any one of [1] to [3].

[5] A vector comprising the polynucleotide according to any one of [1] to [3].

[6] The vector according to [5], which further comprises a flavone synthase (FNS) gene or its homolog, and a flavone C-glycosylase (CGT) gene or its homolog.

[7] The vector according to [6], wherein the FNS gene or its homolog is selected from the group consisting of:

(1-a) a polynucleotide consisting of the nucleotide sequence listed as SEQ ID NO: 19;

(1-b) a polynucleotide that hybridizes with a polynucleotide consisting of a nucleotide sequence complementary to the nucleotide sequence listed as SEQ ID NO: 19 under stringent conditions and encodes a protein having the same activity as a protein encoded by the polynucleotide of (1-a);

(1-c) a polynucleotide encoding a protein consisting of the amino acid sequence listed as SEQ ID NO: 20;

(1-d) a polynucleotide encoding a protein consisting of an amino acid sequence that is an amino acid sequence listed as SEQ ID NO: 20 having a deletion, substitution, insertion and/or addition of one or more amino acids, and having the same activity as a protein encoded by the polynucleotide of (1-c); and (1-e) a polynucleotide encoding a protein having an amino acid sequence with at least 90% identity to the amino acid sequence listed as SEQ ID NO: 20 and having the same activity as a protein encoded by the polynucleotide of (1-c), and the CGT gene or its homolog is selected from the group consisting of:

(2-a) a polynucleotide consisting of the nucleotide sequence listed as SEQ ID NO: 21;

(2-b) a polynucleotide that hybridizes with a polynucleotide consisting of a nucleotide sequence complementary to the nucleotide sequence listed as SEQ ID NO: 21 under stringent conditions and encodes a protein having the same activity as a protein encoded by the polynucleotide of (2-a);

(2-c) a polynucleotide encoding a protein consisting of the amino acid sequence listed as SEQ ID NO: 22;

(2-d) a polynucleotide encoding a protein consisting of an amino acid sequence that is an amino acid sequence listed as SEQ ID NO: 22 having a deletion, substitution, insertion and/or addition of one or more amino acids, and having the same activity as a protein encoded by the polynucleotide of (2-c); and (2-e) a polynucleotide encoding a protein having an amino acid sequence with at least 90% identity to the amino acid sequence listed as SEQ ID NO: 22 and having the same activity as a protein encoded by the polynucleotide of (2-c).

[8] The vector according to [6] or [7], wherein the vector further comprises a flavonoid F3',5'-hydroxylase (F3',5'H) gene or its homolog, and a methyltransferase (MT) gene or its homolog.

[9] The vector according to [8], wherein the F3',5'H gene or its homolog is selected from the group consisting of:

(3-a) a polynucleotide consisting of the nucleotide sequence listed as SEQ ID NO: 9;

(3-b) a polynucleotide that hybridizes with a polynucleotide consisting of a nucleotide sequence complementary to the nucleotide sequence listed as SEQ ID NO: 9 under stringent conditions and encodes a protein having the same activity as a protein encoded by the polynucleotide of (3-a);

(3-c) a polynucleotide encoding a protein consisting of the amino acid sequence listed as SEQ ID NO: 10;

(3-d) a polynucleotide encoding a protein consisting of an amino acid sequence that is an amino acid sequence listed as SEQ ID NO: 10 having a deletion, substitution, insertion and/or addition of one or more amino acids, and having the same activity as a protein encoded by the polynucleotide of (3-c); and (3-e) a polynucleotide encoding a protein having an amino acid sequence with at least 90% identity to the amino acid sequence listed as SEQ ID NO: 10 and having the same activity as a protein encoded by the polynucleotide of (3-c), and the MT gene or its homolog is selected from the group consisting of:

(4-a) a polynucleotide consisting of the nucleotide sequence listed as SEQ ID NO: 17;

(4-b) a polynucleotide that hybridizes with a polynucleotide consisting of a nucleotide sequence complementary to the nucleotide sequence listed as SEQ ID NO: 17 under stringent conditions and encodes a protein having the same activity as a protein encoded by the polynucleotide of (4-a);

(4-c) a polynucleotide encoding a protein consisting of the amino acid sequence listed as SEQ ID NO: 18;

(4-d) a polynucleotide encoding a protein consisting of an amino acid sequence that is an amino acid sequence listed as SEQ ID NO: 18 having a deletion, substitution, insertion and/or addition of one or more amino acids, and having the same activity as a protein encoded by the polynucleotide of (4-c); and (4-e) a polynucleotide encoding a protein having an amino acid sequence with at least 90% identity to the amino acid sequence listed as SEQ ID NO: 18 and having the same activity as a protein encoded by the polynucleotide of (4-c).

[10] The vector according to any one of [7] to [9], which has the *Arabidopsis* alcohol dehydrogenase (ADH) gene 5'-untranslated region (5'-UTR) (SEQ ID NO: 23) added to the CGT gene or its homolog.

[11] The vector according to [5], which further comprises a flavanone 2-hydroxylase (F2H) gene or its homolog, a flavone C-glycosylase (CGT) gene or its homolog, and a dehydratase (FDH) gene or its homolog.

[12] The vector according to [11], which further comprises a flavonoid F3',5'-hydroxylase (F3',5'H) gene or its homolog, and a methyltransferase (MT) gene or its homolog.

[13] The vector according to 12, wherein the F2H gene or its homolog is selected from the group consisting of:

(5-a) a polynucleotide consisting of the nucleotide sequence listed as SEQ ID NO: 3;

(5-b) a polynucleotide that hybridizes with a polynucleotide consisting of a nucleotide sequence complementary to the nucleotide sequence listed as SEQ ID NO: 3 under stringent conditions and encodes a protein having the same activity as a protein encoded by the polynucleotide of (5-a);

(5-c) a polynucleotide encoding a protein consisting of the amino acid sequence listed as SEQ ID NO: 4;

(5-d) a polynucleotide encoding a protein consisting of an amino acid sequence that is an amino acid sequence listed as SEQ ID NO: 4 having a deletion, substitution, insertion and/or addition of one or more amino acids, and having the same activity as a protein encoded by the polynucleotide of (5-c); and (5-e) a polynucleotide encoding a protein having an amino acid sequence with at least 90% identity to the amino acid sequence listed as SEQ ID NO: 4 and having the same activity as a protein encoded by the polynucleotide of (5-c), the CGT gene or its homolog is selected from the group consisting of:

(6-a) a polynucleotide consisting of the nucleotide sequence listed as SEQ ID NO: 13;

(6-b) a polynucleotide that hybridizes with a polynucleotide consisting of a nucleotide sequence complementary to the nucleotide sequence listed as SEQ ID NO: 13 under stringent conditions and encodes a protein having the same activity as a protein encoded by the polynucleotide of (6-a);

(6-c) a polynucleotide encoding a protein consisting of the amino acid sequence listed as SEQ ID NO: 14;

(6-d) a polynucleotide encoding a protein consisting of an amino acid sequence that is an amino acid sequence listed as SEQ ID NO: 14 having a deletion, substitution, insertion and/or addition of one or more amino acids, and having the same activity as a protein encoded by the polynucleotide of (6-c); and (6-e) a polynucleotide encoding a protein having an amino acid sequence with at least 90% identity to the amino acid sequence listed as SEQ ID NO: 14 and having the same activity as a protein encoded by the polynucleotide of (6-c), the FDH gene or its homolog is selected from the group consisting of:

(7-a) a polynucleotide consisting of the nucleotide sequence listed as SEQ ID NO: 15;

(7-b) a polynucleotide that hybridizes with a polynucleotide consisting of a nucleotide sequence complementary to the nucleotide sequence listed as SEQ ID NO: 15 under stringent conditions and encodes a protein having the same activity as a protein encoded by the polynucleotide of (7-a);

(7-c) a polynucleotide encoding a protein consisting of the amino acid sequence listed as SEQ ID NO: 16;

(7-d) a polynucleotide encoding a protein consisting of an amino acid sequence that is an amino acid sequence listed as SEQ ID NO: 16 having a deletion, substitution, insertion and/or addition of one or more amino acids, and having the same activity as a protein encoded by the polynucleotide of (7-c); and (7-e) a polynucleotide encoding a protein having an amino acid sequence with at least 90% identity to the amino acid sequence listed as SEQ ID NO: 16 and having the same activity as a protein encoded by the polynucleotide of (7-c), the F3',5'H gene or its homolog is selected from the group consisting of:

(8-a) a polynucleotide consisting of the nucleotide sequence listed as SEQ ID NO: 9;

(8-b) a polynucleotide that hybridizes with a polynucleotide consisting of a nucleotide sequence complementary to the nucleotide sequence listed as SEQ ID NO: 9 under stringent conditions and encodes a protein having the same activity as a protein encoded by the polynucleotide of (8-a);

(8-c) a polynucleotide encoding a protein consisting of the amino acid sequence listed as SEQ ID NO: 10;

(8-d) a polynucleotide encoding a protein consisting of an amino acid sequence that is an amino acid sequence listed as SEQ ID NO: 10 having a deletion, substitution, insertion and/or addition of one or more amino acids, and having the same activity as a protein encoded by the polynucleotide of (8-c); and (8-e) a polynucleotide encoding a protein having an amino acid sequence with at least 90% identity to the amino acid sequence listed as SEQ ID NO: 10 and having the same activity as a protein encoded by the polynucleotide of (8-c), and the MT gene or its homolog is selected from the group consisting of:

(9-a) a polynucleotide consisting of the nucleotide sequence listed as SEQ ID NO: 17;

(9-b) a polynucleotide that hybridizes with a polynucleotide consisting of a nucleotide sequence complementary to the nucleotide sequence listed as SEQ ID NO: 17 under stringent conditions and encodes a protein having the same activity as a protein encoded by the polynucleotide of (9-a);
(9-c) a polynucleotide encoding a protein consisting of the amino acid sequence listed as SEQ ID NO: 18;
(9-d) a polynucleotide encoding a protein consisting of an amino acid sequence that is an amino acid sequence listed as SEQ ID NO: 18 having a deletion, substitution, insertion and/or addition of one or more amino acids, and having the same activity as a protein encoded by the polynucleotide of (9-c); and
(9-e) a polynucleotide encoding a protein having an amino acid sequence with at least 90% identity to the amino acid sequence listed as SEQ ID NO: 18 and having the same activity as a protein encoded by the polynucleotide of (9-c).

[14] A transgenic plant, or its inbred or outbred progeny, comprising the polynucleotide according to any one of [1] to [3].
[15] The transgenic plant according to [14], or its inbred or outbred progeny, wherein the plant is selected from rose, petunia, chrysanthemum, carnation or lily.
[16] The transgenic plant according to [15], or its inbred or outbred progeny, wherein the plant is rose.
[17] Propagules, partial plant bodies, tissue or cells of the transgenic plant according to any one of [14] to [16] or its inbred or outbred progeny.
[18] A cut flower of the transgenic plant according to any one of [14] to [16], or its inbred or outbred progeny, or a processed form created from the cut flower.
[19] A method for creating a transgenic plant with modified flower color, wherein the method comprises a step of causing a delphinidin-type anthocyanin and a flavone C-glycoside to coexist in plant cells, wherein the hydroxyl group at position 7 of flavone C-glycoside is methylated.
[20] The method according to [19], wherein the flavone C-glycoside is swertisin or swertiajaponin.
[21] The method according to [19] or [20], wherein the delphinidin-type anthocyanin is selected from the group consisting of malvidin 3,5-diglycoside, delphinidin 3,5-diglycoside, petunidin 3,5-diglycoside, acylated delphinidin and acylated malvidin, and a combination thereof.
[22] The method according to any one of [19] to [21], which comprises a step of introducing the vector according to any one of [5] to [13] into plant cells.
[23] The method according to [22], wherein the plant is rose, petunia, chrysanthemum, carnation or lily.
[24] The method according to [23], wherein the plant is rose.

Advantageous Effects of Invention

According to the invention it is possible to create plant varieties with flower colors that have not been obtainable in the prior art.

Anthocyanins are a group of pigments that are widely extant in plants, and they are known to exhibit red, blue and purple flower colors. They are classified into 3 types, pelargonidin, cyanidin and delphinidin, based on the number of hydroxyl groups on the B-ring of the anthocyanidin, as the aglycone form. The chromophoric group is the aglycone portion, with pelargonidin-type anthocyanins exhibiting orange color, cyanidin-type anthocyanins exhibiting red color and delphinidin-type anthocyanins exhibiting purple to blue color. Throughout the present specification, "delphinidin-type anthocyanins" also include their derivatives having delphinidin, malvidin or petunidin backbones, with malvidin being preferred.

When delphinidin-type anthocyanins coexist with substances such as flavones, flavonols, organic acid esters and tannins, their molecular interaction often produces blueish colors. This phenomenon is known as "copigmentation", and substances that produce the phenomenon are known as copigments. Copigmentation includes not only a color depth effect that induces blue color production, but also a deep color effect or an effect of increasing color stability. The present inventors have confirmed that copigmentation between delphinidin-type anthocyanins and flavone C-glycosides causes blue color expression in rose petals.

Figure 1:
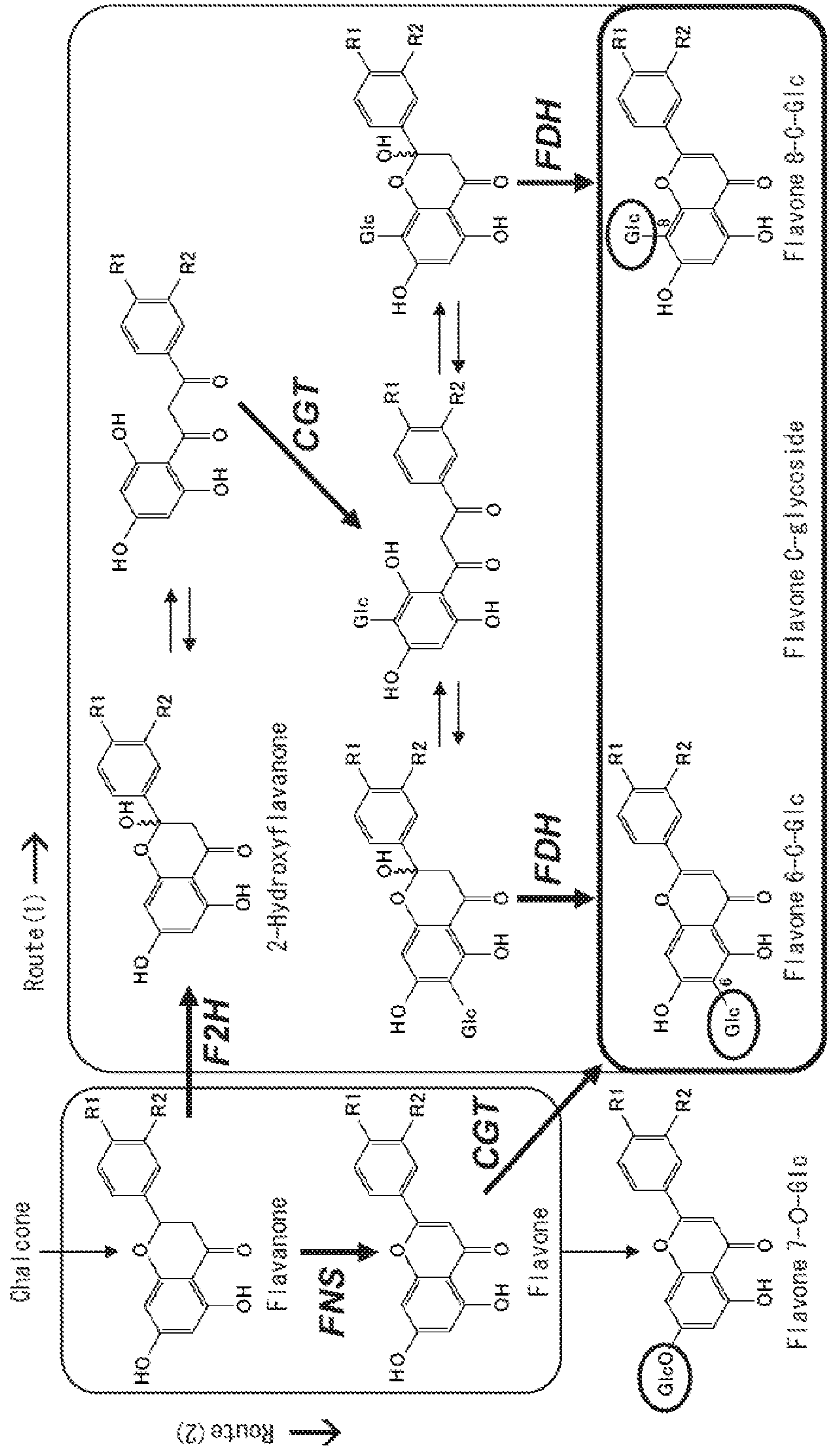
FIG. 1 shows the biosynthetic pathway for a flavone C-glycoside in a plant.
Figure 2:
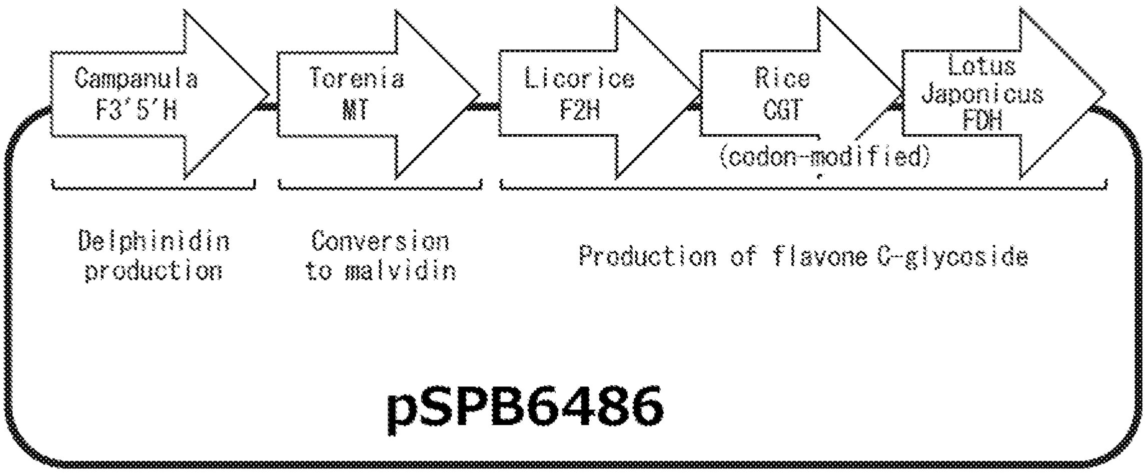
FIG. 2 shows the structure of pSPB6486.
Figure 3:
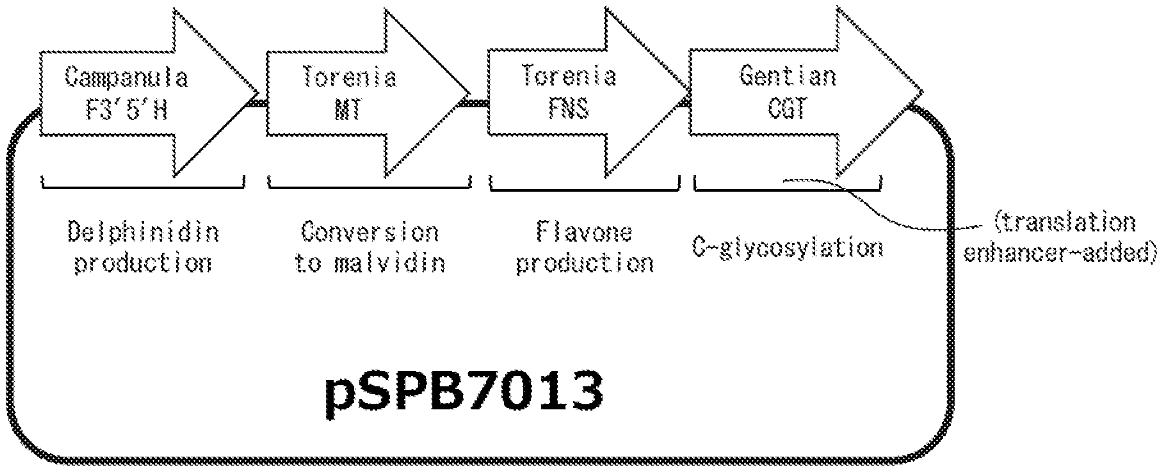
FIG. 3 shows the structure of pSPB7013.

Flavones are organic compounds that are flavan-derived cyclic ketones, and in plants they mainly exist as glycosides. Flavone, in the strict definition, refers to 2,3-didehydroflavan-4-one, which is a compound with chemical formula $C_{15}H_{10}O_2$ and molecular weight 222.24, but in the wider sense flavones are a category of flavonoids, a flavonoid being classified as a "flavone" if it has a flavone structure as the basic backbone and also lacks the hydroxyl group at the 3-position. As used herein, "flavone C-glycoside" means a glycoside of a flavone in the wide sense, i.e. a derivative falling under the definition of flavones, wherein an aglycone is directly bonded to the anomeric carbon of an aldose. Flavone C-glycosides include, but are not limited to, luteolin C-glycoside, tricetin C-glycoside, apigenin C-glycoside and acacetin C-glycoside. Flavone C-glycosides also include glycosides of apigenin, luteolin, tricetin and acacetin derivatives. Two routes are known for the biosynthetic pathway of flavone C-glycosides in plants (FIG. 1). In route 1, a flavone 6-C-glycoside and flavone 8-C-glycoside are produced through the activity of flavanone 2-hydroxylase (F2H), flavone C-glycosylase (CGT) and dehydratase (FDH). In route 2, on the other hand, a flavone 6-C-glycoside and flavone 8-C-glycoside are produced through the activity of flavone synthase (FNS) and flavone C-glycosylase (CGT). The flavone C-glycoside is preferably selected from the group consisting of flavone 6-C-glycosides, flavone 8-C-glycosides and a combination thereof, examples of which include apigenin 6-C-glycoside (isovitexin), apigenin 8-C-glycoside (vitexin), luteolin 6-C-glycoside (isoorientin), luteolin 8-C-glycoside (orientin), tricetin 6-C-glycoside, tricetin 8-C-glycoside, and their derivatives.

Accumulation of flavone C-glycosides in plant cells can be achieved by transformation of a host plant with a vector comprising genes necessary for route 1 (i.e. the flavanone 2-hydroxylase (F2H) gene, flavone C-glycosylase (CGT) gene and dehydratase (FDH) gene) or their homologs, or a vector comprising genes necessary for route 2 (i.e. the flavone synthase (FNS) gene and flavone C-glycosylase (CGT) gene) or their homologs.

The source of the F2H gene or its homolog that is a gene necessary for route 1 is not particularly restricted so long as it has the desired function, but it is preferably a licorice-derived F2H gene or its homolog, and selected from the group consisting of the following polynucleotides:

(a) a polynucleotide consisting of the nucleotide sequence listed as SEQ ID NO: 3;

(b) a polynucleotide that hybridizes with a polynucleotide consisting of a nucleotide sequence complementary to the nucleotide sequence listed as SEQ ID NO: 3 under stringent conditions and encodes a protein having the same activity as a protein encoded by the polynucleotide of (a);

(c) a polynucleotide encoding a protein consisting of the amino acid sequence listed as SEQ ID NO: 4;

(d) a polynucleotide encoding a protein consisting of an amino acid sequence that is an amino acid sequence listed as SEQ ID NO: 4 having a deletion, substitution, insertion and/or addition of one or more amino acids, and having the same activity as a protein encoded by the polynucleotide of (c); and (e) a polynucleotide encoding a protein having an amino acid sequence with at least 90% identity to the amino acid sequence listed as SEQ ID NO: 4 and having the same activity as a protein encoded by the polynucleotide of (c).

The source of the CGT gene or its homolog that is a gene necessary for route 1 is not particularly restricted so long as it has the desired function, but it is preferably a rice-derived codon usage-modified CGT gene or its homolog, and selected from the group consisting of the following polynucleotides:

(a) a polynucleotide consisting of the nucleotide sequence listed as SEQ ID NO: 13;

(b) a polynucleotide that hybridizes with a polynucleotide consisting of a nucleotide sequence complementary to the nucleotide sequence listed as SEQ ID NO: 13 under stringent conditions and encodes a protein having the same activity as a protein encoded by the polynucleotide of (a);

(c) a polynucleotide encoding a protein consisting of the amino acid sequence listed as SEQ ID NO: 14;

(d) a polynucleotide encoding a protein consisting of an amino acid sequence that is an amino acid sequence listed as SEQ ID NO: 14 having a deletion, substitution, insertion and/or addition of one or more amino acids, and having the same activity as a protein encoded by the polynucleotide of (c); and (e) a polynucleotide encoding a protein having an amino acid sequence with at least 90% identity to the amino acid sequence listed as SEQ ID NO: 14 and having the same activity as a protein encoded by the polynucleotide of (c).

The source of the FDH gene or its homolog that is a gene necessary for route 1 is not particularly restricted so long as it has the desired function, but it is preferably a *Lotus japonicus*-derived FDH gene or its homolog, and selected from the group consisting of the following polynucleotides:

(a) a polynucleotide consisting of the nucleotide sequence listed as SEQ ID NO: 15;

(b) a polynucleotide that hybridizes with a polynucleotide consisting of a nucleotide sequence complementary to the nucleotide sequence listed as SEQ ID NO: 15 under stringent conditions and encodes a protein having the same activity as a protein encoded by the polynucleotide of (a);

(c) a polynucleotide encoding a protein consisting of the amino acid sequence listed as SEQ ID NO: 16;

(d) a polynucleotide encoding a protein consisting of an amino acid sequence that is an amino acid sequence listed as SEQ ID NO: 16 having a deletion, substitution, insertion and/or addition of one or more amino acids, and having the same activity as a protein encoded by the polynucleotide of (c); and (e) a polynucleotide encoding a protein having an amino acid sequence with at least 90% identity to the amino acid sequence listed as SEQ ID NO: 16 and having the same activity as a protein encoded by the polynucleotide of (c).

The source of the FNS gene or its homolog that is a gene necessary for route 2 is not particularly restricted so long as it has the desired function, but it is preferably a torenia-derived FNS gene or its homolog, and selected from the group consisting of:

(a) a polynucleotide consisting of the nucleotide sequence listed as SEQ ID NO: 19;

(b) a polynucleotide that hybridizes with a polynucleotide consisting of a nucleotide sequence complementary to the nucleotide sequence listed as SEQ ID NO: 19 under stringent conditions and encodes a protein having the same activity as a protein encoded by the polynucleotide of (a);

(c) a polynucleotide encoding a protein consisting of the amino acid sequence listed as SEQ ID NO: 20;

(d) a polynucleotide encoding a protein consisting of an amino acid sequence that is an amino acid sequence listed as SEQ ID NO: 20 having a deletion, substitution, insertion and/or addition of one or more amino acids, and having the same activity as a protein encoded by the polynucleotide of (c); and (e) a polynucleotide encoding a protein having an amino acid sequence with at least 90% identity to the amino acid sequence listed as SEQ ID NO: 20 and having the same activity as a protein encoded by the polynucleotide of (c).

The source of the CGT gene or its homolog that is a gene necessary for route 2 is not particularly restricted so long as it has the desired function, but it is preferably a gentian-derived CGT gene or its homolog, and selected from the group consisting of:

(a) a polynucleotide consisting of the nucleotide sequence listed as SEQ ID NO: 21;

(b) a polynucleotide that hybridizes with a polynucleotide consisting of a nucleotide sequence complementary to the nucleotide sequence listed as SEQ ID NO: 21 under stringent conditions and encodes a protein having the same activity as a protein encoded by the polynucleotide of (2-a);

(c) a polynucleotide encoding a protein consisting of the amino acid sequence listed as SEQ ID NO: 22;

(d) a polynucleotide encoding a protein consisting of an amino acid sequence that is an amino acid sequence listed as SEQ ID NO: 22 having a deletion, substitution, insertion and/or addition of one or more amino acids, and having the same activity as a protein encoded by the polynucleotide of (2-c); and (e) a polynucleotide encoding a protein having an amino acid sequence with at least 90% identity to the amino acid sequence listed as SEQ ID NO: 22 and having the same activity as a protein encoded by the polynucleotide of (c).

CGT genes or their homologs that are genes necessary for route 2 preferably have the *Arabidopsis* alcohol dehydrogenase (ADH) gene 5'-untranslated region (5'-UTR) (SEQ ID NO: 23) added.

Even more surprisingly, the present inventors have found that, among flavone C-glycosides, the combination with swertisin, as a flavone C-glycoside wherein the hydroxyl group at position 7 is methylated, results in a bluer color, and have succeeded in obtaining a novel flavone 7-O-methyltransferase gene that transfers a methyl group to the hydroxyl group at position 7 of flavone C-glycoside obtained by route 1 or 2, from oboushibana, which is known as a (cultivated) variant of Asiatic dayflower.

An oboushibana-derived flavone 7-O-methyltransferase (CcFn-7OMT) gene or its homolog is selected from the group consisting of the following (a) to (e):

(a) a polynucleotide consisting of the nucleotide sequence listed as SEQ ID NO: 34;

(b) a polynucleotide that hybridizes with a polynucleotide consisting of a nucleotide sequence complementary to the nucleotide sequence listed as SEQ ID NO: 34 under stringent conditions and encoding a protein having activity of transferring a methyl group to the hydroxyl group at position 7 of flavone C-glycoside;

(c) a polynucleotide encoding a protein consisting of the amino acid sequence listed as SEQ ID NO: 35;

(d) a polynucleotide encoding a protein consisting of an amino acid sequence that is an amino acid sequence listed as SEQ ID NO: 35 having a deletion, substitution, insertion and/or addition of one or more amino acids, and having activity of transferring a methyl group to the hydroxyl group at position 7 of flavone C-glycoside; and (e) a polynucleotide encoding a protein having an amino acid sequence with at least 90% identity to the amino acid sequence listed as SEQ ID NO: 35 and having activity of transferring a methyl group to the hydroxyl group at position 7 of flavone C-glycoside.

Accumulation of delphinidin-type anthocyanins in plant cells can be achieved by incorporating a flavonoid F3',5'-hydroxylase (F3',5'H) gene or its homolog and a methyltransferase (MT) gene or its homolog in a host plant (PTL 2). By transforming a host plant with a vector comprising a F3',5'H gene or its homolog and an MT gene or its homolog in addition to a gene necessary for route 1 or its homolog, or a gene necessary for route 2 or its homolog, it is possible to cause a delphinidin-type anthocyanin and a flavone C-glycoside to coexist in the host plant cells.

The source of the F3',5'H gene or its homolog is not particularly restricted so long as it has the desired function, but it is preferably a *Campanula*-derived F3',5'H gene or its homolog, and selected from the group consisting of:

(a) a polynucleotide consisting of the nucleotide sequence listed as SEQ ID NO: 9;

(b) a polynucleotide that hybridizes with a polynucleotide consisting of a nucleotide sequence complementary to the nucleotide sequence listed as SEQ ID NO: 9 under stringent conditions and encodes a protein having the same activity as a protein encoded by the polynucleotide of (a);

(c) a polynucleotide encoding a protein consisting of the amino acid sequence listed as SEQ ID NO: 10;

(d) a polynucleotide encoding a protein consisting of an amino acid sequence that is an amino acid sequence listed as SEQ ID NO: 10 having a deletion, substitution, insertion and/or addition of one or more amino acids, and having the same activity as a protein encoded by the polynucleotide of (c); and (e) a polynucleotide encoding a protein having an amino acid sequence with at least 90% identity to the amino acid sequence listed as SEQ ID NO: 10 and having the same activity as a protein encoded by the polynucleotide of (c).

The source of the MT gene or its homolog is not particularly restricted so long as it has the desired function, but it is preferably a torenia-derived MT gene or its homolog, and selected from the group consisting of:

(a) a polynucleotide consisting of the nucleotide sequence listed as SEQ ID NO: 17;

(b) a polynucleotide that hybridizes with a polynucleotide consisting of a nucleotide sequence complementary to the nucleotide sequence listed as SEQ ID NO: 17 under stringent conditions and encodes a protein having the same activity as a protein encoded by the polynucleotide of (a);

(c) a polynucleotide encoding a protein consisting of the amino acid sequence listed as SEQ ID NO: 18;

(d) a polynucleotide encoding a protein consisting of an amino acid sequence that is an amino acid sequence listed as SEQ ID NO: 18 having a deletion, substitution, insertion and/or addition of one or more amino acids, and having the same activity as a protein encoded by the polynucleotide of (c); and (e) a polynucleotide encoding a protein having an amino acid sequence with at least 90% identity to the amino acid sequence listed as SEQ ID NO: 18 and having the same activity as a protein encoded by the polynucleotide of (c).

Throughout the present specification, the term "polynucleotide" refers to DNA or RNA.

As used herein, the term "stringent conditions" refers to conditions that allow specific binding between a polynucleotide or oligonucleotide and genomic DNA in a selective and detectable manner. Stringent conditions are defined by an appropriate combination of salt concentration, organic solvent (for example, formamide), temperature and other known conditions. Specifically, stringency is increased by reducing the salt concentration, increasing the organic solvent concentration or raising the hybridization temperature. Stringency is also affected by the rinsing conditions after hybridization. The rinsing conditions are defined by the salt concentration and temperature, and stringency of rinsing is increased by reducing the salt concentration and raising the temperature. Therefore, the term "stringent conditions" means conditions such that specific hybridization takes place only between nucleotide sequences with high identity, such as a degree of "identity" between the nucleotide sequences of about 80% or greater, preferably about 90% or greater, more preferably about 95% or greater, even more preferably 97% or greater and most preferably 98% or greater, on average. The "stringent conditions" may be, for example, a temperature of 60° C. to 68° C., a sodium concentration of 150 to 900 mM and preferably 600 to 900 mM, and a pH of 6 to 8, with specific examples including hybridization under conditions of 5×SSC (750 mM NaCl, 75 mM trisodium citrate), 1% SDS, 5×Denhardt solution, 50% formaldehyde, 42° C., and rinsing under conditions of 0.1×SSC (15 mM NaCl, 1.5 mM trisodium citrate), 0.1% SDS, 55° C.

The hybridization may be carried out by a method that is publicly known in the field or a similar method, such as the method described in Current Protocols in Molecular Biology (edited by Frederick M. Ausubel et al., 1987). When a commercially available library is to be used, the hybridization may be carried out according to the method described in the accompanying directions for use. The gene selected by hybridization may be naturally derived, such as plant-derived or non-plant-derived. The gene selected by the hybridization may also be cDNA, genomic DNA or chemically synthesized DNA.

The phrase "amino acid sequence having a deletion, substitution, insertion and/or addition of one or more amino acids" means an amino acid sequence having a deletion, substitution, insertion and/or addition of 1 to 20, preferably 1 to 5 and more preferably 1 to 3 arbitrary amino acids. Site-specific mutagenesis is a useful genetic engineering method as it allows introduction of specific mutations into specified sites, and it may be carried out by the method described in Molecular Cloning: A Laboratory Manual, $2^{nd}$ Ed., Cold Spring Harbor Laboratory Press, Cold Spring Harbor, N.Y., 1989. By expressing the mutant DNA using a suitable expression system, it is possible to obtain a protein consisting of an amino acid sequence having a deletion, substitution, insertion and/or addition of one or more amino acids.

A polynucleotide can be obtained by a method that is publicly known to those skilled in the art, such as a method of chemical synthesis using the phosphoramidite method, or a nucleic acid amplification method using a plant nucleic acid specimen as template, and primers designed based on the nucleotide sequence of the target gene.

Throughout the present specification, the term "identity" means, for polypeptide sequences (or amino acid sequences) or polynucleotide sequences (or nucleotide sequences), the quantity (number) of amino acid residues or nucleotides composing them that can be determined to be identical between the two chains, in the sense of mutual agreement between them, meaning the degree of sequence correlation between two polypeptide sequences or two polynucleotide sequences, and this "identity" can be easily calculated. Numerous methods are known for measuring identity between two polynucleotide sequences or polypeptide sequences, and the term "identity" is well known to those skilled in the art (for example, see Lesk, A. M. (Ed.), Computational Molecular Biology, Oxford University Press, New York, (1988); Smith, D. W. (Ed.), Biocomputing: Informatics and Genome Projects, Academic Press, New York, (1993); Grifin, A. M. & Grifin, H. G. (Ed.), Computer Analysis of Sequence Data: Part I, Human Press, New Jersey, (1994); von Heinje, G., Sequence Analysis in Molecular Biology, Academic Press, New York, (1987); Gribskov, M. & Devereux, J. (Ed.), Sequence Analysis Primer, M-Stockton Press, New York, (1991) and elsewhere).

Also, the numerical values for "identity" used in the present specification, unless otherwise specified, may be the numerical values calculated using an identity search program known to those skilled in the art, but they are preferably numerical values calculated using the ClustalW program of MacVector Application (version 9.5, Oxford Molecular Ltd., Oxford, England). According to the invention, the degree of "identity" between amino acid sequences is, for example, about 90% or greater, preferably about 95% or greater, more preferably about 97% or greater, and most preferably about 98% or greater.

The polynucleotide (nucleic acid, gene) of the invention "encodes" a protein of interest. Here, "encodes" means that it allows expression of the protein of interest in a state in which it exhibits its activity. Also, the term "encodes" includes both encoding a structural sequence (exon) that is a continuous section of the protein of interest, and encoding via an intervening sequence (intron).

A gene with a natural nucleotide sequence can be obtained by analysis using a DNA sequencer, for example. Also, DNA encoding an enzyme having a modified amino acid sequence can be synthesized using common site-specific mutagenesis or PCR, based on DNA having the natural nucleotide sequence. For example, a DNA fragment to be modified may be obtained by restriction enzyme treatment of natural cDNA or genomic DNA, and used as template for site-specific mutagenesis or PCR using primers with the desired mutation, to obtain a DNA fragment having the desired modification. The DNA fragment having the mutation may then be linked with a DNA fragment encoding another portion of the target enzyme.

Alternatively, in order to obtain DNA encoding an enzyme consisting of a shortened amino acid sequence, DNA encoding an amino acid sequence longer than the target amino acid sequence, such as the full-length amino acid sequence, may be cut with a desired restriction enzyme, and if the obtained DNA fragment does not code for the full target amino acid sequence, then a DNA fragment consisting of the sequence of the missing portion may be synthesized and linked to it.

By expressing the obtained polynucleotide using a gene expression system in *Escherichia coli* or yeast and measuring the enzyme activity, it is possible to confirm that the obtained polynucleotide encodes a protein with the desired activity.

The present invention relates to a (recombinant) vector, and especially an expression vector, including the aforementioned polynucleotide, and to *Chrysanthemum* plants transformed by the vector.

The vector of the invention also comprises an expression control region, such as a promoter, terminator and replication origin, that are dependent on the type of host plant into which it is introduced. Examples of promoters that constitutively express polynucleotides in plant cells include cauliflower mosaic virus 35S promoter, $El_2$ 35S promoter having two 35S promoter enhancer regions linked together, and the rd29A gene promoter, rbcS promoter and mac-1 promoter. For tissue-specific gene expression, a promoter for a gene expressed specifically in that tissue may be used.

The vector may be created by a common method using a restriction enzyme and ligase. Transformation of a host plant using the expression vector may also be carried out by a common method.

At the current level of technology, it is possible to use techniques to introduce a polynucleotide into a plant and constitutively or tissue-specifically express the polynucleotide. Transfer of the DNA into the plant may be carried out by a method known to those skilled in the art, such as the *Agrobacterium* method, binary vector method, electroporation method, PEG method or particle gun method.

Plants to be used as hosts for the invention are not particularly restricted and may be plants belonging to genus Rosaceae *Rosa*, Solanaceae *Petunia*, Compositae *Chrysanthemum*, Caryophyllaceae *Dianthus* (such as carnation) or Liliaceae *Lilium*, among which rose cultivar of Rosaceae *Rosa* (scientific name: *Rosa hybrida*) is especially preferred. The term "rose plant", as used herein, is a rose cultivar of Rosaceae *Rosa* (scientific name: *Rosa hybrida*), which is its taxonomical classification. Roses are largely classified as Hybrid Tea, Floribunda and Polyantha roses based on their tree form and flower size, with the major pigment (anthocyanin) in the petals of all lines being of two types, the cyanidin-type and pelargonidin-type. The type of rose plant used as a host for the invention is not particularly restricted, and any of these varieties or lines are suitable. For example, rose varieties to be used as hosts include Ocean Song, Noblesse, Rita Perfumera, Cool Water, Fame, Topless and Peach Avalanche.

According to the invention it is possible to obtain a transgenic plant, preferably of Rosaceae *Rosa*, Solanaceae *Petunia*, Compositae *Chrysanthemum* or Caryophyllaceae *Dianthus*, (carnation), and most preferably a rose plant, having modified flower color, wherein a delphinidin-type anthocyanin and a flavone C-glycoside are copresent in the cells. Particularly when the obtained transgenic plant is a rose plant, it exhibits a flower color in the Blue group or Violet-Blue group according to the RHS Color Chart, and/or with a hue angle of 339.7° to 270.0° in the CIEL*a*b* color system.

The invention still further relates to a cut flower of the obtained transgenic plant or its inbred or outbred progeny, or the propagules, partial plant body, tissue or cells, or a processed form created from the cut flower (especially processed cut flowers). The processed cut flowers referred to here include pressed flowers formed using cut flowers, or preserved flowers, dry flowers or resin sealed products, with no limitation to these.

The present invention will now be explained in greater detail by examples.

EXAMPLES

Example 1: Simulation of Flavone C-Glycoside Copigment Effect with Anthocyanins An anthocyanin and flavone C-glycoside were prepared to simulate the copigment effect of flavone C-glycoside on anthocyanin. The malvin (malvidin 3,5-diglycoside) and isovitexin (apigenin 6-C-glycoside) used for the experiment were purchased from Funakoshi Corp.

The flavone C-glycoside (isovitexin) was added to the anthocyanin (malvin) at 0, 2 and 4-equivalent molar concentrations in a buffering solution at pH 4.5, and the absorption spectra were measured. The anthocyanin concentration was 0.5 mM.

Addition of the flavone C-glycoside increased the absorbance of the anthocyanin solution, shifting the absorption maximum (λmax) toward the long wavelength end with increasing addition of flavone C-glycoside. This demonstrated that the copigment effect of isovitexin is exhibited with malvin.

TABLE 1

| | Absorption maximum of anthocyanin solution with addition of flavone C-glycoside (λmax) | | |
|---|---|---|---|
| | 0 equivalent | 2 equivalents | 4 equivalents |
| Malvin (malvidin 3,5-diglycoside) | 531.8 nm | 566.4 nm | 573.0 nm |

Example 2: (Route 1) Transfer of Pansy-Derived F3',5'H #40 Gene, Licorice-Derived F2H Gene, Rice-Derived CGT Gene and Licorice-Derived FDH Gene into Rose Variety "Rita Perfumera"

Plasmid pSPB4743 has pBINPLUS as the basic backbone, and contains the following four expression cassettes.

(1) $El_2$ 35S promoter, pansy-derived F3',5'H full-length cDNA (SEQ ID NO: 1) and D8 terminator (2) 35S promoter, licorice-derived F2H full-length cDNA (SEQ ID NO: 3) and perilla-derived AT terminator (3) 35S promoter, rice-derived CGT full-length cDNA (SEQ ID NO: 5) and perilla-derived AT terminator (4) 35S promoter, licorice-derived FDH full-length cDNA (SEQ ID NO: 7) and perilla-derived AT terminator This plasmid constitutively expresses the pansy F3',5'H #40 gene, the licorice F2H gene, the rice CGT gene and the licorice FDH gene in plants.

The constructed plasmid pSPB4743 was introduced into the orange rose variety "Rita Perfumera", and a total of 16 transformants were obtained. Upon pigment analysis, delphinidin storage was confirmed in 15 transformants, with a maximum delphinidin content of 94% (average: 89.5%). The flavone C-glycoside isovitexin was also confirmed in 10 of the transformants, with maximum production of 0.55 mg per 1 g of fresh petal weight.

The measured values for the transformants are shown in Table 2 below.

TABLE 2

| Plant | Del | Anthocyanidin (mg/g) | | | Flavonol (mg/g) | | | Flavone (mg/g) | | | Flavone C-glycoside (mg/g) |
|---|---|---|---|---|---|---|---|---|---|---|---|
| No. | (%) | Del | Cya | Pel | M | Q | K | Tri | Lut | Api | IVX |
| Host | 0.0% | 0.000 | 0.009 | 0.013 | 0.000 | 0.019 | 2.109 | 0.000 | 0.000 | 0.000 | 0.000 |
| 1 | 87.8% | 0.967 | 0.134 | 0.001 | 0.318 | 0.135 | 0.392 | 0.000 | 0.000 | 0.000 | 0.255 |
| 2 | 84.5% | 0.772 | 0.138 | 0.004 | 0.602 | 0.245 | 1.326 | 0.000 | 0.000 | 0.000 | 0.029 |
| 3 | 85.6% | 0.810 | 0.137 | 0.000 | 0.044 | 0.019 | 0.046 | 0.000 | 0.000 | 0.000 | 0.033 |
| 4 | 92.3% | 1.289 | 0.108 | 0.000 | 0.478 | 0.111 | 0.239 | 0.000 | 0.005 | 0.000 | 0.232 |
| 5 | 92.4% | 1.146 | 0.092 | 0.002 | 0.759 | 0.199 | 1.218 | 0.000 | 0.003 | 0.007 | 0.171 |
| 6 | 93.0% | 1.683 | 0.127 | 0.000 | 1.034 | 0.242 | 0.318 | 0.000 | 0.003 | 0.000 | 0.208 |
| 7 | 90.9% | 0.929 | 0.091 | 0.003 | 0.518 | 0.149 | 0.994 | 0.000 | 0.000 | 0.000 | 0.000 |
| 8 | 91.7% | 0.836 | 0.070 | 0.005 | 0.367 | 0.115 | 1.807 | 0.000 | 0.004 | 0.014 | 0.225 |
| 9 | 94.0% | 1.222 | 0.078 | 0.000 | 0.674 | 0.151 | 0.242 | 0.000 | 0.021 | 0.039 | 0.547 |
| 10 | 92.2% | 1.116 | 0.095 | 0.000 | 0.561 | 0.134 | 0.256 | 0.000 | 0.012 | 0.018 | 0.213 |
| 11 | 83.9% | 1.318 | 0.251 | 0.002 | 0.353 | 0.174 | 0.311 | 0.000 | 0.000 | 0.000 | 0.000 |
| 12 | 85.7% | 0.131 | 0.020 | 0.002 | 0.068 | 0.040 | 1.017 | 0.013 | 0.027 | 0.204 | 0.091 |

Host: Rita Perfumera
Del: delphinidin,
Cya: cyanidin,
Pel: pelargonidin
M: myricetin,
Q: quercetin,
K: kaempferol
Tri: tricetin,
Lut: luteolin,
Api: apigenin,
IVX: isovitexin
Del (%): Proportion of delphinidin in total anthocyanidins

Example 3: (Route 1) Transfer of Pansy-Derived F3',5'H #40 Gene, Licorice-Derived F2H Gene, Rice-Derived CGT Gene and Licorice-Derived FDH Gene into Rose Variety "Noblesse"

Plasmid pSPB4743 constructed in the same manner as Example 2 was introduced into the pink rose variety "Noblesse", and a total of 20 transformants were obtained. Upon pigment analysis, delphinidin storage was confirmed in all of transformants, with a maximum delphinidin content of 88% (average: 83.5%). The flavone C-glycoside isovitexin was also confirmed in 18 of the transformants, with maximum production of 0.06 mg per 1 g of fresh petal weight.

The measured values for representative transformants are shown in Table 3 below.

TABLE 3

| Plant | Del | Anthocyanidin (mg/g) | | | Flavonol (mg/g) | | | Flavone (mg/g) | | | Flavone C-glycoside (mg/g) |
|---|---|---|---|---|---|---|---|---|---|---|---|
| No. | (%) | Del | Cya | Pel | M | Q | K | Tri | Lut | Api | IVX |
| Host | 0.0% | 0.020 | 0.040 | 0.000 | 0.000 | 0.012 | 1.430 | 0.000 | 0.000 | 0.000 | 0.000 |
| 1 | 85.1% | 1.127 | 0.196 | 0.003 | 0.320 | 0.041 | 0.072 | 0.000 | 0.100 | 0.487 | 0.036 |
| 2 | 85.6% | 2.078 | 0.348 | 0.004 | 0.309 | 0.036 | 0.059 | 0.016 | 0.074 | 0.333 | 0.000 |
| 3 | 85.3% | 1.011 | 0.174 | 0.002 | 0.223 | 0.023 | 0.038 | 0.015 | 0.110 | 0.491 | 0.013 |
| 4 | 85.2% | 0.875 | 0.152 | 0.002 | 0.273 | 0.039 | 0.057 | 0.000 | 0.065 | 0.303 | 0.052 |
| 5 | 83.7% | 1.603 | 0.311 | 0.003 | 0.230 | 0.043 | 0.072 | 0.000 | 0.092 | 0.366 | 0.056 |
| 6 | 87.7% | 3.405 | 0.475 | 0.002 | 0.443 | 0.055 | 0.070 | 0.060 | 0.121 | 0.431 | 0.031 |
| 7 | 80.5% | 2.418 | 0.581 | 0.005 | 0.409 | 0.077 | 0.154 | 0.020 | 0.083 | 0.399 | 0.000 |
| 8 | 84.4% | 1.154 | 0.212 | 0.003 | 0.251 | 0.042 | 0.084 | 0.000 | 0.073 | 0.388 | 0.046 |
| 9 | 82.4% | 1.150 | 0.241 | 0.007 | 0.341 | 0.050 | 0.134 | 0.000 | 0.039 | 0.208 | 0.030 |
| 10 | 83.7% | 1.017 | 0.197 | 0.002 | 0.259 | 0.039 | 0.053 | 0.000 | 0.115 | 0.630 | 0.022 |
| 11 | 87.2% | 1.051 | 0.153 | 0.003 | 0.261 | 0.030 | 0.055 | 0.003 | 0.074 | 0.364 | 0.023 |
| 12 | 80.3% | 1.416 | 0.342 | 0.008 | 0.239 | 0.052 | 0.144 | 0.000 | 0.055 | 0.332 | 0.017 |
| 13 | 80.9% | 0.946 | 0.223 | 0.004 | 0.157 | 0.039 | 0.077 | 0.000 | 0.080 | 0.465 | 0.048 |
| 14 | 83.3% | 1.129 | 0.224 | 0.005 | 0.307 | 0.047 | 0.112 | 0.000 | 0.038 | 0.199 | 0.017 |
| 15 | 80.7% | 1.220 | 0.291 | 0.006 | 0.320 | 0.065 | 0.150 | 0.000 | 0.049 | 0.359 | 0.024 |
| 16 | 86.1% | 1.815 | 0.292 | 0.003 | 0.383 | 0.052 | 0.104 | 0.000 | 0.089 | 0.598 | 0.028 |
| 17 | 85.5% | 1.150 | 0.197 | 0.000 | 0.425 | 0.066 | 0.141 | 0.000 | 0.061 | 0.490 | 0.051 |
| 18 | 82.1% | 1.187 | 0.254 | 0.006 | 0.277 | 0.046 | 0.119 | 0.000 | 0.053 | 0.392 | 0.031 |
| 19 | 78.9% | 0.845 | 0.219 | 0.009 | 0.236 | 0.048 | 0.143 | 0.000 | 0.035 | 0.270 | 0.018 |
| 20 | 82.2% | 0.859 | 0.185 | 0.003 | 0.259 | 0.041 | 0.079 | 0.000 | 0.048 | 0.295 | 0.032 |

Host: Noblesse
Del: delphinidin,
Cya: cyanidin,
Pel: pelargonidin
M: myricetin,
Q: quercetin,
K: kaempferol
Tri: tricetin,
Lut: luteolin,
Api: apigenin,
IVX: isovitexin
Del (%): Proportion of delphinidin in total anthocyanidins

Example 4: (Route 1) Transfer of *Campanula*-Derived F3',5'H Gene, Licorice-Derived F2H Gene, Rice-Derived CGT Gene and Rice-Derived FDH Gene into Rose Variety "Rita Perfumera"

Plasmid pSPB6188 has pBINPLUS as the basic backbone, and contains the following four expression cassettes.

(1) $El_2$ 35S promoter, *Campanula*-derived F3',5'H full-length cDNA (SEQ ID NO: 9) and D8 terminator (2) 35S promoter, licorice-derived F2H full-length cDNA (SEQ ID NO: 3) and perilla-derived AT terminator (3) $El_2$ 35S promoter, rice-derived CGT full-length cDNA (SEQ ID NO: 5) and perilla-derived AT terminator (4) $El_2$ 35S promoter, rice-derived FDH full-length cDNA (SEQ ID NO: 11) and *Arabidopsis thaliana*-derived HSP terminator This plasmid constitutively expresses the *Campanula* F3',5'H gene, the licorice F2H gene, the rice CGT gene and the rice FDH gene in plants.

The constructed plasmid pSPB6188 was introduced into the orange rose variety "Rita Perfumera", and a total of 77 transformants were obtained. Upon pigment analysis, delphinidin storage was confirmed in 68 transformants, with a maximum delphinidin content of 99.6% (average: 93.3%). The flavone C-glycoside isovitexin was also confirmed in 57 of the transformants, with maximum production of 0.72 mg per 1 g of fresh petal weight.

The measured values for representative transformants are shown in Table 4 below.

TABLE 4

| Plant | Del | Anthocyanidin (mg/g) | | | Flavonol (mg/g) | | | Flavone (mg/g) | | | Flavone C-glycoside (mg/g) |
|---|---|---|---|---|---|---|---|---|---|---|---|
| No. | (%) | Del | Cya | Pel | M | Q | K | Tri | Lut | Api | IVX |
| Host | 0.0% | 0.000 | 0.009 | 0.013 | 0.000 | 0.019 | 2.109 | 0.000 | 0.000 | 0.000 | 0.000 |
| 1 | 96.8% | 1.455 | 0.048 | 0.000 | 0.545 | 0.115 | 0.211 | 0.000 | 0.015 | 0.019 | 0.196 |
| 2 | 96.1% | 0.870 | 0.035 | 0.000 | 0.301 | 0.081 | 0.258 | 0.000 | 0.035 | 0.069 | 0.093 |
| 3 | 93.0% | 0.647 | 0.049 | 0.000 | 0.450 | 0.175 | 0.459 | 0.000 | 0.001 | 0.000 | 0.050 |
| 4 | 96.8% | 1.166 | 0.039 | 0.000 | 0.609 | 0.143 | 0.202 | 0.000 | 0.002 | 0.001 | 0.086 |
| 5 | 97.1% | 1.384 | 0.041 | 0.000 | 0.473 | 0.100 | 0.134 | 0.000 | 0.003 | 0.000 | 0.087 |
| 6 | 95.3% | 0.632 | 0.031 | 0.000 | 0.387 | 0.101 | 0.137 | 0.000 | 0.000 | 0.000 | 0.037 |
| 7 | 93.9% | 1.274 | 0.083 | 0.000 | 0.426 | 0.166 | 0.284 | 0.000 | 0.003 | 0.001 | 0.039 |
| 8 | 95.7% | 0.802 | 0.036 | 0.000 | 0.300 | 0.083 | 0.100 | 0.000 | 0.002 | 0.000 | 0.070 |
| 9 | 94.7% | 1.522 | 0.085 | 0.000 | 0.526 | 0.198 | 0.382 | 0.000 | 0.002 | 0.000 | 0.033 |
| 10 | 94.4% | 1.412 | 0.084 | 0.000 | 0.350 | 0.152 | 0.232 | 0.000 | 0.002 | 0.000 | 0.039 |
| 11 | 93.7% | 1.300 | 0.088 | 0.000 | 0.286 | 0.114 | 0.175 | 0.000 | 0.002 | 0.001 | 0.137 |
| 12 | 97.5% | 1.842 | 0.047 | 0.000 | 0.589 | 0.088 | 0.072 | 0.000 | 0.010 | 0.005 | 0.042 |
| 13 | 97.5% | 1.423 | 0.037 | 0.000 | 0.416 | 0.066 | 0.046 | 0.000 | 0.010 | 0.007 | 0.024 |
| 14 | 95.0% | 0.935 | 0.049 | 0.000 | 0.456 | 0.161 | 0.302 | 0.000 | 0.001 | 0.000 | 0.054 |
| 15 | 93.7% | 1.272 | 0.085 | 0.000 | 0.509 | 0.224 | 0.547 | 0.000 | 0.001 | 0.001 | 0.063 |
| 16 | 93.2% | 0.504 | 0.037 | 0.000 | 0.166 | 0.063 | 0.122 | 0.000 | 0.000 | 0.000 | 0.049 |
| 17 | 93.7% | 1.158 | 0.078 | 0.000 | 0.466 | 0.208 | 0.652 | 0.000 | 0.000 | 0.000 | 0.042 |
| 18 | 98.2% | 1.152 | 0.021 | 0.000 | 0.514 | 0.072 | 0.063 | 0.000 | 0.003 | 0.001 | 0.098 |
| 19 | 94.8% | 1.171 | 0.065 | 0.000 | 0.226 | 0.072 | 0.104 | 0.000 | 0.002 | 0.001 | 0.148 |
| 20 | 90.1% | 0.729 | 0.078 | 0.002 | 0.268 | 0.188 | 0.760 | 0.000 | 0.003 | 0.006 | 0.263 |
| 21 | 93.2% | 1.120 | 0.082 | 0.000 | 0.449 | 0.240 | 0.912 | 0.000 | 0.000 | 0.000 | 0.034 |
| 22 | 93.9% | 1.169 | 0.076 | 0.000 | 0.394 | 0.168 | 0.264 | 0.000 | 0.002 | 0.000 | 0.058 |
| 23 | 98.5% | 1.387 | 0.021 | 0.000 | 0.603 | 0.072 | 0.051 | 0.000 | 0.031 | 0.026 | 0.029 |
| 24 | 94.7% | 1.319 | 0.074 | 0.000 | 0.604 | 0.214 | 0.354 | 0.000 | 0.002 | 0.000 | 0.062 |
| 25 | 96.9% | 1.859 | 0.060 | 0.000 | 0.765 | 0.169 | 0.195 | 0.000 | 0.003 | 0.000 | 0.262 |
| 26 | 75.8% | 0.078 | 0.023 | 0.002 | 0.021 | 0.031 | 0.548 | 0.008 | 0.004 | 0.089 | 0.719 |
| 27 | 97.7% | 1.847 | 0.043 | 0.000 | 0.404 | 0.071 | 0.064 | 0.003 | 0.004 | 0.003 | 0.226 |
| 28 | 94.4% | 0.934 | 0.056 | 0.000 | 0.294 | 0.110 | 0.122 | 0.003 | 0.002 | 0.001 | 0.109 |
| 29 | 94.5% | 1.106 | 0.065 | 0.000 | 0.280 | 0.118 | 0.122 | 0.003 | 0.002 | 0.002 | 0.083 |
| 30 | 94.4% | 0.621 | 0.037 | 0.000 | 0.294 | 0.094 | 0.160 | 0.001 | 0.001 | 0.002 | 0.066 |
| 31 | 98.5% | 1.668 | 0.026 | 0.000 | 0.616 | 0.072 | 0.036 | 0.005 | 0.010 | 0.009 | 0.041 |
| 32 | 98.2% | 2.288 | 0.042 | 0.000 | 0.618 | 0.081 | 0.077 | 0.008 | 0.023 | 0.022 | 0.160 |
| 33 | 98.4% | 2.080 | 0.033 | 0.000 | 0.525 | 0.067 | 0.048 | 0.005 | 0.012 | 0.010 | 0.142 |
| 34 | 97.2% | 1.059 | 0.031 | 0.000 | 0.569 | 0.108 | 0.169 | 0.005 | 0.011 | 0.014 | 0.213 |
| 35 | 98.0% | 1.029 | 0.021 | 0.000 | 0.199 | 0.031 | 0.028 | 0.002 | 0.010 | 0.009 | 0.047 |
| 36 | 96.9% | 1.338 | 0.043 | 0.000 | 0.252 | 0.056 | 0.111 | 0.004 | 0.005 | 0.006 | 0.165 |
| 37 | 97.7% | 1.493 | 0.035 | 0.000 | 0.422 | 0.078 | 0.040 | 0.004 | 0.006 | 0.004 | 0.076 |
| 38 | 95.7% | 1.305 | 0.059 | 0.000 | 0.391 | 0.128 | 0.105 | 0.007 | 0.003 | 0.002 | 0.113 |
| 39 | 97.9% | 1.199 | 0.026 | 0.000 | 0.280 | 0.048 | 0.030 | 0.004 | 0.010 | 0.006 | 0.035 |
| 40 | 94.7% | 1.284 | 0.072 | 0.000 | 0.264 | 0.090 | 0.113 | 0.007 | 0.002 | 0.002 | 0.068 |
| 41 | 94.4% | 0.517 | 0.031 | 0.000 | 0.106 | 0.037 | 0.042 | 0.000 | 0.003 | 0.002 | 0.070 |
| 42 | 97.0% | 1.734 | 0.053 | 0.000 | 0.867 | 0.169 | 0.183 | 0.007 | 0.006 | 0.008 | 0.076 |
| 43 | 90.6% | 0.617 | 0.064 | 0.001 | 0.183 | 0.097 | 0.259 | 0.003 | 0.001 | 0.003 | 0.055 |
| 44 | 97.0% | 1.157 | 0.036 | 0.000 | 0.258 | 0.053 | 0.038 | 0.002 | 0.008 | 0.006 | 0.059 |
| 45 | 97.6% | 1.662 | 0.041 | 0.000 | 0.382 | 0.077 | 0.041 | 0.001 | 0.003 | 0.001 | 0.125 |
| 46 | 98.2% | 1.456 | 0.026 | 0.000 | 0.620 | 0.083 | 0.050 | 0.003 | 0.005 | 0.004 | 0.125 |
| 47 | 97.9% | 0.875 | 0.019 | 0.000 | 0.271 | 0.035 | 0.018 | 0.002 | 0.018 | 0.013 | 0.018 |
| 48 | 98.2% | 1.281 | 0.024 | 0.000 | 0.171 | 0.025 | 0.018 | 0.001 | 0.011 | 0.008 | 0.048 |
| 49 | 95.1% | 1.611 | 0.083 | 0.000 | 0.684 | 0.235 | 0.338 | 0.014 | 0.002 | 0.000 | 0.202 |
| 50 | 93.4% | 0.779 | 0.056 | 0.000 | 0.217 | 0.091 | 0.125 | 0.002 | 0.001 | 0.002 | 0.078 |

Host: Rita Perfumera
Del: delphinidin,
Cya: cyanidin,
Pel: pelargonidin
M: myricetin,
Q: quercetin,
K: kaempferol
Tri: tricetin,
Lut: luteolin,
Api: apigenin,
IVX: isovitexin
Del (%): Proportion of delphinidin in total anthocyanidins

Example 5: (Route 1) Transfer of *Campanula*-Derived F3',5'H Gene, Licorice-Derived F2H Gene, Rice-Derived CGT Gene and Licorice-Derived FDH Gene into Rose Variety "Noblesse"

Plasmid pSPB6188 constructed in the same manner as Example 4 was introduced into the pink rose variety "Noblesse", and a total of 51 transformants were obtained. Upon pigment analysis, delphinidin storage was confirmed in all of transformants, with a maximum delphinidin content of 99.7% (average: 66.9%). The flavone C-glycoside isovitexin was also confirmed in 48 of the transformants, with maximum production of 0.58 mg isovitexin per 1 g of fresh petal weight.

The measured values for representative transformants are shown in Table 5 below.

Example 6: (Route 1) Transfer of Pansy-Derived F3',5'H #40 Gene, Licorice-Derived F2H Gene, Rice-Derived CGT Gene and Licorice-Derived Codon Usage-Modified CGT Gene and *Lotus japonicus*-Derived FDH Gene into Rose Variety "Rita Perfumera"

Plasmid pSPB5588 has pBINPLUS as the basic backbone, and contains the following four expression cassettes.

(1) $El_2$ 35S promoter, pansy-derived F3',5'H full-length cDNA (SEQ ID NO: 1) and D8 terminator (2) 35S promoter, licorice-derived F2H full-length cDNA (SEQ ID NO: 3) and perilla-derived AT terminator (3) 35S promoter, rice-derived codon usage-modified CGT full-length cDNA (SEQ ID NO: 13) and *Arabidopsis thaliana*-derived HSP terminator

TABLE 5

| Plant | Del | Anthocyanidin (mg/g) | | | Flavonol (mg/g) | | | Flavone (mg/g) | | | Flavone C-glycoside (mg/g) |
|---|---|---|---|---|---|---|---|---|---|---|---|
| No. | (%) | Del | Cya | Pel | M | Q | K | Tri | Lut | Api | IVX |
| Host | 0.0 | 0.020 | 0.040 | 0.000 | 0.000 | 0.012 | 1.430 | 0.000 | 0.000 | 0.000 | 0.000 |
| 1 | 97.1 | 1.312 | 0.039 | 0.000 | 0.382 | 0.026 | 0.055 | 0.008 | 0.002 | 0.004 | 0.553 |
| 2 | 97.0 | 1.562 | 0.049 | 0.000 | 0.501 | 0.036 | 0.085 | 0.012 | 0.002 | 0.004 | 0.580 |
| 3 | 96.6 | 1.185 | 0.042 | 0.000 | 0.423 | 0.030 | 0.075 | 0.010 | 0.002 | 0.005 | 0.523 |
| 4 | 76.3 | 0.522 | 0.139 | 0.024 | 0.100 | 0.034 | 0.609 | 0.044 | 0.010 | 0.092 | 0.033 |
| 5 | 92.9 | 0.475 | 0.033 | 0.003 | 0.130 | 0.015 | 0.104 | 0.014 | 0.026 | 0.111 | 0.044 |
| 6 | 86.2 | 0.374 | 0.055 | 0.005 | 0.119 | 0.029 | 0.182 | 0.017 | 0.016 | 0.128 | 0.061 |
| 7 | 73.0 | 0.244 | 0.075 | 0.016 | 0.029 | 0.011 | 0.154 | 0.011 | 0.014 | 0.086 | 0.020 |
| 8 | 89.9 | 0.201 | 0.020 | 0.003 | 0.026 | 0.005 | 0.046 | 0.020 | 0.128 | 0.264 | 0.132 |
| 9 | 75.7 | 0.217 | 0.060 | 0.010 | 0.044 | 0.017 | 0.158 | 0.025 | 0.074 | 0.302 | 0.327 |
| 10 | 89.5 | 0.881 | 0.095 | 0.009 | 0.057 | 0.013 | 0.088 | 0.007 | 0.007 | 0.027 | 0.252 |
| 11 | 92.0 | 0.667 | 0.055 | 0.004 | 0.189 | 0.030 | 0.182 | 0.017 | 0.008 | 0.028 | 0.305 |
| 12 | 93.2 | 0.523 | 0.035 | 0.003 | 0.110 | 0.015 | 0.083 | 0.007 | 0.013 | 0.062 | 0.227 |
| 13 | 66.1 | 0.211 | 0.098 | 0.012 | 0.053 | 0.027 | 0.335 | 0.018 | 0.023 | 0.303 | 0.104 |
| 14 | 66.5 | 0.172 | 0.068 | 0.020 | 0.057 | 0.020 | 0.362 | 0.023 | 0.003 | 0.049 | 0.017 |
| 15 | 88.9 | 0.908 | 0.101 | 0.013 | 0.127 | 0.025 | 0.288 | 0.043 | 0.117 | 0.335 | 0.202 |
| 16 | 51.0 | 0.120 | 0.106 | 0.010 | 0.023 | 0.032 | 0.413 | 0.023 | 0.034 | 0.519 | 0.130 |
| 17 | 41.3 | 0.121 | 0.136 | 0.037 | 0.038 | 0.028 | 0.926 | 0.038 | 0.015 | 0.348 | 0.086 |
| 18 | 58.8 | 0.262 | 0.165 | 0.020 | 0.029 | 0.035 | 0.476 | 0.032 | 0.039 | 0.465 | 0.136 |
| 19 | 96.0 | 0.888 | 0.037 | 0.001 | 0.425 | 0.037 | 0.133 | 0.013 | 0.002 | 0.003 | 0.266 |
| 20 | 94.9 | 0.783 | 0.043 | 0.000 | 0.611 | 0.060 | 0.287 | 0.016 | 0.002 | 0.006 | 0.178 |
| 21 | 99.4 | 0.727 | 0.004 | 0.000 | 0.255 | 0.004 | 0.002 | 0.020 | 0.091 | 0.055 | 0.266 |
| 22 | 99.6 | 0.860 | 0.004 | 0.000 | 0.258 | 0.002 | 0.002 | 0.027 | 0.134 | 0.097 | 0.123 |
| 23 | 99.7 | 1.028 | 0.004 | 0.000 | 0.367 | 0.004 | 0.002 | 0.025 | 0.124 | 0.093 | 0.223 |
| 24 | 93.3 | 0.682 | 0.049 | 0.000 | 0.188 | 0.009 | 0.017 | 0.031 | 0.165 | 0.260 | 0.346 |
| 25 | 99.0 | 0.861 | 0.009 | 0.000 | 0.397 | 0.007 | 0.006 | 0.023 | 0.130 | 0.139 | 0.151 |
| 26 | 99.6 | 0.374 | 0.001 | 0.000 | 0.227 | 0.002 | 0.001 | 0.030 | 0.156 | 0.142 | 0.095 |
| 27 | 60.9 | 0.112 | 0.067 | 0.005 | 0.019 | 0.016 | 0.105 | 0.015 | 0.118 | 0.759 | 0.248 |
| 28 | 91.3 | 0.941 | 0.087 | 0.003 | 0.354 | 0.033 | 0.138 | 0.014 | 0.001 | 0.003 | 0.234 |
| 29 | 98.2 | 0.820 | 0.015 | 0.000 | 0.334 | 0.012 | 0.023 | 0.016 | 0.067 | 0.074 | 0.046 |

Host: Noblesse
Del: delphinidin,
Cya: cyanidin,
Pel: pelargonidin
M: myricetin,
Q: quercetin,
K: kaempferol
Tri: tricetin,
Lut: luteolin,
Api: apigenin,
IVX: isovitexin
Del (%): Proportion of delphinidin in total anthocyanidins (4) 35S promoter, *Lotus japonicus*-derived FDH full-length cDNA (SEQ ID NO: 15) and *Arabidopsis thaliana*-derived HSP terminator This plasmid constitutively expresses the pansy F3',5'H #40 gene, the licorice F2H gene, the rice codon usage-modified CGT gene and the *Lotus japonicus* FDH gene in plants.

The constructed plasmid pSPB5588 was introduced into the orange rose variety "Rita Perfumera", and a total of 92 transformants were obtained. Delphinidin storage was confirmed in 44 of 65 pigment-analyzed transformants, with a maximum delphinidin content of 100% (average: 62.3%). The flavone C-glycoside isovitexin was also confirmed in 37 of the transformants, with high maximum production of 2.02 mg per 1 g of fresh petal weight.

The measured values for representative transformants are shown in Table 6 below.

TABLE 6

| Plant | Del | Anthocyanidin (mg/g) | | | Flavonol (mg/g) | | | Flavone (mg/g) | | | Flavone C-glycoside (mg/g) |
|---|---|---|---|---|---|---|---|---|---|---|---|
| No. | (%) | Del | Cya | Pel | M | Q | K | Tri | Lut | Api | IVX |
| Host | 0.0% | 0.000 | 0.009 | 0.013 | 0.000 | 0.019 | 2.109 | 0.000 | 0.000 | 0.000 | 0.000 |
| 1 | 89.3% | 0.819 | 0.097 | 0.002 | 0.864 | 0.289 | 0.922 | 0.000 | 0.000 | 0.000 | 0.151 |
| 2 | 90.2% | 0.404 | 0.044 | 0.001 | 0.583 | 0.213 | 1.008 | 0.000 | 0.000 | 0.000 | 0.028 |
| 3 | 77.6% | 0.116 | 0.029 | 0.004 | 0.120 | 0.090 | 2.945 | 0.000 | 0.000 | 0.000 | 0.291 |
| 4 | 71.7% | 0.091 | 0.033 | 0.003 | 0.118 | 0.092 | 1.174 | 0.000 | 0.000 | 0.017 | 0.231 |
| 5 | 70.8% | 0.144 | 0.054 | 0.006 | 0.010 | 0.028 | 0.387 | 0.000 | 0.003 | 0.025 | 0.446 |
| 6 | 83.4% | 0.655 | 0.128 | 0.003 | 0.547 | 0.338 | 1.877 | 0.000 | 0.007 | 0.022 | 0.368 |
| 7 | 84.9% | 0.625 | 0.111 | 0.001 | 0.293 | 0.146 | 0.311 | 0.000 | 0.007 | 0.028 | 0.085 |
| 8 | 100.0% | 0.107 | 0.000 | 0.000 | 0.286 | 0.147 | 0.510 | 0.000 | 0.000 | 0.000 | 0.007 |
| 9 | 69.3% | 0.055 | 0.022 | 0.002 | 0.039 | 0.034 | 0.815 | 0.000 | 0.000 | 0.045 | 0.127 |
| 10 | 67.6% | 0.061 | 0.026 | 0.003 | 0.057 | 0.049 | 1.131 | 0.000 | 0.000 | 0.093 | 0.267 |
| 11 | 46.7% | 0.031 | 0.032 | 0.004 | 0.000 | 0.047 | 1.150 | 0.000 | 0.003 | 0.070 | 0.547 |
| 12 | 60.0% | 0.052 | 0.028 | 0.007 | 0.029 | 0.030 | 1.066 | 0.000 | 0.000 | 0.071 | 0.188 |
| 13 | 64.6% | 0.029 | 0.013 | 0.003 | 0.034 | 0.031 | 1.096 | 0.000 | 0.000 | 0.087 | 0.199 |
| 14 | 68.9% | 0.046 | 0.017 | 0.003 | 0.048 | 0.045 | 1.489 | 0.000 | 0.000 | 0.082 | 0.303 |
| 15 | 88.9% | 0.769 | 0.097 | 0.000 | 1.066 | 0.403 | 1.601 | 0.000 | 0.007 | 0.046 | 0.091 |
| 16 | 87.0% | 1.302 | 0.194 | 0.002 | 0.392 | 0.140 | 0.362 | 0.000 | 0.000 | 0.000 | 0.024 |
| 17 | 49.7% | 0.025 | 0.023 | 0.002 | 0.036 | 0.048 | 1.097 | 0.000 | 0.004 | 0.141 | 0.453 |
| 18 | 68.9% | 0.091 | 0.039 | 0.002 | 0.065 | 0.054 | 0.552 | 0.000 | 0.004 | 0.068 | 0.239 |
| 19 | 64.8% | 0.059 | 0.027 | 0.005 | 0.000 | 0.049 | 1.528 | 0.000 | 0.000 | 0.072 | 0.738 |
| 20 | 87.0% | 0.574 | 0.085 | 0.001 | 0.259 | 0.097 | 0.213 | 0.000 | 0.004 | 0.010 | 0.027 |
| 21 | 67.0% | 0.037 | 0.014 | 0.005 | 0.041 | 0.033 | 1.481 | 0.000 | 0.000 | 0.046 | 0.075 |
| 22 | 66.3% | 0.091 | 0.040 | 0.007 | 0.049 | 0.052 | 1.590 | 0.000 | 0.000 | 0.049 | 0.379 |
| 23 | 86.6% | 0.780 | 0.121 | 0.001 | 0.378 | 0.165 | 0.306 | 0.000 | 0.010 | 0.029 | 0.123 |
| 24 | 89.8% | 1.128 | 0.127 | 0.001 | 0.432 | 0.122 | 0.188 | 0.000 | 0.008 | 0.022 | 0.108 |
| 25 | 87.0% | 0.508 | 0.075 | 0.001 | 0.286 | 0.107 | 0.203 | 0.000 | 0.008 | 0.026 | 0.071 |
| 26 | 92.1% | 0.907 | 0.076 | 0.002 | 0.289 | 0.076 | 0.131 | 0.000 | 0.005 | 0.011 | 0.056 |
| 27 | 87.1% | 0.758 | 0.110 | 0.002 | 0.260 | 0.092 | 0.252 | 0.000 | 0.006 | 0.023 | 0.211 |
| 28 | 30.8% | 0.005 | 0.007 | 0.005 | 0.006 | 0.019 | 1.803 | 0.000 | 0.000 | 0.030 | 0.112 |
| 29 | 64.6% | 0.062 | 0.030 | 0.004 | 0.047 | 0.054 | 1.794 | 0.000 | 0.008 | 0.183 | 1.479 |
| 30 | 57.5% | 0.037 | 0.023 | 0.005 | 0.020 | 0.038 | 1.447 | 0.000 | 0.002 | 0.058 | 0.408 |
| 31 | 85.1% | 0.421 | 0.073 | 0.001 | 0.277 | 0.120 | 0.263 | 0.000 | 0.008 | 0.033 | 0.053 |
| 32 | 51.2% | 0.058 | 0.051 | 0.003 | 0.040 | 0.070 | 1.003 | 0.000 | 0.000 | 0.117 | 2.016 |
| 33 | 60.2% | 0.070 | 0.041 | 0.005 | 0.050 | 0.070 | 1.376 | 0.000 | 0.000 | 0.067 | 1.027 |
| 34 | 87.3% | 1.225 | 0.176 | 0.002 | 0.255 | 0.138 | 0.354 | 0.015 | 0.010 | 0.044 | 0.643 |

Host: Rita Perfumera
Del: delphinidin,
Cya: cyanidin,
Pel: pelargonidin
M: myricetin,
Q: quercetin,
K: kaempferol
Tri: tricetin,
Lut: luteolin,
Api: apigenin,
IVX: isovitexin
Del (%): Proportion of delphinidin in total anthocyanidins

Example 7: (Route 1) Transfer of Pansy-Derived F3',5'H #40 Gene, Licorice-Derived F2H Gene, Rice-Derived CGT Gene and Rice-Derived Codon Usage-Modified CGT Gene and *Lotus japonicus*-Derived FDH Gene into Rose Variety "Noblesse"

Plasmid pSPB5588 constructed in the same manner as Example 4 was introduced into the orange rose variety "Noblesse", and a total of 60 transformants were obtained. Upon pigment analysis, delphinidin storage was confirmed in 42 transformants, with a maximum delphinidin content of 96.9% (average: 54.4%). The flavone C-glycoside isovitexin was also confirmed in 29 of the transformants, with high maximum production of 1.60 mg per 1 g of fresh petal weight.

The measured values for representative transformants are shown in Table 7 below.

TABLE 7

| Plant No. | Del (%) | Anthocyanidin (mg/g) Del | Cya | Pel | Flavonol (mg/g) M | Q | K | Flavone (mg/g) Tri | Lut | Api | Flavone C-glycoside (mg/g) IVX |
|---|---|---|---|---|---|---|---|---|---|---|---|
| Host | 0.0% | 0.020 | 0.040 | 0.000 | 0.000 | 0.012 | 1.430 | 0.000 | 0.000 | 0.000 | 0.000 |
| 1 | 67.6% | 0.372 | 0.156 | 0.023 | 0.074 | 0.034 | 0.637 | 0.000 | 0.000 | 0.043 | 1.398 |
| 2 | 68.2% | 0.145 | 0.051 | 0.016 | 0.056 | 0.024 | 0.707 | 0.000 | 0.000 | 0.045 | 0.712 |
| 3 | 55.4% | 0.151 | 0.097 | 0.025 | 0.033 | 0.025 | 0.739 | 0.000 | 0.000 | 0.120 | 1.602 |
| 4 | 50.5% | 0.174 | 0.121 | 0.050 | 0.035 | 0.023 | 0.802 | 0.000 | 0.000 | 0.012 | 0.333 |
| 5 | 58.9% | 0.247 | 0.131 | 0.041 | 0.047 | 0.027 | 0.712 | 0.000 | 0.000 | 0.005 | 0.058 |
| 6 | 69.3% | 0.398 | 0.152 | 0.025 | 0.107 | 0.045 | 1.008 | 0.000 | 0.000 | 0.029 | 1.045 |
| 7 | 59.2% | 0.283 | 0.161 | 0.036 | 0.059 | 0.032 | 1.041 | 0.000 | 0.000 | 0.016 | 0.655 |
| 8 | 94.2% | 0.899 | 0.056 | 0.000 | 0.348 | 0.030 | 0.072 | 0.000 | 0.002 | 0.009 | 0.507 |
| 9 | 54.3% | 0.384 | 0.252 | 0.070 | 0.077 | 0.047 | 1.075 | 0.000 | 0.000 | 0.000 | 0.098 |
| 10 | 95.1% | 1.580 | 0.083 | 0.000 | 0.426 | 0.037 | 0.067 | 0.000 | 0.010 | 0.035 | 1.015 |
| 11 | 66.5% | 0.160 | 0.068 | 0.013 | 0.051 | 0.025 | 0.672 | 0.000 | 0.000 | 0.096 | 1.426 |
| 12 | 90.6% | 1.226 | 0.128 | 0.001 | 0.346 | 0.042 | 0.101 | 0.000 | 0.019 | 0.086 | 0.792 |
| 13 | 81.8% | 0.649 | 0.127 | 0.018 | 0.192 | 0.036 | 0.570 | 0.000 | 0.000 | 0.000 | 0.241 |
| 14 | 83.5% | 0.808 | 0.148 | 0.013 | 0.202 | 0.044 | 0.475 | 0.000 | 0.000 | 0.008 | 0.696 |
| 15 | 86.1% | 0.945 | 0.144 | 0.011 | 0.540 | 0.090 | 0.913 | 0.000 | 0.000 | 0.021 | 0.951 |
| 16 | 92.5% | 0.981 | 0.080 | 0.000 | 0.592 | 0.048 | 0.131 | 0.000 | 0.003 | 0.019 | 0.264 |
| 17 | 32.2% | 0.099 | 0.140 | 0.070 | 0.050 | 0.039 | 1.803 | 0.000 | 0.000 | 0.001 | 0.044 |
| 18 | 60.4% | 0.071 | 0.031 | 0.015 | 0.085 | 0.024 | 0.829 | 0.000 | 0.000 | 0.000 | 0.028 |
| 19 | 91.6% | 0.689 | 0.063 | 0.000 | 0.523 | 0.043 | 0.272 | 0.000 | 0.001 | 0.014 | 0.195 |
| 20 | 85.3% | 0.660 | 0.104 | 0.010 | 0.360 | 0.047 | 0.531 | 0.000 | 0.001 | 0.008 | 0.288 |
| 21 | 89.6% | 0.340 | 0.039 | 0.001 | 0.347 | 0.051 | 0.383 | 0.000 | 0.001 | 0.012 | 0.233 |
| 22 | 46.3% | 0.179 | 0.158 | 0.049 | 0.066 | 0.043 | 1.173 | 0.000 | 0.000 | 0.011 | 0.158 |
| 23 | 95.6% | 1.005 | 0.047 | 0.000 | 0.482 | 0.022 | 0.064 | 0.000 | 0.009 | 0.027 | 0.581 |
| 24 | 96.9% | 0.599 | 0.020 | 0.000 | 0.542 | 0.032 | 0.071 | 0.000 | 0.016 | 0.087 | 0.600 |
| 25 | 94.8% | 1.168 | 0.064 | 0.001 | 0.686 | 0.038 | 0.161 | 0.000 | 0.009 | 0.042 | 1.124 |
| 26 | 75.8% | 0.354 | 0.085 | 0.028 | 0.111 | 0.029 | 0.672 | 0.022 | 0.001 | 0.009 | 0.166 |
| 27 | 77.4% | 0.494 | 0.108 | 0.036 | 0.206 | 0.049 | 1.572 | 0.000 | 0.001 | 0.024 | 0.500 |
| 28 | 76.4% | 0.194 | 0.057 | 0.003 | 0.105 | 0.047 | 0.721 | 0.037 | 0.001 | 0.022 | 0.355 |

Host: Noblesse
Del: delphinidin,
Cya: cyanidin,
Pel: pelargonidin
M: myricetin,
Q: quercetin,
K: kaempferol
Tri: tricetin,
Lut: luteolin,
Api: apigenin,
IVX: isovitexin
Del (%): Proportion of delphinidin in total anthocyanidins

Example 8: (Route 1) Transfer of *Campanula*-Derived F3',5'H Gene, Torenia-Derived MT Gene, Licorice-Derived F2H Gene, Rice-Derived Codon Usage-Modified CGT Gene and *Lotus japonicus*-Derived FDH Gene into Rose Variety "Ocean Song"

Plasmid pSPB6486 has pBINPLUS as the basic backbone, and contains the following five expression cassettes.

(1) $El_2$ 35S promoter, *Campanula*-derived F3',5'H full-length cDNA (SEQ ID NO: 9) and D8 terminator (2) $El_2$ 35S promoter, torenia-derived MT full-length cDNA (SEQ ID NO: 17) and NOS terminator (3) 35S promoter, licorice-derived F2H full-length cDNA (SEQ ID NO: 3) and perilla-derived AT terminator (4) 35S promoter, rice-derived codon usage-modified CGT full-length cDNA (SEQ ID NO: 13) and *Arabidopsis thaliana*-derived HSP terminator (5) 35S promoter, *Lotus japonicus*-derived FDH full-length cDNA (SEQ ID NO: 15) and *Arabidopsis thaliana*-derived HSP terminator This plasmid constitutively expresses the *Campanula* F3',5'H gene, torenia MT gene, licorice F2H gene, rice codon usage-modified CGT gene and *Lotus japonicus* FDH gene in plants.

The constructed plasmid pSPB6486 was introduced into the blue rose variety "Ocean Song", and a total of 27 transformants were obtained. Upon pigment analysis, malvidin storage was confirmed in 26 transformants, with a maximum malvidin content of 74.5% (average: 57.0%). The same identification and quantitation were carried out for the flavone C-glycosides vitexin (apigenin 8-C-glycoside), vicenin-2 (apigenin 6,8-C-diglycoside), isoorientin (luteolin 6-C-glycoside) and orientin (luteolin 8-C-glycoside) in this line, in addition to isovitexin. A flavone C-glycoside was detected in all of the individuals in which malvidin was detected, the total amount being at maximum a high content of 1.563 mg per 1 g of fresh petal weight. In addition, the total amount of flavone C-glycoside was a high content of 1 mg or greater per 1 g of fresh petal weight in most of the individuals, which was about at least 10 times compared to malvidin.

The measured values for representative transformants are shown in Table 8 below.

TABLE 8

| Plant | Mal | Anthocyanidin (mg/g) | | | | | Flavonol (mg/g) | | |
|---|---|---|---|---|---|---|---|---|---|
| No. | (%) | Del | Cya | Pet | Pel | Mal | M | Q | K |
| Host | 0.0 | 0.000 | 0.024 | 0.000 | 0.000 | 0.000 | 0.000 | 2.883 | 0.586 |
| 1 | 70.8 | 0.024 | 0.000 | 0.009 | 0.000 | 0.080 | 1.225 | 0.077 | 0.023 |
| 2 | 66.2 | 0.025 | 0.000 | 0.007 | 0.000 | 0.062 | 2.453 | 0.181 | 0.020 |
| 3 | 54.6 | 0.022 | 0.006 | 0.008 | 0.000 | 0.050 | 1.058 | 1.381 | 0.515 |
| 4 | 52.7 | 0.020 | 0.003 | 0.007 | 0.000 | 0.035 | 0.858 | 0.482 | 0.178 |
| 5 | 64.0 | 0.028 | 0.000 | 0.009 | 0.000 | 0.065 | 2.045 | 0.168 | 0.063 |
| 6 | 67.7 | 0.028 | 0.000 | 0.007 | 0.000 | 0.074 | 1.593 | 0.455 | 0.115 |
| 7 | 72.1 | 0.027 | 0.000 | 0.008 | 0.000 | 0.089 | 2.753 | 0.526 | 0.183 |
| 8 | 54.7 | 0.019 | 0.007 | 0.005 | 0.000 | 0.049 | 1.010 | 2.128 | 0.418 |
| 9 | 39.1 | 0.018 | 0.009 | 0.004 | 0.000 | 0.025 | 0.679 | 1.438 | 0.322 |
| 10 | 39.8 | 0.013 | 0.009 | 0.005 | 0.000 | 0.02 | 0.447 | 1.129 | 0.586 |
| 11 | 45.9 | 0.011 | 0.011 | 0.006 | 0.000 | 0.034 | 0.914 | 3.471 | 1.481 |
| 12 | 45.4 | 0.022 | 0.005 | 0.007 | 0.000 | 0.032 | 0.803 | 0.992 | 0.418 |
| 13 | 62.8 | 0.032 | 0.000 | 0.008 | 0.000 | 0.067 | 1.830 | 0.210 | 0.059 |
| 14 | 65.6 | 0.024 | 0.000 | 0.007 | 0.000 | 0.060 | 1.942 | 0.258 | 0.078 |
| 15 | 52.9 | 0.042 | 0.002 | 0.009 | 0.000 | 0.062 | 0.993 | 0.377 | 0.100 |
| 16 | 63.9 | 0.031 | 0.000 | 0.007 | 0.000 | 0.067 | 2.742 | 0.221 | 0.056 |
| 17 | 63.5 | 0.016 | 0.000 | 0.005 | 0.000 | 0.037 | 1.767 | 0.102 | 0.013 |
| 18 | 74.5 | 0.029 | 0.000 | 0.009 | 0.000 | 0.109 | 2.078 | 0.187 | 0.029 |
| 19 | 55.4 | 0.019 | 0.009 | 0.006 | 0.000 | 0.059 | 0.937 | 1.893 | 0.502 |
| 20 | 38.5 | 0.006 | 0.010 | 0.002 | 0.000 | 0.019 | 0.480 | 2.621 | 0.468 |
| 21 | 47.7 | 0.025 | 0.000 | 0.009 | 0.000 | 0.031 | 2.684 | 0.376 | 0.102 |
| 22 | 39.5 | 0.011 | 0.013 | 0.003 | 0.000 | 0.026 | 0.497 | 2.333 | 0.524 |
| 23 | 65.3 | 0.019 | 0.001 | 0.007 | 0.000 | 0.055 | 1.615 | 1.007 | 0.223 |
| 24 | 70.0 | 0.028 | 0.000 | 0.008 | 0.000 | 0.087 | 2.776 | 0.531 | 0.166 |
| 25 | 66.2 | 0.014 | 0.003 | 0.007 | 0.000 | 0.058 | 1.428 | 1.898 | 0.525 |
| 26 | 42.7 | 0.360 | 0.017 | 0.011 | 0.000 | 0.063 | 0.991 | 2.495 | 0.457 |

| Plant | Flavone (mg/g) | | | Flavone C-glycoside (mg/g) | | | | |
|---|---|---|---|---|---|---|---|---|
| No. | Tri | Lut | Api | Vic2 | VX | IVX | Ori | Iori |
| Host | 0.000 | 0.000 | 0.000 | 0.000 | 0.000 | 0.000 | 0.000 | 0.000 |
| 1 | 0.000 | 0.013 | 0.010 | 0.187 | 0.205 | 0.505 | 0.009 | 0.073 |
| 2 | 0.009 | 0.047 | 0.029 | 0.743 | 0.109 | 0.319 | 0.027 | 0.077 |
| 3 | 0.000 | 0.000 | 0.000 | 0.896 | 0.093 | 0.219 | 0.000 | 0.015 |
| 4 | 0.000 | 0.003 | 0.006 | 0.429 | 0.174 | 0.354 | 0.007 | 0.035 |
| 5 | 0.000 | 0.000 | 0.000 | 0.586 | 0.130 | 0.299 | 0.002 | 0.030 |
| 6 | 0.011 | 0.010 | 0.009 | 0.795 | 0.126 | 0.355 | 0.018 | 0.050 |
| 7 | 0.006 | 0.004 | 0.004 | 0.905 | 0.093 | 0.262 | 0.000 | 0.028 |
| 8 | 0.018 | 0.002 | 0.005 | 0.945 | 0.226 | 0.325 | 0.000 | 0.021 |
| 9 | 0.005 | 0.002 | 0.002 | 0.672 | 0.246 | 0.283 | 0.007 | 0.020 |
| 10 | 0.000 | 0.000 | 0.002 | 0.432 | 0.080 | 0.179 | 0.000 | 0.010 |
| 11 | 0.000 | 0.000 | 0.000 | 0.839 | 0.050 | 0.118 | 0.000 | 0.003 |
| 12 | 0.000 | 0.004 | 0.005 | 0.511 | 0.142 | 0.354 | 0.000 | 0.024 |
| 13 | 0.018 | 0.023 | 0.015 | 0.910 | 0.000 | 0.249 | 0.000 | 0.049 |
| 14 | 0.011 | 0.019 | 0.015 | 1.047 | 0.056 | 0.305 | 0.016 | 0.054 |
| 15 | 0.000 | 0.004 | 0.005 | 0.396 | 0.197 | 0.450 | 0.000 | 0.050 |
| 16 | 0.009 | 0.030 | 0.018 | 0.591 | 0.063 | 0.285 | 0.022 | 0.058 |
| 17 | 0.009 | 0.051 | 0.029 | 0.621 | 0.147 | 0.242 | 0.022 | 0.061 |
| 18 | 0.017 | 0.030 | 0.015 | 0.604 | 0.051 | 0.276 | 0.021 | 0.061 |
| 19 | 0.008 | 0.001 | 0.000 | 1.002 | 0.078 | 0.218 | 0.000 | 0.007 |
| 20 | 0.007 | 0.001 | 0.003 | 0.890 | 0.147 | 0.247 | 0.000 | 0.012 |
| 21 | 0.008 | 0.019 | 0.018 | 0.700 | 0.147 | 0.303 | 0.017 | 0.048 |
| 22 | 0.000 | 0.004 | 0.008 | 0.720 | 0.224 | 0.346 | 0.009 | 0.030 |
| 23 | 0.005 | 0.001 | 0.000 | 0.828 | 0.101 | 0.207 | 0.000 | 0.013 |
| 24 | 0.000 | 0.001 | 0.000 | 0.913 | 0.055 | 0.178 | 0.000 | 0.012 |

TABLE 8-continued

| | | | | | | | | |
|---|---|---|---|---|---|---|---|---|
| 25 | 0.000 | 0.008 | 0.014 | 0.907 | 0.255 | 0.368 | 0.000 | 0.034 |
| 26 | 0.000 | 0.000 | 0.000 | 0.529 | 0.030 | 0.094 | 0.000 | 0.000 |

Host: Ocean Song
Del: delphinidin,
Cya: cyanidin,
Pet: petunidin,
Pel: pelargonidin,
Mal: malvidin
M: myricetin,
Q: quercetin,
K: kaempferol
Tri: tricetin,
Lut: luteolin,
Api: apigenin,
Vic2: vicenin-2,
VX: vitexin,
IVX: isovitexin,
Ori: orientin,
Iori: isoorientin
Mal (%): Proportion of malvidin in total anthocyanidins

Example 9: (Route 2) Transfer of Pansy-Derived F3',5'H #40 Gene, Torenia-Derived MT Gene, Torenia-Derived FNS Gene and Gentian-Derived CGT Gene into Rose Variety "Rita Perfumera"

Plasmid pSPB6438 has pBINPLUS as the basic backbone, and contains the following four expression cassettes.

(1) $El_2$ 35S promoter, pansy-derived F3',5'H full-length cDNA (SEQ ID NO: 1) and NOS terminator (2) $El_2$ 35S promoter, torenia-derived MT full-length cDNA (SEQ ID NO: 17) and NOS terminator (3) $El_2$ 35S promoter, torenia-derived FNS full-length cDNA (SEQ ID NO: 19) and D8 terminator (4) $El_2$ 35S promoter, gentian-derived CGT full-length cDNA (SEQ ID NO: 21) and *Arabidopsis thaliana*-derived HSP terminator This plasmid constitutively expresses the pansy F3',5'H #40 gene, the torenia MT gene, the torenia FNS gene and the gentian CGT gene in plants.

The constructed plasmid pSPB6438 was introduced into the orange rose variety "Rita Perfumera", and a total of 122 transformants were obtained. Upon pigment analysis, malvidin storage was confirmed in 71 transformants, with a maximum malvidin content of 69.9% (average: 25.9%). The same identification and quantitation were carried out for the flavone C-glycosides vitexin (apigenin 8-C-glycoside) and vicenin-2 (apigenin 6,8-C-diglycoside) in this line, in addition to isovitexin. A flavone C-glycoside was confirmed in 16 of the individuals in which malvidin was detected, the total amount being at maximum, 0.02 mg per 1 g of fresh petal weight. On the other hand, the total amount of flavones (apigenin, luteolin, tricetin) was at maximum a high content of 2.07 mg per 1 g of fresh petal weight.

The measured values for representative transformants are shown in Table 9 below.

TABLE 9

| Plant | Mal | Anthocyanidin (mg/g) | | | | | Flavonol (mg/g) | | | Flavone (mg/g) | | | Flavone C-glycoside (mg/g) | | |
|---|---|---|---|---|---|---|---|---|---|---|---|---|---|---|---|
| No. | (%) | Del | Cya | Pet | Pel | Mal | M | Q | K | Tri | Lut | Api | Vic2 | VX | IVX |
| Host | 0.0 | 0.000 | 0.009 | 0.000 | 0.013 | 0.000 | 0.000 | 0.019 | 2.109 | 0.000 | 0.000 | 0.000 | 0.000 | 0.000 | 0.000 |
| 1 | 39.3 | 0.051 | 0.013 | 0.040 | 0.002 | 0.078 | 0.177 | 0.099 | 0.471 | 0.626 | 0.258 | 0.208 | 0.007 | 0.000 | 0.000 |
| 2 | 33.0 | 0.094 | 0.026 | 0.068 | 0.004 | 0.106 | 0.243 | 0.130 | 0.654 | 0.824 | 0.311 | 0.227 | 0.009 | 0.000 | 0.000 |
| 3 | 62.5 | 0.104 | 0.022 | 0.071 | 0.003 | 0.397 | 0.465 | 0.232 | 0.684 | 1.105 | 0.327 | 0.170 | 0.009 | 0.000 | 0.000 |
| 4 | 69.9 | 0.044 | 0.010 | 0.038 | 0.003 | 0.315 | 0.343 | 0.190 | 0.649 | 0.730 | 0.336 | 0.194 | 0.007 | 0.000 | 0.000 |
| 5 | 32.7 | 0.095 | 0.021 | 0.068 | 0.002 | 0.099 | 0.257 | 0.123 | 0.532 | 1.032 | 0.345 | 0.282 | 0.013 | 0.000 | 0.000 |
| 6 | 27.0 | 0.099 | 0.021 | 0.062 | 0.002 | 0.073 | 0.203 | 0.086 | 0.496 | 1.151 | 0.414 | 0.502 | 0.015 | 0.000 | 0.000 |
| 7 | 33.9 | 0.070 | 0.019 | 0.052 | 0.003 | 0.083 | 0.251 | 0.117 | 0.616 | 0.790 | 0.309 | 0.257 | 0.010 | 0.000 | 0.000 |
| 8 | 28.6 | 0.056 | 0.018 | 0.038 | 0.001 | 0.049 | 0.175 | 0.079 | 0.231 | 1.065 | 0.414 | 0.314 | 0.018 | 0.000 | 0.000 |
| 9 | 15.2 | 0.006 | 0.005 | 0.003 | 0.004 | 0.004 | 0.023 | 0.025 | 0.972 | 0.000 | 0.063 | 0.624 | 0.008 | 0.000 | 0.004 |
| 10 | 19.0 | 0.003 | 0.003 | 0.002 | 0.003 | 0.003 | 0.027 | 0.030 | 1.517 | 0.093 | 0.049 | 0.598 | 0.005 | 0.000 | 0.007 |
| 11 | 10.5 | 0.002 | 0.004 | 0.001 | 0.006 | 0.002 | 0.007 | 0.022 | 1.891 | 0.079 | 0.045 | 0.790 | 0.006 | 0.000 | 0.008 |
| 12 | 30.5 | 0.037 | 0.011 | 0.026 | 0.001 | 0.037 | 0.135 | 0.065 | 0.251 | 0.565 | 0.243 | 0.205 | 0.009 | 0.000 | 0.000 |
| 13 | 55.7 | 0.023 | 0.008 | 0.020 | 0.000 | 0.080 | 0.093 | 0.088 | 0.144 | 0.276 | 0.243 | 0.241 | 0.009 | 0.000 | 0.000 |
| 14 | 37.0 | 0.065 | 0.029 | 0.051 | 0.002 | 0.105 | 0.191 | 0.147 | 0.348 | 0.640 | 0.341 | 0.181 | 0.013 | 0.000 | 0.000 |

TABLE 9-continued

| Plant | Mal | Anthocyanidin (mg/g) | | | | | Flavonol (mg/g) | | | Flavone (mg/g) | | | Flavone C-glycoside (mg/g) | | |
|---|---|---|---|---|---|---|---|---|---|---|---|---|---|---|---|
| No. | (%) | Del | Cya | Pet | Pel | Mal | M | Q | K | Tri | Lut | Api | Vic2 | VX | IVX |
| 15 | 40.5 | 0.072 | 0.021 | 0.059 | 0.002 | 0.123 | 0.249 | 0.148 | 0.530 | 0.749 | 0.317 | 0.225 | 0.010 | 0.000 | 0.000 |
| 16 | 17.4 | 0.003 | 0.004 | 0.000 | 0.003 | 0.002 | 0.013 | 0.023 | 0.828 | 0.050 | 0.041 | 0.739 | 0.009 | 0.000 | 0.006 |

Host: Rita Perfumera
Del: delphinidin,
Cya: cyanidin,
Pet: petunidin,
Pel: pelargonidin,
Mal: malvidin
M: myricetin,
Q: quercetin,
K: kaempferol
Tri: tricetin,
Lut: luteolin,
Api: apigenin,
Vic2: vicenin-2,
VX: vitexin,
IVX: isovitexin
Mal (%): Proportion of malvidin in total anthocyanidins

Example 10: (Route 2) Transfer of *Campanula*-Derived F3',5'H Gene, Torenia-Derived MT Gene, Torenia-Derived FNS Gene and Gentian-Derived CGT Gene into Rose Variety "Ocean Song"

Plasmid pSPB7013 has pBINPLUS as the basic backbone, and contains the following four expression cassettes.

(1) $El_2$ 35S promoter, *Campanula*-derived F3',5'H full-length cDNA (SEQ ID NO: 9) and D8 terminator (2) $El_2$ 35S promoter, torenia-derived MT full-length cDNA (SEQ ID NO: 17) and NOS terminator (3) $El_2$ 35S promoter, torenia-derived FNS full-length cDNA (SEQ ID NO: 19) and D8 terminator (4) $El_2$ 35S promoter, gentian-derived CGT full-length cDNA (SEQ ID NO: 21) (*Arabidopsis thaliana* ADH gene-derived 5'-UTR (SEQ ID NO: 23) added to the 5'-position end) and *Arabidopsis thaliana*-derived HSP terminator This plasmid constitutively expresses the *Campanula* F3',5'H gene, torenia MT gene, torenia FNS gene and gentian CGT gene in plants.

The constructed plasmid pSPB7013 was introduced into the blue rose variety "Ocean Song", and a total of 15 transformants were obtained. Upon pigment analysis, malvidin storage was confirmed in all of the transformants, with a maximum malvidin content of 67.2% (average: 40.9%). The same identification and quantitation were carried out for the flavone C-glycosides isoorientin (luteolin 6-C-glycoside) and orientin (luteolin 8-C-glycoside) in this line, in addition to isovitexin, vitexin and vicenin-2. A flavone C-glycoside was detected in all of the individuals in which malvidin was detected, the total amount being at maximum a high content of 1.410 mg per 1 g of fresh petal weight.

The measured values for representative transformants are shown in Table 10 below.

TABLE 10

| Plant | Mal | Anthocyanidin (mg/g) | | | | | Flavonol (mg/g) | | |
|---|---|---|---|---|---|---|---|---|---|
| No. | (%) | Del | Cya | Pet | Pel | Mal | M | Q | K |
| Host | 0.0 | 0.000 | 0.024 | 0.000 | 0.000 | 0.000 | 0.000 | 2.883 | 0.586 |
| 1 | 42.0 | 0.011 | 0.000 | 0.005 | 0.000 | 0.012 | 1.108 | 0.258 | 0.091 |
| 2 | 41.3 | 0.012 | 0.000 | 0.006 | 0.000 | 0.013 | 1.178 | 0.347 | 0.113 |
| 3 | 32.4 | 0.014 | 0.000 | 0.005 | 0.000 | 0.010 | 0.956 | 0.328 | 0.082 |
| 4 | 44.5 | 0.013 | 0.001 | 0.007 | 0.000 | 0.018 | 1.338 | 0.447 | 0.105 |
| 5 | 38.5 | 0.014 | 0.007 | 0.006 | 0.000 | 0.024 | 0.619 | 1.582 | 0.278 |
| 6 | 41.5 | 0.042 | 0.002 | 0.022 | 0.000 | 0.048 | 3.590 | 1.293 | 0.598 |
| 7 | 44.4 | 0.017 | 0.000 | 0.009 | 0.000 | 0.023 | 0.959 | 0.369 | 0.052 |
| 8 | 40.4 | 0.037 | 0.002 | 0.016 | 0.000 | 0.039 | 3.619 | 1.467 | 0.621 |
| 9 | 32.0 | 0.050 | 0.002 | 0.017 | 0.000 | 0.033 | 1.968 | 0.635 | 0.089 |
| 10 | 41.8 | 0.048 | 0.003 | 0.022 | 0.000 | 0.056 | 3.123 | 1.343 | 0.400 |
| 11 | 40.3 | 0.016 | 0.000 | 0.006 | 0.000 | 0.015 | 1.076 | 0.285 | 0.099 |
| 12 | 36.3 | 0.038 | 0.000 | 0.012 | 0.000 | 0.028 | 1.330 | 0.308 | 0.088 |
| 13 | 33.3 | 0.045 | 0.001 | 0.017 | 0.000 | 0.032 | 2.311 | 0.547 | 0.151 |
| 14 | 67.2 | 0.038 | 0.000 | 0.011 | 0.000 | 0.099 | 2.892 | 0.767 | 0.224 |
| 15 | 38.3 | 0.013 | 0.000 | 0.005 | 0.000 | 0.012 | 0.688 | 0.234 | 0.031 |

| Plant | Flavone (mg/g) | | | Flavone C-glycoside (mg/g) | | | | |
|---|---|---|---|---|---|---|---|---|
| No. | Tri | Lut | Api | Vic2 | VX | IVX | Ori | Iori |
| Host | 0.000 | 0.000 | 0.000 | 0.000 | 0.000 | 0.000 | 0.000 | 0.000 |
| 1 | 0.899 | 0.433 | 0.042 | 0.010 | 0.000 | 0.479 | 0.000 | 0.921 |

TABLE 10-continued

| | | | | | | | | |
|---|---|---|---|---|---|---|---|---|
| 2 | 0.822 | 0.401 | 0.037 | 0.009 | 0.000 | 0.337 | 0.000 | 0.731 |
| 3 | 0.892 | 0.473 | 0.035 | 0.010 | 0.000 | 0.159 | 0.000 | 0.619 |
| 4 | 0.680 | 0.361 | 0.031 | 0.008 | 0.000 | 0.349 | 0.000 | 0.777 |
| 5 | 0.033 | 0.023 | 0.004 | 0.000 | 0.000 | 0.014 | 0.000 | 0.087 |
| 6 | 0.063 | 0.038 | 0.005 | 0.000 | 0.000 | 0.003 | 0.000 | 0.075 |
| 7 | 0.795 | 0.416 | 0.030 | 0.017 | 0.000 | 0.224 | 0.000 | 0.884 |
| 8 | 0.028 | 0.011 | 0.001 | 0.000 | 0.000 | 0.000 | 0.000 | 0.026 |
| 9 | 0.031 | 0.018 | 0.002 | 0.000 | 0.000 | 0.000 | 0.000 | 0.033 |
| 10 | 0.040 | 0.013 | 0.001 | 0.000 | 0.000 | 0.002 | 0.000 | 0.031 |
| 11 | 0.652 | 0.328 | 0.026 | 0.012 | 0.000 | 0.108 | 0.000 | 0.488 |
| 12 | 0.226 | 0.129 | 0.012 | 0.000 | 0.000 | 0.022 | 0.000 | 0.175 |
| 13 | 0.049 | 0.015 | 0.002 | 0.000 | 0.000 | 0.000 | 0.000 | 0.036 |
| 14 | 0.064 | 0.037 | 0.005 | 0.000 | 0.000 | 0.010 | 0.000 | 0.071 |
| 15 | 0.658 | 0.409 | 0.028 | 0.014 | 0.000 | 0.165 | 0.000 | 0.622 |

Host: Ocean Song
Del: delphinidin,
Cya: cyanidin,
Pet: petunidin,
Pel: pelargonidin,
Mal: malvidin
M: myricetin,
Q: quercetin,
K: kaempferol
Tri: tricetin,
Lut: luteolin,
Api: apigenin,
Vic2: vicenin-2,
VX: vitexin,
IVX: isovitexin
Ori: orientin,
Iori: isoorientin
Mal (%): Proportion of malvidin in total anthocyanidins

Example 11: Evaluation of Flower Color of Flavone C-Glycoside-Containing Roses The transformants created in Examples 8 and 10 (using the rose variety "Ocean Song" as the host) were classified into the groups of: (1) individuals storing delphinidin as the major pigment and including no flavones, (2) individuals storing malvidin as the major pigment and including a flavone C-glycoside produced by route 1, (3) individuals storing malvidin as the major pigment and including flavone C-glycoside produced by route 2, and hosts (storing cyanidin as the major pigment), and the petal color shades of each were measured with a D65 light source in a 10° visual field using a CM-2022 spectrocolorimeter (product of Minolta) and analyzed (n=5) using SpectraMagic™ color management software (product of Minolta).

A shift in hue angle of the petals toward blue also occurred in the roses with delphinidin as the major pigment. This tendency was more notable in the roses with malvidin-type major pigments and with copresence of a flavone C-glycoside, and the hue angle was also significantly shifted toward the blue end. The tendency was also notably observed in the line of Example 10. These results confirmed that the petal color shade had changed to blue by the copresence of the malvidin and flavone C-glycoside.

The results are shown in Table 11.

TABLE 11

| | Gene and flavonoid composition | Hue angle |
|---|---|---|
| Host | Ocean Song<br>Stores cyanidin as main pigment, contains absolutely no flavone C-glycoside | Average: 362.57° |
| | (1) *Campanula* F3', 5'H<br>Has high storage of delphinidin as main pigment, contains absolutely no flavone C-glycoside | Average: 337.33°<br>Bluest point: 333.15° |
| Example 8 | (2) *Campanula* F3', 5'H + torenia MT + licorice F2H + rice CGT (codon usage modified) + *Lotus japonicus* FDH<br>Has high storage of malvidin as main pigment, contains flavone C-glycoside | Average: 320.16°<br>Bluest point: 318.89° |
| Example 10 | (3) *Campanula* F3', 5'H + torenia MT + torenia FNS + gentian CGT<br>Has high storage of malvidin as main pigment, contains flavone C-glycoside | Average: 313.75°<br>Bluest point: 277.05° |

Example 12: (Route 1) Transfer of *Campanula*-Derived F3',5'H Gene, Lavender-Derived 3AT Gene, Licorice-Derived F2H Gene, Rice-Derived Codon Usage-Modified CGT Gene and *Lotus japonicus*-Derived FDH Gene into Rose Variety "Ocean Song"

Plasmid pSPB6495 has pBINPLUS as the basic backbone, and contains the following five expression cassettes.

(1) $El_2$ 35S promoter, *Campanula*-derived F3',5'H full-length cDNA (SEQ ID NO: 9) and D8 terminator (2) $El_2$ 35S promoter, lavender-derived 3AT full-length cDNA (SEQ ID NO: 24) and *Arabidopsis thaliana*-derived HSP terminator (3) 35S promoter, licorice-derived F2H full-length cDNA (SEQ ID NO: 3) and perilla-derived AT terminator (4) 35S promoter, rice-derived codon usage-modified CGT full-length cDNA (SEQ ID NO: 13) and *Arabidopsis thaliana*-derived HSP terminator (5) 35S promoter, *Lotus japonicus*-derived FDH full-length cDNA (SEQ ID NO: 15) and *Arabidopsis thaliana*-derived HSP terminator This plasmid constitutively expresses the *Campanula* F3',5'H gene, lavender 3AT gene, licorice F2H gene, rice codon usage-modified CGT gene and *Lotus japonicus* FDH gene in plants.

The constructed plasmid pSPB6495 was introduced into the blue rose variety "Ocean Song", and a total of 228 transformants were obtained. Upon pigment analysis, storage of acylated delphins was confirmed in 59 individuals. The same identification and quantitation were carried out for the flavone C-glycosides vitexin (apigenin 8-C-glycoside), vicenin-2 (apigenin 6,8-C-diglycoside), isoorientin (luteolin 6-C-glycoside) and orientin (luteolin 8-C-glycoside) in this line, in addition to isovitexin. Flavone C-glycosides were detected in all of the individuals in which acylated delphins were detected, with some individuals having at maximum a high content of 1.720 mg as the total per 1 g of fresh petal weight, although the average was 0.833 mg.

The measured values for representative transformants are shown in Table 12 below.

TABLE 12

| Plant | Del | Anthocyanidin (mg/g) | | | | | Flavonol (mg/g) | | |
|---|---|---|---|---|---|---|---|---|---|
| No. | (%) | Del | Cya | Pet | Pel | Mal | M | Q | K |
| 1 | 94.6 | 0.126 | 0.007 | 0.000 | 0.000 | 0.000 | 1.140 | 0.476 | 0.056 |
| 2 | 94.7 | 0.078 | 0.004 | 0.000 | 0.000 | 0.000 | 1.864 | 1.082 | 0.524 |
| 3 | 92.4 | 0.135 | 0.011 | 0.001 | 0.000 | 0.000 | 2.853 | 2.384 | 1.236 |
| 4 | 92.3 | 0.082 | 0.007 | 0.000 | 0.000 | 0.000 | 1.574 | 0.922 | 0.165 |
| 5 | 92.7 | 0.077 | 0.006 | 0.001 | 0.000 | 0.000 | 1.398 | 0.700 | 0.142 |
| 6 | 93.6 | 0.117 | 0.008 | 0.000 | 0.000 | 0.000 | 1.683 | 0.934 | 0.131 |
| 7 | 92.9 | 0.091 | 0.007 | 0.001 | 0.000 | 0.000 | 1.415 | 0.637 | 0.086 |
| 8 | 92.1 | 0.090 | 0.008 | 0.001 | 0.000 | 0.000 | 1.121 | 0.692 | 0.147 |
| 9 | 91.7 | 0.096 | 0.009 | 0.000 | 0.000 | 0.000 | 2.380 | 1.311 | 0.296 |
| 10 | 94.1 | 0.098 | 0.006 | 0.001 | 0.000 | 0.000 | 2.300 | 1.122 | 0.241 |
| 11 | 95.7 | 0.093 | 0.004 | 0.000 | 0.000 | 0.000 | 1.765 | 0.703 | 0.120 |
| 12 | 95.8 | 0.078 | 0.003 | 0.000 | 0.000 | 0.000 | 1.783 | 0.682 | 0.126 |
| 13 | 100.0 | 0.073 | 0.000 | 0.000 | 0.000 | 0.000 | 2.114 | 0.320 | 0.041 |
| 14 | 100.0 | 0.076 | 0.000 | 0.000 | 0.000 | 0.000 | 2.593 | 0.267 | 0.037 |
| 15 | 100.0 | 0.085 | 0.000 | 0.000 | 0.000 | 0.000 | 2.262 | 0.301 | 0.049 |
| 16 | 93.9 | 0.072 | 0.005 | 0.001 | 0.000 | 0.000 | 1.373 | 0.583 | 0.093 |
| 17 | 91.4 | 0.094 | 0.009 | 0.001 | 0.000 | 0.000 | 1.236 | 0.734 | 0.087 |
| 18 | 97.4 | 0.100 | 0.003 | 0.001 | 0.000 | 0.000 | 1.764 | 0.808 | 0.302 |
| 19 | 95.6 | 0.097 | 0.005 | 0.000 | 0.000 | 0.000 | 2.792 | 1.657 | 0.410 |
| 20 | 97.2 | 0.088 | 0.003 | 0.001 | 0.000 | 0.000 | 1.858 | 0.573 | 0.131 |
| 21 | 96.9 | 0.101 | 0.003 | 0.001 | 0.000 | 0.000 | 2.990 | 1.293 | 0.424 |
| 22 | 96.8 | 0.090 | 0.003 | 0.001 | 0.000 | 0.000 | 2.171 | 0.728 | 0.173 |
| 23 | 96.6 | 0.100 | 0.003 | 0.000 | 0.000 | 0.000 | 3.097 | 1.561 | 0.484 |
| 24 | 93.6 | 0.073 | 0.005 | 0.000 | 0.000 | 0.000 | 1.506 | 0.687 | 0.074 |
| 25 | 93.4 | 0.074 | 0.005 | 0.000 | 0.000 | 0.000 | 1.292 | 0.683 | 0.075 |
| 26 | 90.2 | 0.093 | 0.010 | 0.000 | 0.000 | 0.000 | 2.371 | 1.426 | 0.279 |
| 27 | 90.3 | 0.104 | 0.011 | 0.000 | 0.000 | 0.000 | 1.766 | 1.172 | 0.190 |
| 28 | 90.8 | 0.100 | 0.010 | 0.001 | 0.000 | 0.000 | 2.273 | 1.494 | 0.278 |
| 29 | 91.2 | 0.097 | 0.009 | 0.000 | 0.000 | 0.000 | 1.680 | 1.113 | 0.225 |
| 30 | 94.0 | 0.099 | 0.006 | 0.000 | 0.000 | 0.000 | 1.623 | 0.941 | 0.184 |
| 31 | 92.0 | 0.091 | 0.008 | 0.001 | 0.000 | 0.000 | 1.379 | 0.814 | 0.116 |
| 32 | 92.2 | 0.088 | 0.008 | 0.001 | 0.000 | 0.000 | 1.402 | 0.767 | 0.102 |
| 33 | 93.2 | 0.072 | 0.005 | 0.001 | 0.000 | 0.000 | 1.919 | 1.105 | 0.302 |
| 34 | 93.4 | 0.104 | 0.007 | 0.001 | 0.000 | 0.000 | 1.572 | 0.781 | 0.103 |
| 35 | 91.4 | 0.099 | 0.009 | 0.000 | 0.000 | 0.000 | 1.550 | 1.028 | 0.160 |
| 36 | 90.9 | 0.113 | 0.011 | 0.001 | 0.000 | 0.000 | 1.607 | 1.118 | 0.212 |
| 37 | 95.7 | 0.067 | 0.003 | 0.000 | 0.000 | 0.000 | 1.938 | 0.695 | 0.123 |
| 38 | 91.1 | 0.089 | 0.009 | 0.001 | 0.000 | 0.000 | 2.127 | 1.346 | 0.263 |
| 39 | 96.0 | 0.097 | 0.004 | 0.000 | 0.000 | 0.000 | 2.271 | 1.100 | 0.244 |
| 40 | 95.2 | 0.094 | 0.005 | 0.000 | 0.000 | 0.000 | 1.396 | 0.541 | 0.105 |
| 41 | 97.7 | 0.076 | 0.002 | 0.000 | 0.000 | 0.000 | 2.413 | 0.859 | 0.236 |
| 42 | 100.0 | 0.074 | 0.000 | 0.000 | 0.000 | 0.000 | 1.947 | 0.358 | 0.072 |
| 43 | 94.7 | 0.069 | 0.004 | 0.000 | 0.000 | 0.000 | 1.621 | 0.692 | 0.146 |
| 44 | 93.9 | 0.081 | 0.005 | 0.001 | 0.000 | 0.000 | 1.528 | 0.648 | 0.093 |
| 45 | 95.6 | 0.078 | 0.004 | 0.000 | 0.000 | 0.000 | 1.692 | 0.672 | 0.156 |
| 46 | 95.2 | 0.112 | 0.006 | 0.000 | 0.000 | 0.000 | 1.958 | 0.851 | 0.202 |
| 47 | 97.4 | 0.106 | 0.003 | 0.001 | 0.000 | 0.000 | 3.277 | 1.210 | 0.472 |
| 48 | 97.5 | 0.120 | 0.003 | 0.000 | 0.000 | 0.000 | 2.848 | 1.063 | 0.341 |
| 49 | 94.8 | 0.130 | 0.007 | 0.001 | 0.000 | 0.000 | 1.815 | 0.798 | 0.146 |
| 50 | 91.1 | 0.074 | 0.007 | 0.001 | 0.000 | 0.000 | 1.620 | 0.907 | 0.163 |
| 51 | 91.2 | 0.085 | 0.008 | 0.000 | 0.000 | 0.000 | 2.123 | 1.204 | 0.163 |
| 52 | 92.5 | 0.091 | 0.007 | 0.000 | 0.000 | 0.000 | 1.908 | 1.074 | 0.238 |
| 53 | 93.1 | 0.097 | 0.007 | 0.000 | 0.000 | 0.000 | 2.411 | 1.360 | 0.322 |
| 54 | 100.0 | 0.052 | 0.000 | 0.000 | 0.000 | 0.000 | 3.621 | 0.476 | 0.106 |

TABLE 12-continued

| Plant | Flavone (mg/g) | | | Flavone C-glycoside (mg/g) | | | | |
|---|---|---|---|---|---|---|---|---|
| No. | Tri | Lut | Api | Vic2 | VX | IVX | Ori | Iori |
| 1 | 0.008 | 0.004 | 0.002 | 0.508 | 0.030 | 0.088 | 0.000 | 0.011 |
| 2 | 0.000 | 0.000 | 0.000 | 0.320 | 0.000 | 0.022 | 0.000 | 0.000 |
| 3 | 0.000 | 0.000 | 0.000 | 0.745 | 0.014 | 0.049 | 0.000 | 0.000 |
| 4 | 0.000 | 0.002 | 0.002 | 0.746 | 0.043 | 0.094 | 0.000 | 0.011 |
| 5 | 0.000 | 0.000 | 0.000 | 0.575 | 0.033 | 0.102 | 0.000 | 0.012 |
| 6 | 0.000 | 0.001 | 0.001 | 0.779 | 0.034 | 0.105 | 0.000 | 0.014 |
| 7 | 0.000 | 0.001 | 0.000 | 0.637 | 0.027 | 0.059 | 0.000 | 0.007 |
| 8 | 0.000 | 0.000 | 0.000 | 0.461 | 0.015 | 0.060 | 0.000 | 0.000 |
| 9 | 0.006 | 0.005 | 0.010 | 0.594 | 0.065 | 0.139 | 0.000 | 0.015 |
| 10 | 0.000 | 0.001 | 0.000 | 0.698 | 0.030 | 0.096 | 0.000 | 0.009 |
| 11 | 0.000 | 0.008 | 0.010 | 0.654 | 0.030 | 0.103 | 0.000 | 0.015 |
| 12 | 0.000 | 0.007 | 0.011 | 0.614 | 0.041 | 0.117 | 0.000 | 0.016 |
| 13 | 0.000 | 0.010 | 0.007 | 0.405 | 0.052 | 0.126 | 0.000 | 0.023 |
| 14 | 0.000 | 0.032 | 0.025 | 0.636 | 0.174 | 0.346 | 0.019 | 0.064 |
| 15 | 0.000 | 0.032 | 0.022 | 0.710 | 0.122 | 0.317 | 0.017 | 0.060 |
| 16 | 0.000 | 0.000 | 0.000 | 0.573 | 0.020 | 0.065 | 0.000 | 0.006 |
| 17 | 0.000 | 0.000 | 0.000 | 0.485 | 0.015 | 0.048 | 0.000 | 0.000 |
| 18 | 0.000 | 0.000 | 0.000 | 0.481 | 0.013 | 0.082 | 0.000 | 0.006 |
| 19 | 0.000 | 0.008 | 0.015 | 0.575 | 0.029 | 0.117 | 0.000 | 0.014 |
| 20 | 0.000 | 0.001 | 0.001 | 0.763 | 0.018 | 0.069 | 0.000 | 0.009 |
| 21 | 0.000 | 0.001 | 0.000 | 0.846 | 0.017 | 0.093 | 0.000 | 0.007 |
| 22 | 0.000 | 0.000 | 0.000 | 0.662 | 0.011 | 0.047 | 0.000 | 0.000 |
| 23 | 0.000 | 0.008 | 0.019 | 0.650 | 0.026 | 0.103 | 0.000 | 0.010 |
| 24 | 0.000 | 0.000 | 0.000 | 0.633 | 0.020 | 0.058 | 0.000 | 0.006 |
| 25 | 0.000 | 0.004 | 0.003 | 0.491 | 0.017 | 0.055 | 0.000 | 0.007 |
| 26 | 0.000 | 0.001 | 0.000 | 0.777 | 0.021 | 0.071 | 0.000 | 0.004 |
| 27 | 0.000 | 0.001 | 0.000 | 0.786 | 0.020 | 0.055 | 0.000 | 0.004 |
| 28 | 0.000 | 0.001 | 0.000 | 0.760 | 0.024 | 0.078 | 0.000 | 0.006 |
| 29 | 0.000 | 0.000 | 0.000 | 0.579 | 0.012 | 0.035 | 0.000 | 0.004 |
| 30 | 0.000 | 0.001 | 0.000 | 0.811 | 0.024 | 0.070 | 0.000 | 0.007 |
| 31 | 0.000 | 0.002 | 0.000 | 0.749 | 0.019 | 0.073 | 0.000 | 0.007 |
| 32 | 0.000 | 0.001 | 0.000 | 0.880 | 0.023 | 0.085 | 0.000 | 0.007 |
| 33 | 0.000 | 0.001 | 0.000 | 0.707 | 0.026 | 0.086 | 0.000 | 0.006 |
| 34 | 0.000 | 0.002 | 0.000 | 0.900 | 0.047 | 0.158 | 0.000 | 0.017 |
| 35 | 0.000 | 0.008 | 0.009 | 0.752 | 0.047 | 0.166 | 0.000 | 0.020 |
| 36 | 0.000 | 0.000 | 0.000 | 0.752 | 0.014 | 0.072 | 0.000 | 0.000 |
| 37 | 0.000 | 0.010 | 0.016 | 0.706 | 0.071 | 0.156 | 0.000 | 0.020 |
| 38 | 0.000 | 0.011 | 0.015 | 0.693 | 0.069 | 0.151 | 0.000 | 0.016 |
| 39 | 0.000 | 0.003 | 0.005 | 0.560 | 0.021 | 0.063 | 0.000 | 0.005 |
| 40 | 0.000 | 0.012 | 0.014 | 0.540 | 0.120 | 0.338 | 0.000 | 0.040 |
| 41 | 0.011 | 0.013 | 0.023 | 0.590 | 0.019 | 0.073 | 0.000 | 0.010 |
| 42 | 0.000 | 0.007 | 0.007 | 0.618 | 0.043 | 0.121 | 0.000 | 0.023 |
| 43 | 0.000 | 0.001 | 0.000 | 0.704 | 0.015 | 0.055 | 0.000 | 0.000 |
| 44 | 0.000 | 0.001 | 0.000 | 0.586 | 0.017 | 0.054 | 0.000 | 0.000 |
| 45 | 0.000 | 0.001 | 0.000 | 0.673 | 0.021 | 0.055 | 0.000 | 0.007 |
| 46 | 0.000 | 0.001 | 0.000 | 0.794 | 0.023 | 0.069 | 0.000 | 0.007 |
| 47 | 0.000 | 0.000 | 0.000 | 0.661 | 0.018 | 0.085 | 0.000 | 0.007 |
| 48 | 0.000 | 0.001 | 0.000 | 0.976 | 0.016 | 0.095 | 0.000 | 0.010 |
| 49 | 0.000 | 0.000 | 0.000 | 0.855 | 0.020 | 0.086 | 0.000 | 0.010 |
| 50 | 0.000 | 0.001 | 0.000 | 0.640 | 0.015 | 0.047 | 0.000 | 0.000 |
| 51 | 0.000 | 0.001 | 0.001 | 0.665 | 0.037 | 0.092 | 0.000 | 0.009 |
| 52 | 0.000 | 0.001 | 0.000 | 0.638 | 0.025 | 0.052 | 0.000 | 0.005 |
| 53 | 0.000 | 0.000 | 0.000 | 0.701 | 0.028 | 0.048 | 0.000 | 0.000 |
| 54 | 0.000 | 0.000 | 0.000 | 1.148 | 0.216 | 0.325 | 0.000 | 0.031 |

Host: Ocean Song
Del: delphinidin,
Cya: cyanidin,
Pet: petunidin,
Pel: pelargonidin,
Mal: malvidin
M: myricetin,
Q: quercetin,
K: kaempferol
Tri: tricetin,
Lut: luteolin,
Api: apigenin,
Vic2: vicenin-2,
VX: vitexin,
IVX: isovitexin,
Ori: orientin,
Iori: isoorientin
Del (%): Proportion of delphinidin in total anthocyanidins Example 13: (Route 1) Transfer of *Campanula*-Derived F3',5'H Gene, *Clitoria*-Derived 3'5'GT Gene, Rose-Derived 53GT (RNAi) Gene, Perilla-Derived 3GT Gene, Dahlia-Derived 3-Malonyltransferase (MaT) Gene, Licorice-Derived F2H Gene, Rice-Derived Codon Usage-Modified CGT Gene and *Lotus japonicus*-Derived FDH Gene into Rose Variety "Ocean Song"

Plasmid pSPB7189 has pBINPLUS as the basic backbone, and contains the following five expression cassettes.

(1) $El_2$ 35S promoter, *Campanula*-derived F3',5'H full-length cDNA (SEQ ID NO: 9) and Nos terminator (2) $El_2$ 35S promoter, *Clitoria*-derived A3'5'GT full-length cDNA (SEQ ID NO: 26) and *Arabidopsis thaliana*-derived HSP terminator (3) $El_2$ 35S promoter, rose-derived 53GT full-length cDNA (SEQ ID NO: 28) (RNAi) and *Arabidopsis thaliana*-derived HSP terminator (4) SAT promoter, perilla-derived 3GT full-length cDNA (SEQ ID NO: 30) and *Arabidopsis thaliana*-derived HSP terminator (5) $El_2$ 35S promoter, dahlia-derived 3MaT full-length cDNA (SEQ ID NO: 32) and *Arabidopsis thaliana*-derived HSP terminator (6) 35S promoter, licorice-derived F2H full-length cDNA (SEQ ID NO: 3) and perilla-derived AT terminator (7) 35S promoter, rice-derived codon usage-modified CGT full-length cDNA (SEQ ID NO: 13) and *Arabidopsis thaliana*-derived HSP terminator (8) 35S promoter, *Lotus japonicus*-derived FDH full-length cDNA (SEQ ID NO: 15) and *Arabidopsis thaliana*-derived HSP terminator This plasmid constitutively expresses the *Campanula* F3',5'H gene, *Clitoria* A3',5'GT gene, perilla 3GTgene, dahlia 3MaT gene, licorice F2H gene, rice codon usage-modified CGT gene and *Lotus japonicus* FDH gene in plants, and has inhibited expression of the rose endogenous 5,3GT gene.

The constructed plasmid pSPB7189 was introduced into the blue rose variety "Ocean Song", and a total of 101 transformants were obtained. Upon pigment analysis, storage of delphins was confirmed in only one individual, and acylation could not be confirmed. The same identification and quantitation were carried out for the flavone C-glycosides vitexin (apigenin 8-C-glycoside), vicenin-2 (apigenin 6,8-C-diglycoside), isoorientin (luteolin 6-C-glycoside) and orientin (luteolin 8-C-glycoside) in this line, in addition to isovitexin. Flavone C-glycoside was detected in this individual, the total amount being 1.024 mg per 1 g of fresh petal weight.

The measured values for the transformants are shown in Table 13 below.

TABLE 13

| Plant | Del | Anthocyanidin (mg/g) | | | | | Flavonol (mg/g) | | |
|---|---|---|---|---|---|---|---|---|---|
| No. | (%) | Del | Cya | Pet | Pel | Mal | M | Q | K |
| 1 | 100.0 | 0.068 | 0.000 | 0.000 | 0.000 | 0.000 | 2.522 | 0.321 | 0.122 |

| Plant | Flavone (mg/g) | | | Flavone C-glycoside (mg/g) | | | | |
|---|---|---|---|---|---|---|---|---|
| No. | Tri | Lut | Api | Vic2 | VX | IVX | Ori | Iori |
| 1 | 0.012 | 0.010 | 0.016 | 0.607 | 0.135 | 0.225 | 0.012 | 0.045 |

Host: Ocean Song
Del: delphinidin,
Cya: cyanidin,
Pet: petunidin,
Pel: pelargonidin,
Mal: malvidin
M: myricetin,
Q: quercetin,
K: kaempferol
Tri: tricetin,
Lut: luteolin,
Api: apigenin,
Vic2: vicenin-2,
VX: vitexin,
IVX: isovitexin,
Ori: orientin,
Iori: isoorientin
Del (%): Proportion of delphinidin in total anthocyanidins Example 14: Evaluation of Flower Color of Flavone C-Glycoside-Containing Roses The transformants created in Examples 12 and 13 (using the rose variety "Ocean Song" as the host) were classified into the groups of: (1) individuals storing (partially acylated) delphinidin as the major pigment and including a flavone C-glycoside produced by route 1, (2) individuals storing delphinidin as the major pigment and including a flavone C-glycoside produced by route 1, and the petal color shades of each were measured with a D65 light source in a 10° visual field using a CM-2022 spectrocolorimeter (product of Minolta) and analyzed (n=5) using SpectraMagic™ color management software (product of Minolta).

When the rose had a delphinidin as the main pigment, even when it was partially acylated, the hue angle of the petals showed no shift toward the blue direction compared to the transformants created in Examples 8 and 10 (although it was altered to a bluer color than with acylated anthocyanin alone). These results confirmed that the petal color shade had changed to blue by the copresence of the malvidin and flavone C-glycoside.

The results are shown in Table 14.

TABLE 14

| | Gene and flavonoid composition | Hue angle |
|---|---|---|
| Example 12 | (4) *Campanula* F3', 5'H + lavender 3AT + licorice F2H + rice CGT (codon usage modified) + *Lotus japonicus* FDH Has high storage of delphinidin (partially acylated) as main pigment, contains flavone C-glycoside | Average: 332.56° Bluest point: 329.42° |
| Example 13 | (5) *Campanula* F3', 5'H + *Chitoria* A3', 5'GT + rose 5, 3GT (RNAi) + perilla 3GT + dahlia 3MaT + licorice F2H + rice CGT (codon usage modified) + *Lotus japonicus* FDH Has high storage of delphinidin as main pigment, contains flavone C-glycoside | 342.66° |

Example 15: Simulation of Flavone C-Glycoside Copigment Effect with Anthocyanin (Malvin)

An anthocyanin (malvin) and flavone C-glycoside were prepared to simulate the copigment effect of the flavone C-glycoside on malvin. The malvin (malvidin 3,5-diglycoside) and flavone C-glycosides (isoorientin, swertisin) used in this experiment were purchased from Nacalai Tesque, Inc.

Each flavone C-glycoside (isoorientin or swertisin) was added to the malvin at 10-equivalent molar concentration in a buffering solution at pH 5.0, and the absorption spectra were measured. The malvin concentration was 0.5 mM.

Addition of the flavone C-glycoside increased the absorbance of the malvin solution, shifting the absorption maximum (λmax) toward the long wavelength end. The absorption maximum was shifted further toward the long wavelength end with addition of swertisin than with isoorientin. This demonstrated that swertisin has a higher copigment effect with malvin.

TABLE 15

| Absorption maximum of malvin solution with addition of flavone C-glycoside (λmax) | | |
|---|---|---|
| | | Malvin (malvidin 3,5-diglycoside) |
| Flavone C-glycoside (mg/g) | Swertisin | 579 nm |
| | Isoorientin | 575 nm |
| Anthocyanin | Malvin | 529 nm |

Example 16: Detection of Swertisin in Oboushibana

It has previously been reported that Asiatic dayflower contains swertisin (NPL 9). Asiatic dayflower is a one-day flower that blooms early in the morning and closes in the evening, with a small flower size of approximately 1 cm. Oboushibana, on the other hand, known as a (cultivated) variant of Asiatic dayflower, has a large flower size of about 4 cm, making it ideal as a sample. Pigment analysis was therefore carried out to confirm whether or not swertisin is detected in oboushibana, and in which organ it is stored.

The oboushibana was gathered with the following organs and stages.

Petal stage 1: Uncolored bud (~0.5 cm)

Petal stage 2: Bud with slight initial coloration (~0.5 cm)

Petal stage 3: Progressive coloration, pre-bloom bud (~1 to 1.5 cm).

Leaf

Bract

After freezing the 5 different samples, they were dried overnight with a vacuum freeze drier VirTis sentry 2.0 (SP Scientific), and then gently crushed with a spatula. After addition of 0.1% trifluoroacetic acid (TFA)-containing 50% acetonitrile in a volume of approximately 8-fold by fresh weight (v/wt) and treatment with ultrasonic waves for 20 minutes, the mixture was centrifuged (3,600 rpm, 4° C., 10 minutes) and the supernatant was recovered. The obtained supernatant was filtered with a 0.45 μm filter (COSMO NICE filter (aqueous), 0.45 μm, 13 mm). A 200 μl portion was dried, and after addition of β-glucosidase and naringinase it was treated overnight at 30° C., and then 200 μl of 0.1% TFA-containing 90% acetonitrile was added to suspend the reaction. It was then treated for 2 hours with ultrasonic waves, after which it was centrifuged (15,000 rpm, 4° C., 5 minutes) and the obtained supernatant was filtered with a 0.45 μm filter (Milex-LH, 0.45 μm, Millipore) and supplied to high-performance liquid chromatography. The analysis conditions were as follows.

<Analysis Conditions>

Apparatus: Prominence HPLC system (product of Shimadzu Corp.)

Detector: SPD-M20A (250 to 450 nm)

Column: Shim-pack FC-ODS 150×4.6 mm, 3 μm (Shimadzu GLC)

Eluent A: 0.1% TFA aqueous solution

Eluent B: 0.1% TFA-containing 90% acetonitrile

Flow rate: 0.6 ml/min

The elution conditions were a 10-minute linear concentration gradient of eluents A and B from an 8:2 mixture to a 3:7 mixture, and subsequent elution for 6 minutes with a 3:7 mixture.

Upon analysis, swertisin was detected in the cultivated oboushibana, and specifically detected in the petals alone. The content was confirmed to be highest in stage 2, where initial coloration was observed.

TABLE 16

| Sample | | Swertisin (mg content per 1 g petal fresh weight) |
|---|---|---|
| Petals | Stage 1 | 3.429 |
| | Stage 2 | 12.081 |
| | Stage 3 | 3.729 |
| Leaf | | 0.000 |
| Bract | | 0.000 |

Example 17: Acquisition of Candidate Genes Coding for Proteins having Activity of Transferring Methyl Group to 7-Position Hydroxyl Group of Flavone C-Glycoside <Isolation of Total RNA>

Using an RNeasy Plant Mini Kit (Qiagen Co.), total RNA was isolated from oboushibana petals (stage 1 to 3), leaves and bract by the manufacturer's recommended method.

<Expression Level Analysis of Oboushibana-Derived cDNA>

A library was prepared from the total RNA for provision to the next-generation sequencer NextSeq 500, using a SureSelect Strand-Specific RNA library preparation kit according to the manufacturer's recommended protocol. The prepared library was sequenced using a NextSeq 500 (Illumina Co.), and the obtained reads were analyzed. The reads from all of the samples were then combined and assembled using a Trinity v2.6.6, to determine the contig sequences. The obtained contig sequences were used for mapping of pair reads for each sample using an RSEM 1.3.0, and the FPKM value was calculated to determine the expression level.

<Estimation of Gene Function>

The contig sequence was used for a BLAST search with NCBI NR and Araport11, followed by function annotation (gene function estimation).

<Acquisition of Full-Length cDNA of Candidate Gene Coding for Protein having Activity of Transferring Methyl Group to 7-Position Hydroxyl Group of Flavone C-Glycoside>

The obtained contig sequence was searched using "methyltransferase" as the keyword, and 454 candidate genes were identified. The contig sequences were screened and narrowed down to 37 candidates having high expression and being expressed primarily in the petals. After constructing a phylogenetic tree with addition of 32 previously reported methyltransferase genes, including the barley flavonoid 7-O-methyltransferase gene (F1-OMT, NPL 10) and the burr medic isoflavone 7-O-methyltransferase gene (MtIOMT2, NPL 11), DN134067 was selected as the candidate gene. Primers were designed based on the assembled full-length cDNA sequence, and full-length cDNA clones were obtained by the following method.

The cDNA was synthesized with the isolated oboushibana petal total RNA as template, using a SuperScript First-Strand Synthesis System for RT-PCR (ThermoFisher Scientific) according to the manufacturer's recommended protocol. With the obtained oboushibana petal cDNA as template, a PrimeSTAR Max (Takara) was used according to the manufacturer's recommend protocol for PCR reaction with a 50 μl reaction volume (30 cycles were repeated, with one cycle being: 98° C. for 10 seconds, 55° C. for 5 seconds and 72° C. for 15 seconds, and were followed by holding at 4° C.). The DN134067 nucleotide sequence obtained in this manner was determined using a DNA sequencer (3500 Genetic Analyzer by Applied Biosystems).

Upon examining the homology between DN134067 and a known methyltransferase gene on the amino acid level, it was found to have 25% homology with barley (*Hordeum vulgare*)-derived flavonoid 7-O-methyltransferase, 26% homology with burr medic (*Medicago tructula*)-derived isoflavone 7-O-methyltransferase (MtIOMT1), 25% homology with burr medic (*Medicago tructula*)-derived isoflavone/isoflavone 7-O-methyltransferase (MtIOMT2), 26% homology with gromwell burr medic (*Medicago sativa*)-derived isoflavone 0-methyltransferase, and 26% homology with licorice (*Glycyrrhiza echinata*)-derived daidzein 7-O-methyltransferase. DN134067 is therefore clearly distinguishable from known methyltransferase genes.

Example 18: Measurement of Enzyme Activity in *E. coli* by Protein having Activity of Transferring Methyl Group to 7-Position Hydroxyl Group of Flavone C-Glycoside <Construction of *E. coli* Expression Vector>

With DN134067 as a candidate protein having activity of transferring a methyl group to the hydroxyl group at position 7 of flavone C-glycoside, and using pET15b (Novagen), an *E. coli* expression vector containing the full-length DN134067 (pET15b-DN134067) was constructed according to the manufacturer's recommended protocol.

<Expression of Methyltransferase in *E. coli*>

Plasmid pET15b-DN134067 was introduced into *E. coli* BL21 using One Shot BL21(DE3) (Invitrogen), according to the manufacturer's recommended protocol, to obtain *E. coli* transformants. The *E. coli* were cultured using an Overnight Express Autoinduction System 1 (Novagen), according to the manufacturer's recommended protocol. The *E. coli* transformants were cultured at 37° C. (approximately 4 hours) with 2 ml of prepared culture solution, to an OD600 value of 0.5. The *E. coli* solution was added as a preculturing solution to 50 ml of culture solution, and main culturing was carried out for two nights at 16° C.

The *E. coli* solution cultured for two nights was centrifuged (3000 rpm, 4° C., 15 minutes), and the collected cells were suspended in sonic buffer (composition: 40 mM KPB (pH7.5), 1 mM dithiothreitol, 50 μM amidinophenylmethanesulfonyl fluoride hydrochloride, 500 ethylenediaminetetraacetic acid, 2 mM $MgCl_2$, 1 μM S-adenosylmethionine (SAM)). A 5 ml portion of sonic buffer was added for each 1 g of *E. coli*. The suspended *E. coli* cells were crushed by ultrasonic treatment and then centrifuged (15,000 rpm, 4° C., 10 minutes), and the supernatant was recovered. The supernatant was used as a crude protein solution extract from *E. coli* expressing DN134067. An Avanti HP-26XP (rotor: JA-2) (Beckman Coulter) was used for the centrifugation.

<Enzyme Activity Measurement>

After mixing 8 μl of 1 mM isovitexin (dissolved in 50% aqueous acetonitrile containing 0.1% TFA), 20 μl of 10 mM SAM, 20 μl of 10 mM $MgCl_2$ and 10 μl of 1 M KPB (pH 7.5) and adjusting to 58 μl with water, the mixture was kept at 30° C. for 10 minutes, and then 2 μl of the crude protein solution extract from DN134067-expressing *E. coli* was added and enzyme reaction was carried out (30 minutes at 30° C.). Next, 100 μl of stop buffer (aqueous 90% acetonitrile solution containing 0.1% TFA) was added to stop the enzyme reaction, and the enzyme reaction solution was analyzed by high-performance liquid chromatography (Prominence by Shimadzu Corp.). Detection was at 330 nm using a Shimadzu PDA SPD-M20A as the detector. The column used was a Shim-Pack ODS 150 mm*4.6 mm (Shimadzu Corp.). Elution was performed using solution A (0.1% TFA aqueous solution) and solution B (aqueous 90% acetonitrile solution containing 0.1% TFA). The elution was with a 20-minute linear concentration gradient from a 9:1 mixture to a 8:2 mixture, a 15-minute linear concentration gradient from a 8:2 mixture to a 2:8 mixture and a 5-minute linear concentration gradient from a 2:8 mixture to a 0:10 mixture, followed by elution with a 0:10 mixture for 1 minute. The flow rate was 0.6 ml/min. As a control, the same experiment was carried out using a crude protein solution extract from *E. coli* in which pET15b vector without the insert had been introduced.

Figure 4:
FIG. 4 shows high-performance liquid chromatograms of a crude protein solution extract from *E. coli* expressing DN134067, and of an enzyme reaction solution obtained by enzyme reaction on isovitexin.
Figure 5:
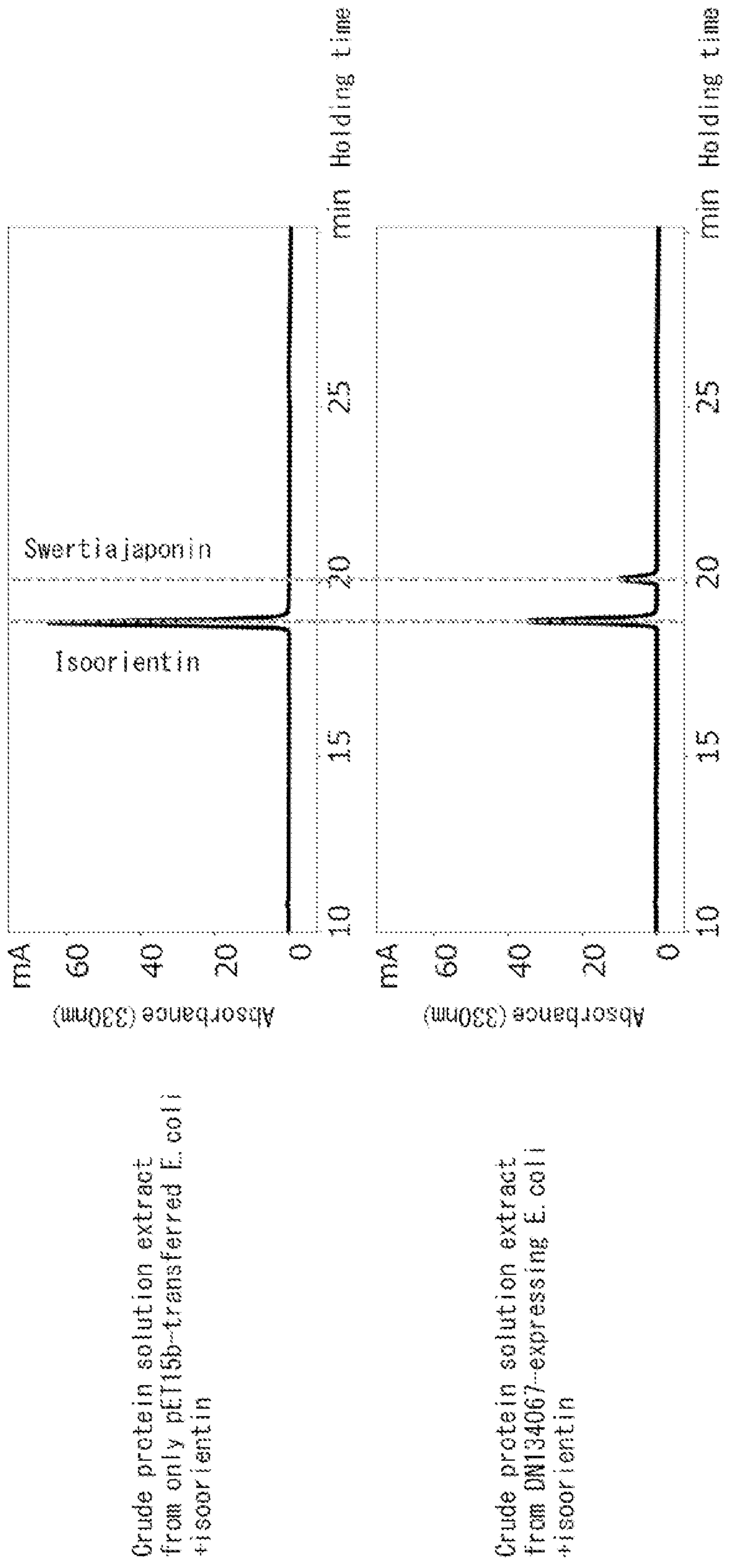
FIG. 5 shows high-performance liquid chromatograms of a crude protein solution extract from *E. coli* expressing DN134067, and of an enzyme reaction solution obtained by enzyme reaction on isoorientin.
Figure 6:
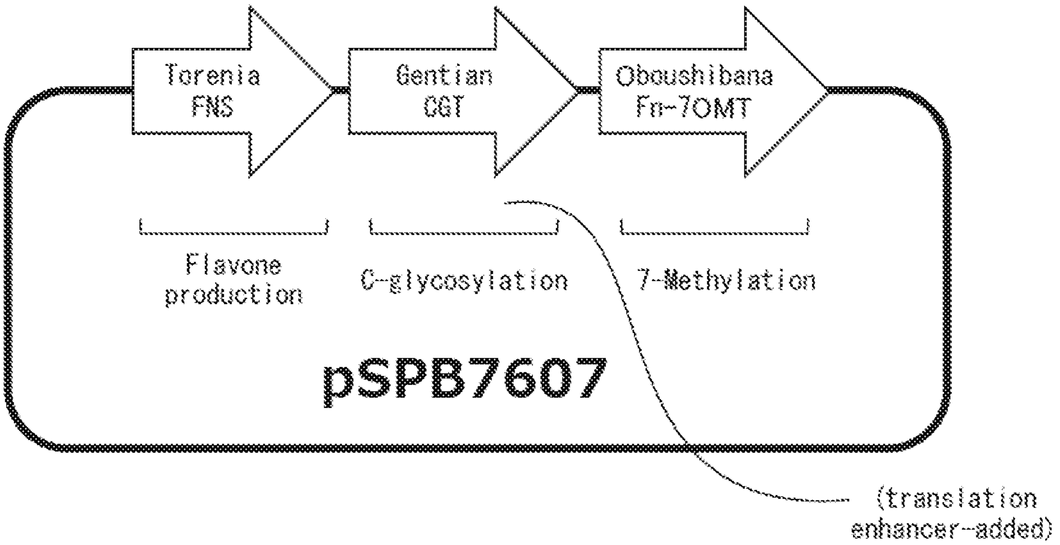
FIG. 6 shows the structure of pSPB7607.

As a result, a peak for swertisin having the hydroxyl group at position 7 of flavone C-glycoside methylated was detected in the enzyme reaction solution obtained by enzyme reaction of isovitexin with the crude protein solution extract from DN134067-expressing *E. coli* (see FIG. 4). When enzyme reaction was conducted under the same reaction conditions with isoorientin (dissolved in aqueous 50% acetonitrile solution containing 0.1% TFA) as the substrate, a peak was detected for swertiajaponin with the hydroxyl group at position 7 of isoorientin methylated (see FIG. 5). When enzyme reaction was carried out using a crude protein solution extract from *E. coli* expressing DN134067 and the flavonoid compounds listed in Table 17 (saponarin (isovitexin 4'-glycoside), apigenin, luteolin, apigenin 4'-glycoside, luteolin 4'-glycoside, delphinidin 3-glycoside, petunidin 3-glycoside and delphinidin 3,5-diglycoside), no peak was detected in the enzyme reaction solution other than for the substrate.

When enzyme reaction was conducted using an anthocyanin (delphinidin 3-glycoside, petunidin 3-glycoside or delphinidin 3,5-diglycoside) as the substrate, the enzyme reaction conditions were 30° C., 15 minutes, and an aqueous 90% acetonitrile solution containing 0.1% TFA and 0.24 N hydrochloric acid was used as the stop buffer. A Shimadzu PDA SPD-M20A detector was used for detection at 520 nm during analysis of the enzyme reaction solution by high-performance liquid chromatography (Prominence (Shimadzu Corp.)). The column used was a Shodex RSpak DE-413 L (Shodex). Elution was performed using solution A (0.1% TFA aqueous solution) and solution B (aqueous 90% acetonitrile solution containing 0.1% TFA). Elution was performed with a 15-minute linear concentration gradient from an 8:2 mixture to a 0:10 mixture, and subsequent elution for 5 minutes with a 0:10 mixture. The flow rate was 0.6 ml/min.

TABLE 17

| Substrate | Enzyme reaction synthesis product |
|---|---|
| Apigenin | ND |
| Luteolin | ND |
| Apigenin 4'-glycoside | ND |
| Luteolin 4'-glycoside | ND |
| Isovitexin | Swertisin |
| Isoorientin | Swertiajaponin |
| Saponarin | ND |
| Delphinidin 3-glycoside | ND |
| Petunidin 3-glycoside | ND |
| Delphinidin 3,5-diglycoside | ND |

The results clearly showed that DN134067 exhibits activity of specifically transferring a methyl group to the hydroxyl group at position 7 of flavone C-glycoside, indicating the possibility that DN134067 is a gene coding for a protein having activity of transferring a methyl group to the hydroxyl group at position 7 of flavone C-glycoside. DN134067 exhibited the most powerful methyl group-transfer activity for isovitexin.

Based on these results, the gene was identified as a gene coding for a protein having activity of transferring a methyl group to the hydroxyl group at position 7 of flavone C-glycoside, and was designated as CcFn-7OMT.

Example 19: Expression in Petunia of Gene Coding for Protein having Activity of Transferring Methyl Group to 7-Position Hydroxyl Group of Flavone The binary vector pSPB7607 containing the CcFn-7OMT gene of the invention was constructed to confirm whether or not the CcFn-7OMT gene has activity of transferring a methyl group to the hydroxyl group at position 7 of flavones in plants. The vector had pBINPLUS as the basic backbone, and contained the following three expression cassettes.

(1) $El_2$ 35S promoter, oboushibana-derived CcFn-7OMT full-length cDNA (SEQ ID NO: 34) and *Arabidopsis thaliana*-derived HSP terminator (2) $El_2$ 35S promoter, torenia-derived FNS full-length cDNA (SEQ ID NO: 19) and D8 terminator (3) $El_2$ 35S promoter, gentian-derived CGT full-length cDNA (SEQ ID NO: 21) and *Arabidopsis thaliana*-derived HSP terminator This binary vector constitutively expresses the oboushibana CcFn-7OMT gene, torenia FNS gene and gentian CGT gene in plants.

Plasmid pSPB7607 constructed in this manner was introduced into the petunia variety "Surfinia Bouquet Red", and a total of 19 transformants were obtained. As a result of pigment analysis, swertisin (apigenin 7-methyl-6-C-glycoside) and swertiajaponin (luteolin 7-methyl-6-C-glycoside) with methylation of the 7-position of flavone C-glycoside were confirmed in 9 of the transformants, the maximum content of the 7-methylated form with respect to the total flavone C-glycoside being 88.5% (average: 83.6%) (Table 18).

TABLE 18

| Plant | 7-Methylated | Flavonol (mg/g) | | Flavone (mg/g) | | Flavone C-glycoside (mg/g) | | | | Hue angle |
|---|---|---|---|---|---|---|---|---|---|---|
| No. | form (%) | Q | K | Lut | Api | IVX | Iori | Swe | Swaj | (°) |
| Host | 0.0 | 0.321 | 0.106 | 0.000 | 0.000 | 0.000 | 0.000 | 0.000 | 0.000 | 21.2 |
| 1 | 86.2 | 0.490 | 0.169 | 0.000 | 0.025 | 0.000 | 0.096 | 0.430 | 0.168 | 3.5 |
| 2 | 85.8 | 0.411 | 0.138 | 0.000 | 0.021 | 0.000 | 0.093 | 0.428 | 0.134 | 0.4 |
| 3 | 87.7 | 0.524 | 0.320 | 0.000 | 0.034 | 0.000 | 0.074 | 0.437 | 0.093 | 11.1 |
| 4 | 80.7 | 0.419 | 0.262 | 0.000 | 0.029 | 0.026 | 0.082 | 0.367 | 0.084 | 358.4 |
| 5 | 84.0 | 0.493 | 0.161 | 0.000 | 0.025 | 0.000 | 0.079 | 0.320 | 0.095 | 4.3 |
| 6 | 86.1 | 0.454 | 0.184 | 0.021 | 0.028 | 0.000 | 0.056 | 0.205 | 0.140 | 9.0 |
| 7 | 78.5 | 0.192 | 0.076 | 0.000 | 0.009 | 0.000 | 0.072 | 0.205 | 0.059 | 3.2 |
| 8 | 88.5 | 0.377 | 0.173 | 0.000 | 0.013 | 0.000 | 0.028 | 0.180 | 0.036 | 6.6 |
| 9 | 75.4 | 0.269 | 0.052 | 0.000 | 0.008 | 0.000 | 0.035 | 0.067 | 0.042 | 18.3 |

Host: Surfinia Bouquet Red
Q: quercetin,
K: kaempferol
Lut: luteolin,
Api: apigenin,
IVX: isovitexin,
Iori: isoorientin,
Swe: swertisin,
Swaj: swertiajaponin Two types of flavone C-glycosides: isovitexin (apigenin 6-C-glycoside) and isoorientin (luteolin 6-C-glycoside) were detected in the lines, in addition to the 7-methylated forms. None of the flavone C-glycosides were detected in the host. This clearly showed that CcFn-7OMT has activity of transferring a methyl group to the 7-position of flavones in plants. By utilizing this gene it is possible to efficiently produce 7-methylated forms of flavone C-glycosides in plants.

Example 20: Evaluation of Flower Color in Petunia Containing 7-Methylated Flavone C-Glycosides The petal color shades of the transformants containing 7-methylated flavone C-glycosides created in Example 19 (with petunia variety "Surfinia Bouquet Red" as the host), and the host (storing cyanidin as the main pigment) were measured using a spectrocolorimeter CM-700d (Konica Minolta Holdings, Inc.) with a 10° visual field and a D65 light source, and analyzed using SpectraMagic™ color management software (Konica Minolta Holdings, Inc.).

The petal hue angle was shifted toward the blue direction in all of the individuals in which swertisin and swertiajaponin were detected. This tendency was more marked with a higher content, with the flower color significantly altered to a pink color (blue direction). These results confirmed that the copresence of the 7-methylated form of flavone C-glycoside alters petal color shade to blue in petunia.

The results are shown in Tables 18 and 19.

TABLE 19

| | Gene and flavonoid composition | Hue angle |
|---|---|---|
| Host | Surfinia Bouquet Red (containing absolutely no flavone C-glycoside) | 21.2° |
| Example 19 | Oboushibana Fn-70MT + torenia FNS + gentian CGT (containing flavone C-glycoside and its methylated form) | Bluest point: 358.4° |

The invention claimed is:

1. A vector comprising a polynucleotide selected from the group consisting of the following (a), (c) and (e):

(a) a polynucleotide consisting of the nucleotide sequence of SEQ ID NO: 34;

(c) a polynucleotide encoding a protein consisting of the amino acid sequence of SEQ ID NO: 35; and (e) a polynucleotide encoding a protein consisting of an amino acid sequence with at least 90% identity to the amino acid sequence of SEQ ID NO: 35 and having activity of transferring a methyl group to the hydroxyl group at position 7 of flavone C-glycoside, and which further comprises a flavone synthase (FNS) gene or its homolog, and a flavone C-glycosylase (CGT) gene or its homolog.

2. The vector according to claim 1, wherein the FNS gene or its homolog is selected from the group consisting of:

(1-a) a polynucleotide consisting of the nucleotide sequence of SEQ ID NO: 19;

(1-c) a polynucleotide encoding a protein consisting of the amino acid sequence of SEQ ID NO: 20; and (1-e) a polynucleotide encoding a protein having an amino acid sequence with at least 90% identity to the amino acid sequence of SEQ ID NO: 20 and having the same activity as a protein encoded by the polynucleotide of (1-c), and the CGT gene or its homolog is selected from the group consisting of:

(2-a) a polynucleotide consisting of the nucleotide sequence of SEQ ID NO: 21;

(2-c) a polynucleotide encoding a protein consisting of the amino acid sequence of SEQ ID NO: 22; and (2-e) a polynucleotide encoding a protein having an amino acid sequence with at least 90% identity to the amino acid sequence of SEQ ID NO: 22 and having the same activity as a protein encoded by the polynucleotide of (2-c).

3. The vector according to claim 1, wherein the vector further comprises a flavonoid F3',5'-hydroxylase (F3',5'H) gene or its homolog, and a methyltransferase (MT) gene or its homolog.

4. The vector according to claim 3, wherein the F3',5'H gene or its homolog is selected from the group consisting of:

(3-a) a polynucleotide consisting of the nucleotide sequence of SEQ ID NO: 9;

(3-c) a polynucleotide encoding a protein consisting of the amino acid sequence of SEQ ID NO: 10; and (3-e) a polynucleotide encoding a protein having an amino acid sequence with at least 90% identity to the amino acid sequence of SEQ ID NO: 10 and having the same activity as a protein encoded by the polynucleotide of (3-c), and the MT gene or its homolog is selected from the group consisting of:

(4-a) a polynucleotide consisting of the nucleotide sequence of SEQ ID NO: 17;

(4-c) a polynucleotide encoding a protein consisting of the amino acid sequence of SEQ ID NO: 18; and (4-e) a polynucleotide encoding a protein having an amino acid sequence with at least 90% identity to the amino acid sequence of SEQ ID NO: 18 and having the same activity as a protein encoded by the polynucleotide of (4-c).

5. The vector according to claim 2, which has the *Arabidopsis* alcohol dehydrogenase (ADH) gene 5'-untranslated region (5'-UTR) (SEQ ID NO: 23) added to the CGT gene or its homolog.

6. The vector according to claim 1, which further comprises a flavanone 2-hydroxylase (F2H) gene or its homolog, a flavone C-glycosylase (CGT) gene or its homolog, and a dehydratase (FDH) gene or its homolog.

7. The vector according to claim 6, which further comprises a flavonoid F3',5'-hydroxylase (F3',5'H) gene or its homolog, and a methyltransferase (MT) gene or its homolog.

8. The vector according to claim 7, wherein the F2H gene or its homolog is selected from the group consisting of:

(5-a) a polynucleotide consisting of the nucleotide sequence of SEQ ID NO: 3;

(5-c) a polynucleotide encoding a protein consisting of the amino acid sequence of SEQ ID NO: 4; and (5-e) a polynucleotide encoding a protein having an amino acid sequence with at least 90% identity to the amino acid sequence of SEQ ID NO: 4 and having the same activity as a protein encoded by the polynucleotide of (5-c), the CGT gene or its homolog is selected from the group consisting of:

(6-a) a polynucleotide consisting of the nucleotide sequence of SEQ ID NO: 13;

(6-c) a polynucleotide encoding a protein consisting of the amino acid sequence of SEQ ID NO: 14; and (6-e) a polynucleotide encoding a protein having an amino acid sequence with at least 90% identity to the amino acid sequence of SEQ ID NO: 14 and having the same activity as a protein encoded by the polynucleotide of (6-c), the FDH gene or its homolog is selected from the group consisting of:

(7-a) a polynucleotide consisting of the nucleotide sequence of SEQ ID NO: 15;

(7-c) a polynucleotide encoding a protein consisting of the amino acid sequence of SEQ ID NO: 16; and (7-e) a polynucleotide encoding a protein having an amino acid sequence with at least 90% identity to the amino acid sequence of SEQ ID NO: 16 and having the same activity as a protein encoded by the polynucleotide of (7-c), the F3',5'H gene or its homolog is selected from the group consisting of:

(8-a) a polynucleotide consisting of the nucleotide sequence of SEQ ID NO: 9;

(8-c) a polynucleotide encoding a protein consisting of the amino acid sequence of SEQ ID NO: 10;

and (8-e) a polynucleotide encoding a protein having an amino acid sequence with at least 90% identity to the amino acid sequence of SEQ ID NO: 10 and having the same activity as a protein encoded by the polynucleotide of (8-c), and the MT gene or its homolog is selected from the group consisting of:

(9-a) a polynucleotide consisting of the nucleotide sequence of SEQ ID NO: 17;

(9-c) a polynucleotide encoding a protein consisting of the amino acid sequence of SEQ ID NO: 18;

and (9-e) a polynucleotide encoding a protein having an amino acid sequence with at least 90% identity to the amino acid sequence of SEQ ID NO: 18 and having the same activity as a protein encoded by the polynucleotide of (9-c).

9. A transgenic plant or an inbred or outbred progeny of the same, comprising the vector according to claim 1.

10. The transgenic plant, or its inbred or outbred progeny according to claim 9, wherein the plant is selected from rose, petunia, chrysanthemum, carnation or lily.

11. The transgenic plant, or its inbred or outbred progeny according to claim 10, wherein the plant is rose.

12. Propagules, partial plant bodies, tissue or cells of the transgenic plant, or its inbred or outbred progeny according to claim 9, comprising the transgene.

13. A cut flower of the transgenic plant, or its inbred or outbred progeny, according to claim 9 or a processed form created from the cut flower, comprising the transgene.

* * * * *